US012765457B2

(12) United States Patent
Clark et al.

(10) Patent No.: US 12,765,457 B2
(45) Date of Patent: *Oct. 20, 2026

(54) REMOTE ATTRIBUTE MONITORING DURING AN AGRICULTURAL OPERATION BASED ON PRIORITY

(71) Applicant: Deere & Company, Moline, IL (US)

(72) Inventors: Scott N. Clark, Bettendorf, IA (US); Nathan R. Vandike, Geneseo, IL (US); Nathan E. Krehbiel, Bettendorf, IA (US); Patrick D. Elledge, Le Claire, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,650

(22) Filed: Jul. 9, 2024

(65) Prior Publication Data

US 2026/0013429 A1 Jan. 15, 2026

(51) Int. Cl.
*A01D 41/127* (2006.01)
*G05D 1/689* (2024.01)
(Continued)

(52) U.S. Cl.
CPC ........... *A01D 41/127* (2013.01); *G05D 1/689* (2024.01); *G05D 2105/87* (2024.01); *G05D 2109/254* (2024.01)

(58) Field of Classification Search
CPC ...... A01D 41/127; G05D 1/672; G05D 1/248; A01B 69/008; A01B 79/005; A01B 69/001; G06Q 10/06; G06Q 10/0631; B64U 80/86; B64U 30/20; B64U 70/93; G07C 5/0841; A61L 9/20; A01C 21/005; G06N 20/00
See application file for complete search history.

(56) References Cited

U.S. PATENT DOCUMENTS

| | | | |
|---|---|---|---|
| 5,712,782 | A | 1/1998 | Weigelt et al. |
| 6,085,135 | A | 7/2000 | Steckel |

(Continued)

FOREIGN PATENT DOCUMENTS

| | | | |
|---|---|---|---|
| CN | 108229311 | A | 6/2018 |
| CN | 108363335 | A | 8/2018 |

(Continued)

*Primary Examiner* — Yuri Kan
(74) *Attorney, Agent, or Firm* — Christopher J. Volkmann; KELLY, HOLT & CHRISTENSON PLLC

(57) ABSTRACT

An agricultural system includes: a sensor system disposed on a drone communicably coupled to and remotely positionable from an agricultural work machine at a worksite; one or more processors; and memory storing instructions, executable by the one or more processors. The instructions, when executed by the one or more processors, cause the one or more processors to: identify a plurality of attributes to be detected; identify a monitoring priority identifying a priority of each attribute of the plurality of attributes; generate, based, at least, on the monitoring priority, a travel plan for the drone, the travel plan instructing travel of the drone at the worksite to detect the one or more attributes; and control the drone based on the travel plan to travel at the worksite to detect, with the sensor system, the plurality of attributes to be detected and generate sensor data indicative of the plurality of attributes.

20 Claims, 24 Drawing Sheets

(51) Int. Cl.

| | |
|---|---|
| ***G05D 105/80*** | (2024.01) |
| ***G05D 109/25*** | (2024.01) |

(56) References Cited

U.S. PATENT DOCUMENTS

| | | | | |
|---|---|---|---|---|
| 7,721,515 | B2 | 5/2010 | Pollklas et al. | |
| 8,909,389 | B2 | 12/2014 | Meyer | |
| 9,050,890 | B2 | 6/2015 | Buerkle et al. | |
| 9,561,871 | B2 | 2/2017 | Sugumaran | |
| 9,740,208 | B2 | 8/2017 | Sugumaran et al. | |
| 9,807,933 | B2 | 11/2017 | Boyd et al. | |
| 9,829,883 | B1 | 11/2017 | Lavoie et al. | |
| 10,049,296 | B2 | 8/2018 | Walker | |
| 10,255,670 | B1 | 4/2019 | Wu et al. | |
| 10,377,197 | B2 | 8/2019 | Fukatsu et al. | |
| 10,531,603 | B2 | 1/2020 | Ferrari et al. | |
| 10,721,859 | B2 | 7/2020 | Wu et al. | |
| 10,754,353 | B2 | 8/2020 | Sporrer et al. | |
| 10,761,544 | B2 | 9/2020 | Anderson et al. | |
| 10,817,755 | B2 | 10/2020 | Ferrari et al. | |
| 10,890,922 | B2 | 1/2021 | Ramm et al. | |
| 11,017,306 | B2 | 5/2021 | Sood et al. | |
| 11,112,262 | B2 | 9/2021 | Anderson | |
| 11,113,567 | B1 * | 9/2021 | Durand .................. | G06N 20/00 |
| 11,308,735 | B2 | 4/2022 | Wagner et al. | |
| 11,324,164 | B2 | 5/2022 | Sorensen | |
| 11,410,301 | B2 | 8/2022 | Barrick et al. | |
| 11,470,776 | B2 | 10/2022 | Barther et al. | |
| 11,483,972 | B2 | 11/2022 | Dima et al. | |
| 11,499,295 | B2 | 11/2022 | Anderson | |
| 11,632,895 | B2 | 4/2023 | Sporrer et al. | |
| 11,758,844 | B2 | 9/2023 | White et al. | |
| 12,104,359 | B2 | 10/2024 | Carpenter et al. | |
| 12,302,788 | B2 | 5/2025 | Vandike et al. | |
| 2003/0066277 | A1 | 4/2003 | Behnke | |
| 2006/0020402 | A1 | 1/2006 | Bischoff et al. | |
| 2006/0196158 | A1 | 9/2006 | Faivre et al. | |
| 2009/0015422 | A1 | 1/2009 | Sixt, Jr. et al. | |
| 2010/0198544 | A1 | 8/2010 | Tuken | |
| 2010/0217474 | A1 | 8/2010 | Baumgarten et al. | |
| 2011/0043378 | A1 | 2/2011 | Bailey et al. | |
| 2012/0029732 | A1 | 2/2012 | Meyer | |
| 2015/0242799 | A1 * | 8/2015 | Seki ..................... | A01B 79/005 705/7.15 |
| 2016/0178483 | A1 | 6/2016 | Sidles | |
| 2016/0221618 | A1 | 8/2016 | Sidles | |
| 2016/0237640 | A1 | 8/2016 | Carpenter et al. | |
| 2016/0341578 | A1 | 11/2016 | Park et al. | |
| 2017/0031365 | A1 | 2/2017 | Sugumaran et al. | |
| 2017/0357259 | A1 | 12/2017 | Foster et al. | |
| 2018/0143321 | A1 | 5/2018 | Skowronek et al. | |
| 2018/0242523 | A1 * | 8/2018 | Kirchbeck ........... | A01C 21/005 |
| 2019/0094861 | A1 | 3/2019 | Menzel et al. | |
| 2019/0227554 | A1 | 7/2019 | Cantrell et al. | |
| 2019/0271992 | A1 | 9/2019 | Zou et al. | |
| 2020/0064467 | A1 | 2/2020 | Wang et al. | |
| 2020/0128732 | A1 | 4/2020 | Chaney | |
| 2020/0264154 | A1 | 8/2020 | Saez et al. | |
| 2020/0319632 | A1 | 10/2020 | Desai et al. | |
| 2020/0404842 | A1 | 12/2020 | Dugas et al. | |
| 2021/0012399 | A1 | 1/2021 | Machida | |
| 2021/0015045 | A1 | 1/2021 | Vandike et al. | |
| 2021/0056327 | A1 | 2/2021 | Cohen et al. | |
| 2021/0064020 | A1 * | 3/2021 | Cutu ...................... | B64U 70/93 |
| 2021/0146977 | A1 | 5/2021 | Rajan Kesavelu Shekar et al. | |
| 2021/0272255 | A1 | 9/2021 | Barrick et al. | |
| 2021/0300547 | A1 | 9/2021 | Stanhope et al. | |
| 2021/0357664 | A1 | 11/2021 | Kocer et al. | |
| 2021/0362742 | A1 | 11/2021 | Lee et al. | |
| 2021/0362790 | A1 | 11/2021 | Pikesh et al. | |
| 2022/0015288 | A1 | 1/2022 | Christiansen et al. | |
| 2022/0015289 | A1 | 1/2022 | Christiansen et al. | |
| 2022/0018702 | A1 | 1/2022 | Christiansen et al. | |
| 2022/0018955 | A1 | 1/2022 | Christiansen et al. | |
| 2022/0019238 | A1 | 1/2022 | Christiansen et al. | |
| 2022/0019239 | A1 | 1/2022 | Christiansen et al. | |
| 2022/0019240 | A1 | 1/2022 | Christiansen et al. | |
| 2022/0019241 | A1 | 1/2022 | Christiansen et al. | |
| 2022/0063804 | A1 * | 3/2022 | Kim .......................... | A61L 9/20 |
| 2022/0089181 | A1 * | 3/2022 | Gross ................... | G07C 5/0841 |
| 2022/0091619 | A1 * | 3/2022 | Wake ..................... | B64U 30/20 |
| 2022/0132723 | A1 | 5/2022 | Anderson | |
| 2022/0137644 | A1 | 5/2022 | Wake et al. | |
| 2022/0138868 | A1 | 5/2022 | Jarugumilli et al. | |
| 2022/0232770 | A1 | 7/2022 | Yanke et al. | |
| 2022/0234755 | A1 * | 7/2022 | Demonfort ............ | B64U 80/86 |
| 2022/0348322 | A1 | 11/2022 | Zemenchik | |
| 2023/0000015 | A1 | 1/2023 | Swanson et al. | |
| 2023/0011864 | A1 | 1/2023 | Shmueli et al. | |
| 2023/0161347 | A1 | 5/2023 | Vandike et al. | |
| 2023/0217857 | A1 | 7/2023 | Vandike et al. | |
| 2023/0244242 | A1 | 8/2023 | Armstrong-Crews et al. | |
| 2023/0312146 | A1 | 10/2023 | Kinoshita et al. | |
| 2023/0320274 | A1 | 10/2023 | Vandike et al. | |
| 2023/0322423 | A1 | 10/2023 | Kinoshita et al. | |
| 2023/0345873 | A1 | 11/2023 | Goossens et al. | |
| 2024/0032469 | A1 | 2/2024 | Christiansen et al. | |
| 2024/0032474 | A1 | 2/2024 | Ritter et al. | |
| 2024/0037806 | A1 | 2/2024 | Christiansen et al. | |
| 2024/0049633 | A1 | 2/2024 | Vandike et al. | |
| 2024/0049634 | A1 | 2/2024 | Vandike et al. | |
| 2024/0049635 | A1 | 2/2024 | Vandike et al. | |
| 2024/0069551 | A1 | 2/2024 | Infantini et al. | |
| 2024/0091693 | A1 | 3/2024 | Missotten et al. | |
| 2024/0095622 | A1 * | 3/2024 | Hoffmann .......... | G06Q 10/0631 |
| 2024/0130280 | A1 | 4/2024 | Ganssle | |
| 2024/0130292 | A1 | 4/2024 | Pastucha et al. | |
| 2024/0130293 | A1 | 4/2024 | Pastucha et al. | |
| 2024/0180062 | A1 | 6/2024 | Morimoto et al. | |
| 2024/0257275 | A1 * | 8/2024 | Hoffmann .............. | G06Q 10/06 |
| 2024/0324507 | A1 | 10/2024 | Vandike et al. | |
| 2025/0068172 | A1 * | 2/2025 | Tamatani ............... | G05D 1/248 |
| 2025/0095242 | A1 | 3/2025 | Donini et al. | |
| 2025/0117021 | A1 * | 4/2025 | Komaru ............... | A01B 69/008 |
| 2025/0120330 | A1 * | 4/2025 | Murata .................. | G05D 1/672 |
| 2025/0270055 | A1 | 8/2025 | Christiansen et al. | |
| 2025/0270056 | A1 | 8/2025 | Christiansen et al. | |
| 2025/0272982 | A1 | 8/2025 | Christiansen et al. | |
| 2025/0301953 | A1 | 10/2025 | Singh et al. | |
| 2026/0013412 | A1 * | 1/2026 | Clark ................... | A01B 69/001 |

FOREIGN PATENT DOCUMENTS

| | | | |
|---|---|---|---|
| CN | 110495321 | A | 11/2019 |
| CN | 113287422 | A | 8/2021 |
| CN | 115272314 | A | 11/2022 |
| CN | 118605301 | A | 9/2024 |
| DE | 102014201203 | A1 | 7/2015 |
| DE | 102015224175 | B3 | 4/2017 |
| DE | 102016202628 | A1 | 8/2017 |
| EP | 2545761 | B1 | 12/2016 |
| EP | 3401854 | A1 | 11/2018 |
| EP | 3284334 | B1 | 4/2019 |
| EP | 3552474 | B1 | 8/2021 |
| IN | 202241068395 | A | 2/2022 |
| JP | 2021058099 | A | 4/2021 |
| JP | 2023160359 | A | 11/2023 |
| JP | 2024173326 | A | 12/2024 |
| TR | 201615002 | U | 12/2016 |
| TW | M553858 | U | 1/2018 |
| WO | 2022145410 | A1 | 7/2022 |
| WO | 2023021005 | A1 | 2/2023 |
| WO | 2023047240 | A1 | 3/2023 |
| WO | 2023187494 | A1 | 10/2023 |

* cited by examiner

REMOTE ATTRIBUTE MONITORING DURING AN AGRICULTURAL OPERATION BASED ON PRIORITY

FIELD OF THE DESCRIPTION

The present description relates to agricultural worksite operations. More specifically, the present description relates to drone-based remote monitoring and control of agricultural worksite operations, such as an agricultural harvesting operation.

BACKGROUND

There are a wide variety of different types of agricultural worksite operations. During an agricultural worksite operation, one or more agricultural work machines operate at a worksite, which can include on or more fields, to carry out the operation. The one or more agricultural work machines can be controlled during the operation based on attributes detected at the worksite.

The discussion above is merely provided for general background information and is not intended to be used as an aid in determining the scope of the claimed subject matter.

SUMMARY

An agricultural system includes: a sensor system disposed on a drone communicably coupled to and remotely positionable from an agricultural work machine at a worksite; one or more processors; and memory storing instructions, executable by the one or more processors. The instructions, when executed by the one or more processors, cause the one or more processors to: identify a plurality of attributes to be detected; identify a monitoring priority identifying a priority of each attribute of the plurality of attributes; generate, based, at least, on the monitoring priority, a travel plan for the drone, the travel plan instructing travel of the drone at the worksite to detect the one or more attributes; and control the drone based on the travel plan to travel at the worksite to detect, with the sensor system, the plurality of attributes to be detected and generate sensor data indicative of the plurality of attributes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
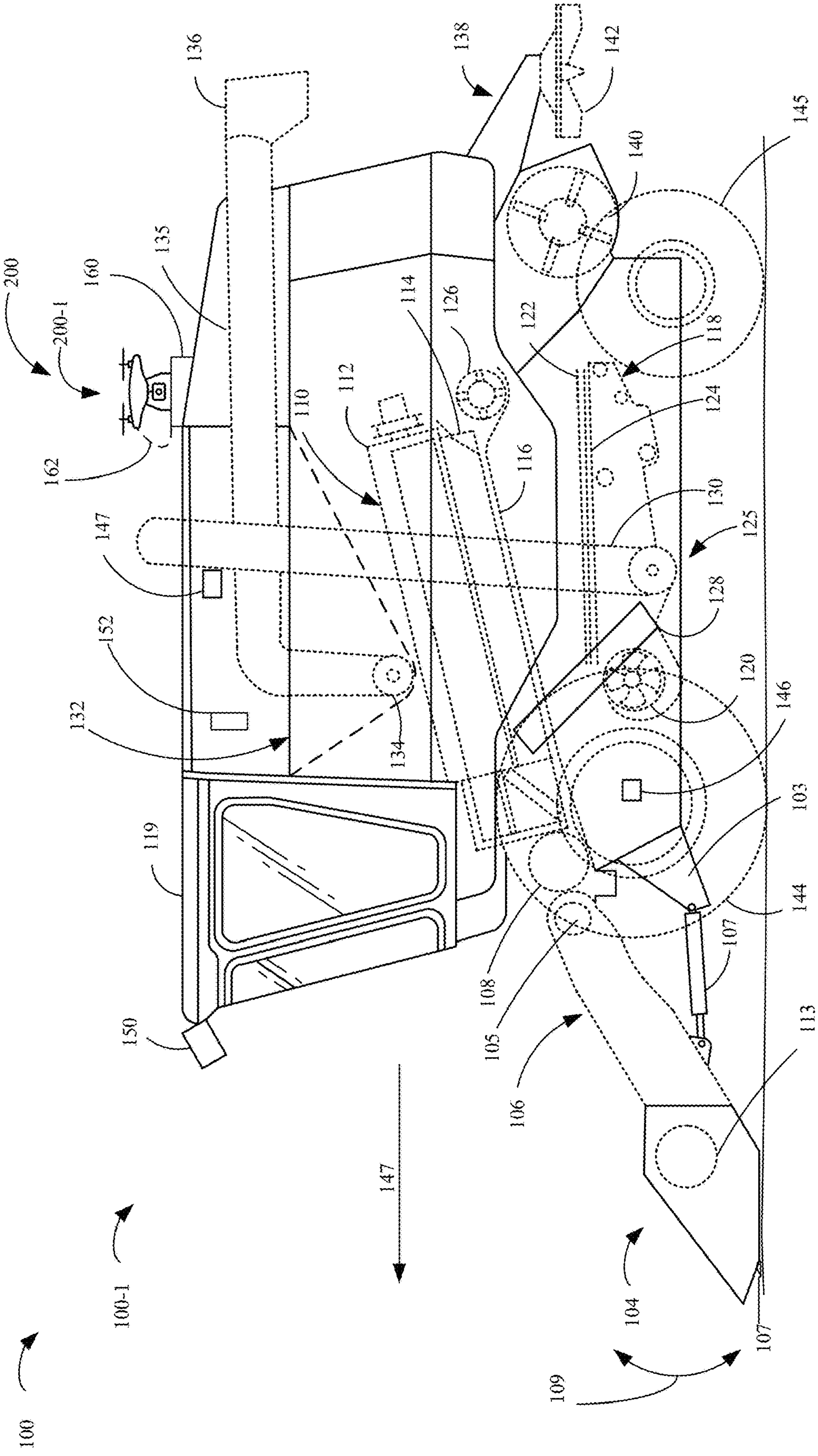
FIG. 1 is a partial pictorial, partial schematic illustration showing an example agricultural work machine in the form of an agricultural harvester.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example can be combined with the features, components, and/or steps described with respect to other examples of the present disclosure.

As discussed above, during an agricultural worksite operation, one or more agricultural work machines operate at a worksite to complete an operation. Operating parameters (e.g., machine settings, route, etc.) of the agricultural work machines can be controlled, during the operation, based on attributes detected at the worksite. For example, the travel speed and travel path of the machines as well as the operating speeds and positions of various components of the machines can be controlled, during the operation, based on detected attributes. In some current systems, sensors onboard a work machine can be used to detect various attributes and can provide sensor data (e.g., signals, images, etc.) indicative of the detected attributes. The sensor data can be utilized by a control system to control one or more operating parameters of the work machine.

However, sensors on-board the work machine can face challenges. For one, the detection area (e.g., field of view, etc.) of the sensor on-board the work machine can be less than ideal for the detection of certain attributes, or at least, are less optimal relative to a remotely positionable sensor such as that on a drone (e.g., unmanned aerial vehicle (UAV), unmanned ground vehicle (UGV), etc.). The measurement area of sensors on-board the work machine can also not be easily adjustable. Further, even where the measurement area of sensors on-board the work machine can be selectively adjusted, given that sensors on-board the work machine travel along with the machine, the measurement area of the sensors on-board the work machine are, at least somewhat, dependent on the current location and orientation of the agricultural work machine. In some examples, a plurality of sensors on-board the work machine can be used, each having a respective measurement area. However, the use of additional sensors on-board the work machine can increase expense and processing complexity. Further, the measurement areas of sensors on-board the work machine can be obstructed by various types of obstructions at the worksite, such as debris (e.g., dust, crop material, other material, etc.) clouds, as well as various other obstructions. One example of a debris cloud is a debris cloud generated by the work machine (e.g., such as generated by a harvester, or the header of the harvester, as it engages, cuts, and processes crop). In some examples, a debris cloud can be generated by a machine that is operating in proximity to or passing the work machine, for instance, other work machines operating at the field, other work machines passing by the field on a nearby path (e.g., dirt road or trail). The obstructions can lead to error in the detection of the attributes, or, in some examples, prevent detection altogether. Given sensors on-board the work machine attachment to the work machine, it can be difficult to compensate for (e.g., detect in spite of) the obstructions. Further, on-board sensors can suffer detection errors due to bouncing or vibration of the machine to which they are attached.

It would be useful to have a sensor system that could overcome the challenges faced by sensors on-board the work machine while still providing sensor data for use in controlling the work machine, such as a sensor system remotely positionable from the work machine, capable of detecting a plurality of different attributes in a plurality of different measurement areas, and adjustable to account for the presence of obstructions at the worksite. Examples described herein proceed with utilization of one or more drones (e.g., unmanned aerial vehicles (UAVs), unmanned ground vehicles (UGVs), etc.) that each include a sensor system capable to detect a variety of attributes and generate sensor data indicative of the various attributes and useable to control the work machine. The one or more drones are controllably positionable, remote from and relative to the work machine and/or relative to a location at the worksite. The travel of the one or more drones can be controlled such that the one or more drones are positioned to detect various attributes at various measurement areas in a desired way (e.g., at given locations and for a desired amount of time, from a desired perspective, etc.). In some examples, the one or more drones can be docked on the agricultural work machine. In some examples, the one or more drones can be tethered to the agricultural work machine.

While various examples detailed herein proceed in the context of agricultural harvesting operations utilizing agricultural harvesters, it will be understood that the systems and methods described herein are applicable to and can be used in various other agricultural worksite operations that utilize other types of agricultural work machines, such as, but not limited to, tillage operations utilizing tillage machines, material application operations utilizing material application machines (e.g., dry spreaders, sprayers, etc.), planting/seeding operations utilizing planting/seeding machines, as well as other types of agricultural operations utilizing other types of agricultural work machines.

FIG. 1 is partial pictorial, partial schematic illustration of an example agricultural work machine 100 in the form of an agricultural harvester 100-1. In the example shown in FIG. 1, agricultural harvester 100-1 is in the form of a combine harvester. As illustrated in FIG. 1, harvester 100-1 includes ground engaging traction elements (wheels or tracks) 144 and 145 which can be driven by a propulsion subsystem (e.g., internal combustion engine, electric motors, hydrostatic drive, and other drivetrain elements, such as a gear box) to propel harvester 100 across a worksite 10 (e.g., a field). Harvester 100-1 includes an operator compartment or cab 119, which can include a variety of different operator interface mechanisms (e.g., 418 shown in FIG. 4) for controlling harvester 100-1 as well as for presenting (e.g., displaying, etc.) various information. Harvester 100-1 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 100-1 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 100-1 can also include one or more actuators that operate to apply a tilt angle, a roll angle, or both to the header 104 or portions of header 104.

Agricultural harvester 100-1 includes a material handling subsystem 125 that includes a thresher 110 which illustratively includes a threshing rotor 112 and a set of concaves 114. Further, material handling subsystem 125 also includes a separator 116. Agricultural harvester 100-1 also includes a cleaning subsystem or cleaning shoe (collectively referred to as cleaning subsystem 118) that includes cleaning fan(s) 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Harvester 100-1 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger, blower, or belted conveyor. Conveying mechanism 134 is in communication with clean grain tank 132 and is driven (e.g., by an actuator, such as motor or engine) to convey material from grain tank 132 through chute 135 and spout 136. Chute is rotatable through a range of positions from a storage position (shown in FIG. 1) to a variety of deployed positions away from agricultural harvester 100-1 to align spout 136 relative to a material receptacle of a material receiving machine that is configured to receive the material within grain tank 132. One example of such a deployed position is shown in FIG. 11. Spout 136, in some examples, is also rotatable, by an actuator, to adjust the direction of the material stream exiting spout 136.

Harvester 100-1 also includes a residue subsystem 138 that can include chopper 140 and spreader 142.

In some examples, a harvester within the scope of the present disclosure can have more than one of any of the subsystems mentioned above. In some examples, harvester 100-1 can have left and right cleaning subsystems, separators, etc., which are not shown in FIG. 1.

In operation, and by way of overview, harvester 100-1 illustratively moves through a field 10 in the direction indicated by arrow 147. As harvester 100-1 moves, header 104 engages the crop plants to be harvested and cuts, with a cutter bar 107 on the header 104, the crop plants to generate cut crop material.

The cut crop material is engaged by a cross conveyor (e.g. cross auger, belts, etc.) 113 which conveys the severed crop material to a center of the header 104 where the severed crop material is then moved through an opening to a conveyor in feeder house 106 toward feed accelerator 108, which accelerates the severed crop material into thresher 110. The severed crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100-1 in a windrow.

Grain falls to cleaning subsystem 118. Chaffer 122 separates some larger pieces of MOG from the grain, and sieve 124 separates some of finer pieces of MOG from the grain. The grain then falls to a conveyor (e.g., an auger, etc.) that moves the grain to an inlet end of grain elevator 130, and the grain elevator 130 moves the grain upwards, depositing the grain in grain tank 132. Residue is removed from the cleaning subsystem 118 by airflow generated by one or more cleaning fans 120. Cleaning fans 120 direct air along an airflow path upwardly through the sieves and chaffers. The airflow carries residue rearwardly in harvester 100-1 toward the residue handling subsystem 138.

Tailings elevator 128 returns tailings to thresher 110 where the tailings are re-threshed. Alternatively, the tailings also can be passed to a separate re-threshing mechanism by a tailings elevator or another transport device where the tailings are re-threshed as well.

Harvester 100-1 can include a variety of sensors, some of which are illustrated in FIG. 1, such as ground speed sensor 146, one or more mass flow sensors 147, and one or more observation sensor systems 150, and one or more fill level sensors 152.

Ground speed sensor 146 senses the travel speed of harvester 100-1 over the ground. Ground speed sensor 146 can sense the travel speed of the harvester 100-1 by sensing the speed of rotation of the ground engaging traction elements 144 or 145, or both, a drive shaft, an axle, or other components. In some instances, the travel speed can be sensed using a positioning system, such as a global positioning system (GPS), a dead reckoning system, a long-range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 100-1 is on a slope, the orientation of harvester 100-1 relative to the slope is known. For example, an orientation of harvester 100-1 could include ascending, descending or transversely travelling the slope.

Mass flow sensors 147 sense the mass flow of material (e.g., grain) through clean grain elevator 130. Mass flow sensors 147 can be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Observation sensor systems 150 can include one or more of a variety of sensors, such as cameras (e.g., mono cameras, stereo cameras, color (e.g. RGB) cameras, multispectral cameras, etc.), lidar sensors, radar sensors, ultrasonic sensors, as well as various other sensor configured to emit and/or receive electromagnetic radiation, as well as a variety of other sensors. Observation sensor systems 150 can illustratively observe (and thus detect characteristics relative to) the worksite 10, items at the worksite 10 (e.g., vegetation, including crops at the worksite), and portions of the harvester 100-1. While FIG. 1 shows some example positions of observation sensor system 150, it will be understood that observation sensor systems 150 can, alternatively or additionally, be positioned (or otherwise disposed) at a variety of other locations on harvester 100-1.

Fill level sensors 152 can include one or more of a variety of sensors, such as contact sensors and non-contact sensors. Fill level sensors 152 detect a fill level of grain in grain tank 132. Fill level sensors 152, in the form of contact sensors, include paddles (or other contact members) that are contacted by the grain and the displacement of the contact members or force or load of impact of the material on the contact member can be detected to determine presence of grain material at the level of the tank corresponding to the sensor. Fill level sensors 152, in the form of non-contact sensors, can be configured to capture electromagnetic radiation to detect presence of grain at the level of the tank corresponding to the sensor. In some examples, fill level sensors 152 are configured to alert an operator when the harvester 100-1 is full (or is approaching full). These are merely some examples. While FIG. 1 shows some example positions of fill level sensors 152, it will be understood that fill level sensors 152 can, additionally or alternatively, be positioned (or otherwise disposed) at a variety of other locations on harvester 100-1.

An agricultural work machine 100 can include various other sensors, some of which will be described in FIG. 4.

As further illustrated in FIG. 1, agricultural work machine 100 can include a drone docking station 160 configured to dock a drone 200 (illustratively a UAV 200-1) and, optionally, a tether 162 coupling the harvester 100 and the drone 200. In some examples, a tether 162 is included. The tether 162 can include communication circuitry that provides for communication between work machine 100 and drone 200 and power circuitry that provides for power to the drone 200. Tether 162 can be any of a variety of lengths. In some examples, a tether 162 is not included and, instead, the docking station 160 includes power circuitry that provides power to the drone 200, such as to recharge one or more batteries of the drone 200.

A work machine 100 can include various other items, some of which will be described in FIG. 4.

Figure 2:
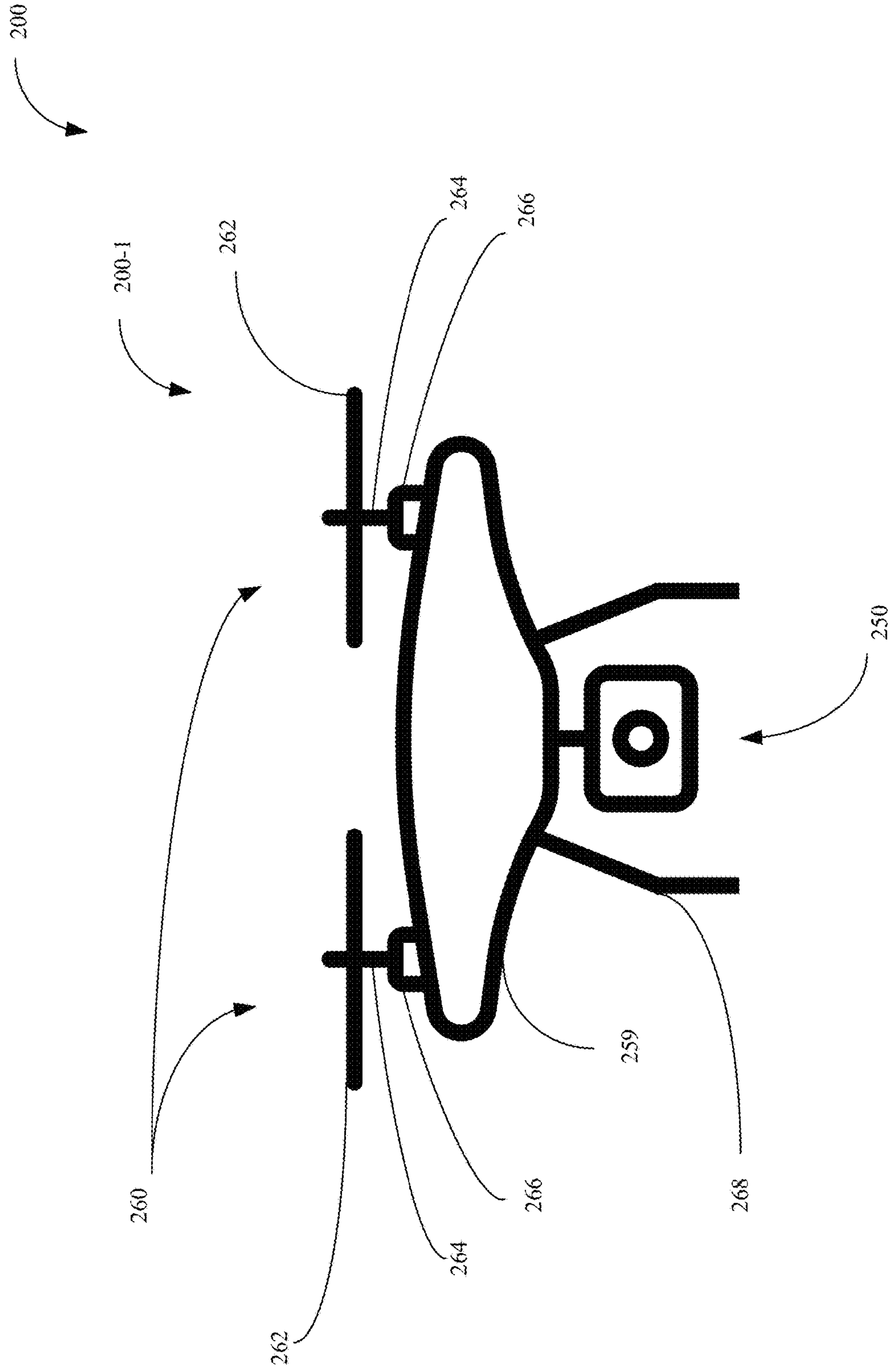
FIG. 2 is pictorial illustration showing an example unmanned aerial vehicle (UAV).

FIG. 2 is a pictorial illustration showing one example UAV 200-1. As illustrated in FIG. 2, UAV 200-1 includes attribute sensor system 250, body 259, propeller systems 260, and landing gear 268. Propeller systems 260 each include a plurality of propeller blades 262, a rotor 264, and a motor 266. In the illustrated example, UAV 200-1 is a quadcopter (i.e., in the illustrated example, UAV 200-1 includes 4 propeller systems 260). Though, in other examples, UAV 200-1 could include a different number of propeller systems 260. It will be understood by those skilled in the art, that the each of the motors 266 can be individually controlled, and that the speed and, in some examples, the direction of rotation of the motors 266 is adjustable to controllable move and position the UAV 200-1. Attribute sensor system 250 can include one or more sensors that detect attributes at a worksite. Attribute sensor system 250 can include one or more of a camera (e.g., mono camera, stereo camera, color (e.g., RGB) camera, multispectral camera, infrared camera, thermal camera, etc.), a lidar sensor, a radar sensor, a light sensor, an ultraviolet sensor, an ultrasonic sensor, a terahertz sensor, a photoelectric sensor, a sound sensor, as well as various other sensors. UAV 200-1 can include various other sensors, some of which will be described in FIG. 4.

UAV 200-1 can include various other items, some of which will be described in FIG. 4.

Figure 3:
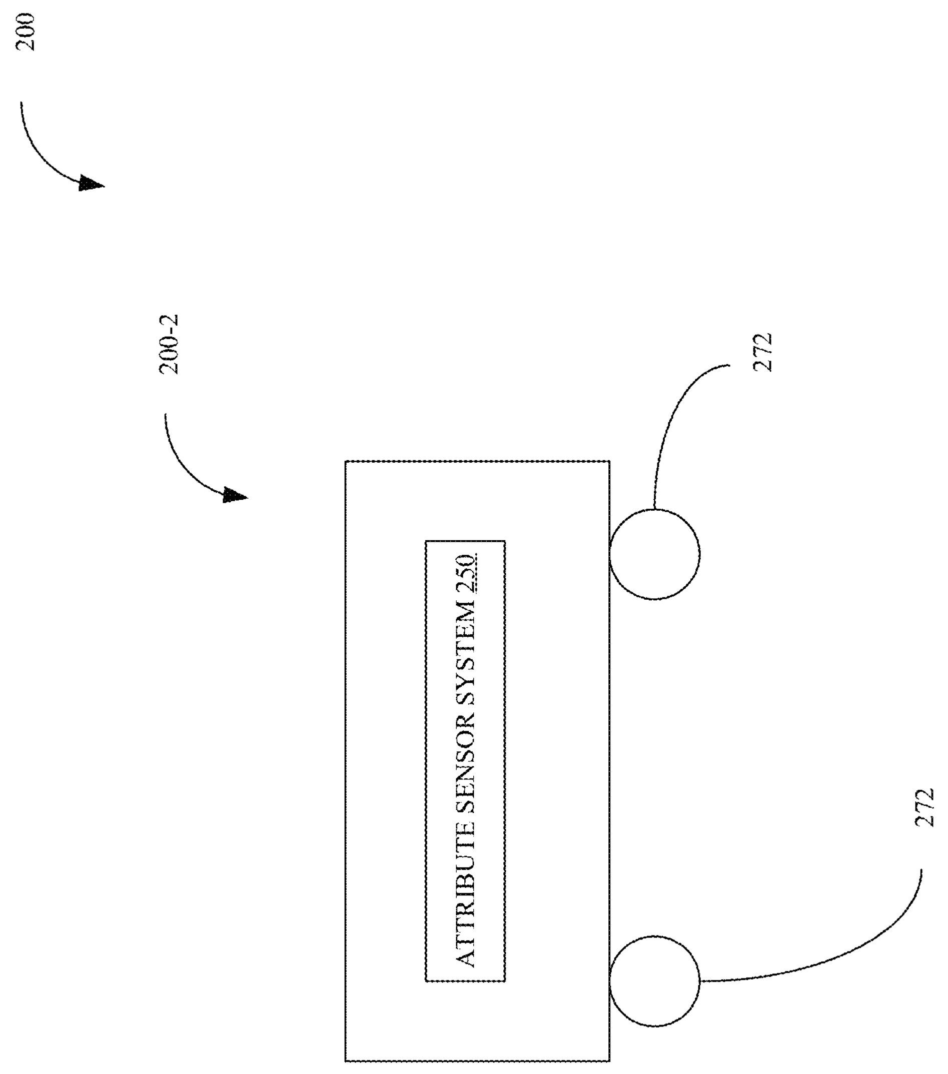
FIG. 3 is a partial pictorial illustration, partial block diagram showing an example unmanned ground vehicle (UGV).

FIG. 3 is a partial pictorial illustration, partial block diagram showing one example UGV 200-2. As illustrated in FIG. 3, UGV 200-2 includes an attribute sensor system 250 and ground engaging traction elements 272. The ground engaging traction elements (illustratively wheels, though in other examples could be tracks) support the UGV 200-2 over the surface over the worksite and are controllably moveable to propel and steer the UGV 200-2, such as by a travel subsystem (described in FIG. 4) which can include one or more actuators (e.g., motors, etc.) for driving the elements 272 and one or more actuators (e.g., cylinders, linear actuators, etc.) for turning the elements 272. Attribute sensor system 250 can include one or more sensors that detect attributes at a worksite. Attribute sensor system 250 can include one or more of a camera (e.g., mono camera, stereo camera, color (e.g., RGB) camera, multispectral camera, infrared camera, thermal camera, etc.), a lidar sensor, a radar sensor, a light sensor, an ultraviolet sensor, an ultrasonic sensor, a terahertz sensor, a photoelectric sensor, a sound sensor, as well as various other sensors. UGV 200-2 can include various other sensors, some of which will be described in FIG. 4.

UGV 200-2 can include various other items, some of which will be described in FIG. 4.

Figure 4:
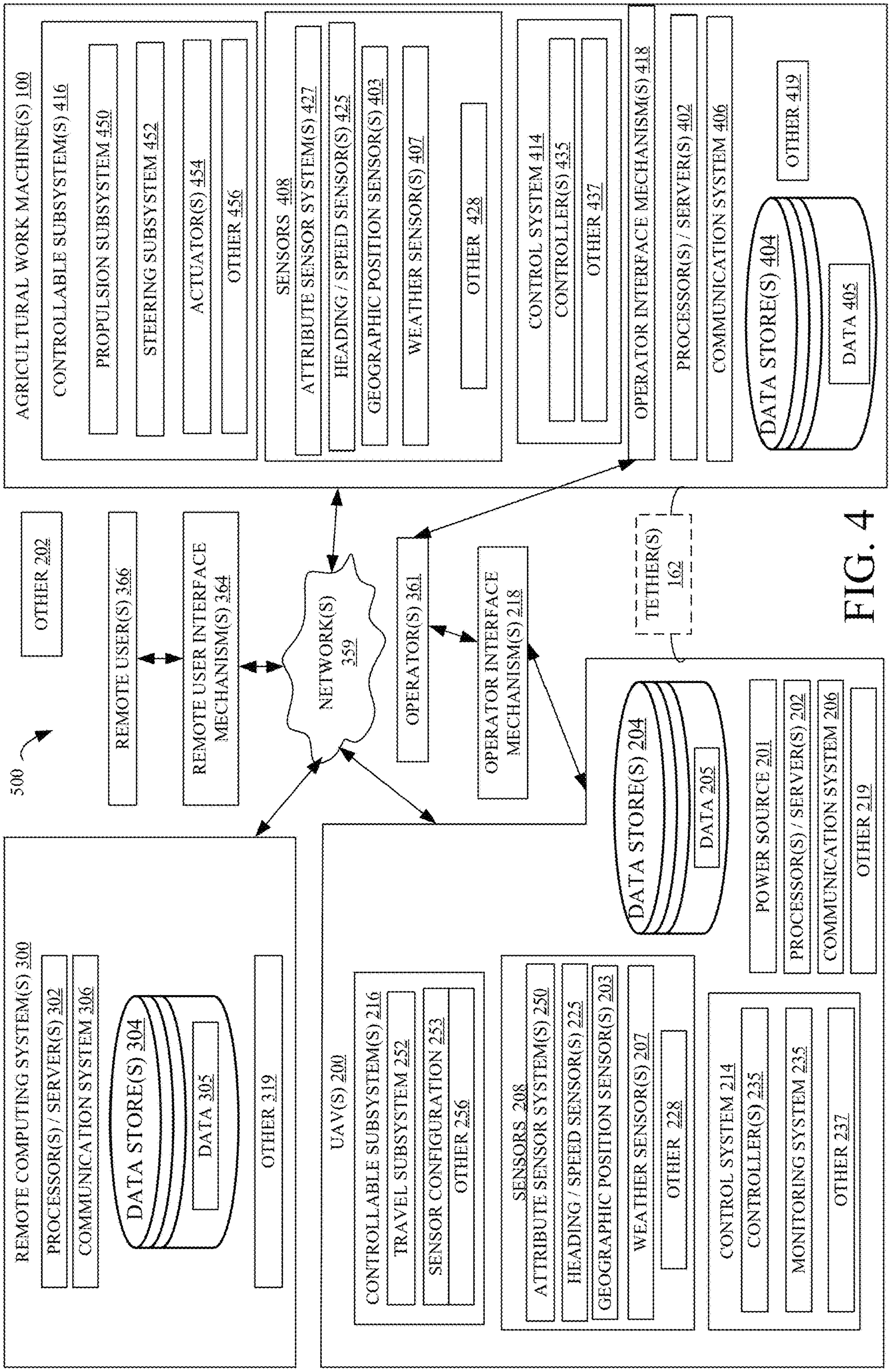
FIG. 4 is a block diagram of one example agricultural system architecture.

FIG. 4 is a block diagram showing one example agricultural system architecture 500 (hereinafter also referred to as agricultural system 500 or as system 500). Agricultural system 500 includes one or more agricultural work machines 100 and one or more drones 200 (e.g., one or more UAVs or one or more UGVs, or both). System 500 also includes one or more remote computing systems 300, one or more networks 359, one or more remote user interface mechanisms 364, and can include a variety of other items 202 as well. As illustrated, system 500 can, optionally, include one or more tethers 162, each tether 162 tethering a work machine 100 to a drone 200.

Each work machine 100, itself, illustratively includes one or more processors or servers 402, one or more data stores 404, communication system 406, one or more sensors 408, control system 414, one or more controllable subsystems 416, one or more operator interface mechanisms 418, and can include various other items and functionality 419 as well. Work machines 100 can include a number of different types of work machines, such as primary operation work machines (e.g., harvesters 100-1, tillage machines 100-2, etc.) and support machines (e.g., material receiving machine 100-3, etc.).

Each drone 200, itself, illustratively includes one or more processors or servers 202, one or more data stores 204, communication system 206, one or more sensors 208, control system 214, one or more controllable subsystems 216, one or more operator interface mechanisms 218, and can include various other items and functionality 219 as well.

Remote computing systems 300, as illustrated, include one or more processors or servers 302, one or more data stores 304, communication system 306, and can include various other items and functionality 319.

Data stores 204, data stores 304, and data stores 404 each store a variety of data (generally indicated as data 205, data 305, and data 405 respectively), some of which will be described in more detail herein. For example, data 205, data 305, or data 405, or a combination thereof, can include, among other things, attribute sensor data, other sensor data, priority data, machine data, monitoring selection data, as well as various other data. Some examples of the various data will be described in more detail in FIG. 5. Additionally, data 205 can include computer executable instructions that are executable by one or more processors or servers 202 to implement other items or functionalities of system 500, including other items or functionalities of drones 200. Additionally, data 305 can include computer executable instructions that are executable by one or more processors or servers 302 to implement other items or functionalities of system 500, including other items of remote computing systems 300. Additionally, data 405 can include computer executable instructions that are executable by one or more processors or servers 402 to implement other items or functionalities of system 500, including other items or functionalities of work machines 100. It will be understood that data stores 204, data stores 304, and data stores can include different forms of data stores, for instance both volatile data stores (e.g., Random Access Memory (RAM)) and non-volatile data stores (e.g., Read Only Memory (ROM), hard drives, solid state drives, etc.).

Sensors 408 can include one or more attribute sensor systems 427, one or more heading/speed sensors 425, one or more geographic position sensors 403, one or more weather sensors 407, and can include various other sensors 428 as well. The sensor data generated by sensors 408 can be communicated to remote computing systems 300, to drones 200, to other work machines 100, and to other items of a work machine 100. Control system 414, itself, can include one or more controllers 435 for controlling various other items of work machine 100, and can include other items 437 as well. Controllable subsystems 416 can include propulsion subsystem 450, steering subsystem 452, actuators 454, and can include various other subsystems 456 as well.

Sensors 208 can include one or more attribute sensor systems 250, one or more heading/speed sensors 225, one or more geographic position sensors 203, one or more weather sensors 207, and can include various other sensors 228 as well. The sensor data generated by sensors 208 can be communicated to remote computing systems 300, to work machines 100, to other drones 200, and to other items of a drone 200. Control system 214, itself, can include one or more controllers 235 for controlling various other items of a drone 200, monitoring system 235, and can include other items 237 as well. Controllable subsystems 216 can include travel subsystem 252, sensor configuration subsystem 253, and can include various other subsystems 256 as well.

Heading/speed sensors 425 detect a heading characteristic (e.g., travel direction) or speed characteristic (e.g., travel speed, acceleration, deceleration, etc.), or both, of an agricultural harvester 100. This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources. Heading/speed sensors 225 detect a heading characteristic (e.g., travel direction) or speed characteristic (e.g., travel speed, acceleration, deceleration, etc.), or both, of a drone 200. This can include sensors that sense movement (e.g., rotation) of components of the drone 200 (e.g., components 266, 264, or 262 of UAV 200-1 or components 272 of UGV 200-2), sensors that sense movement of the drone 200 (e.g., accelerometers, etc.), or can utilize signals received from other sources, such as geographic position sensors. Thus, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Geographic position sensors 403 illustratively sense or detect the geographic position or location of an agricultural work machine 100. Geographic position sensors 203 illustratively sense or detect the geographic position or location of a drone 200. Geographic position sensors 403 and 203 can include, but are not limited to, a global navigation satellite system (GNSS) receiver that receives signals from a GNSS satellite transmitter. Geographic position sensors 403 and 203 can also include a real-time kinematic (RTK) component that is configured to enhance the precision of position data derived from the GNSS signal. Geographic position sensors 403 and 203 can include a dead reckoning system, a cellular triangulation system, or any of a variety of other geographic position sensors.

Weather sensors 207 and 407 illustratively sense or detect various weather attributes relative to the worksite. Weather sensors 207 and 407 can include temperature sensors, humidity sensors, dewpoint sensors, wind sensors (detect wind speed and direction), light sensors (detect characteristics of ambient light, such as the intensity or amount of ambient light, the inclination angle of ambient light, etc.), precipitation sensors (detect precipitation type and amount), odor sensors (detect ambient odors), ambient airborne debris sensors, cloud coverage sensors, as well as various other sensors. It will be noted that, in some examples, at least some weather characteristics can be obtained from sources other than weather sensors, such as from publicly available third-party weather sources (e.g., Internet-based sources), via a communication system (e.g., 206, 306, or 406) over networks 359.

Attribute sensor systems 250 and attribute sensor systems 427 detect one or more attributes at the worksite. Attributes, as used herein, can include environmental attributes, plant attributes, performance attributes, and machine attributes.

Environmental attributes can include terrain attributes, such as terrain slope (both cross slope and longitudinal slope), terrain elevation, terrain variability (e.g., change/rate of change in slope or elevation), and other terrain attributes. In some examples, terrain attributes can be referred to as topographic attributes (or topography). Environmental attributes can include soil attributes such as soil moisture, soil type, soil firmness, soil shear strength, soil adhesion, and other soil attributes. Environmental attributes can include weather attributes such as ambient light (light intensity and light angle), solar/heat load, ambient temperature, ambient dewpoint, ambient humidity, cloud coverage, wind speed and direction, precipitation type and amount, ambient airborne debris (e.g., dust), as well as other weather attributes. Environmental attributes can include field feature attributes such as field boundaries, field obstacles (e.g., type, presence, and location of obstacles at the field), field conditions (e.g., ruts, damage, etc.), field working limits (e.g., working limits due to power lines, overpasses, bridges, culverts, etc.), and other field feature attributes. Environmental attributes can include operation attributes such as previous operation parameters (e.g., heading, orientation, locations) of previous operations at the worksite, previous operation quality (e.g., job quality of previous operations). The previous operation parameters or previous operation quality, or both, can be used to determine operation attributes of a current or next operation, such as parameters (e.g., type, requirements, prescriptions, etc.). Environmental attributes can include various other attributes.

Plant attributes can include crop attributes such as crop height, crop state (e.g., down, standing, partially down/leaning, lodged, broken, direction of downing or leaning, etc.), crop health, crop population, crop moisture, crop type (e.g., species, hybrid, cultivar, etc.), crop biomass, crop mechanics (e.g., plant toughness, such as toughness of material other than grain (MOG), shatterability, threshability, etc.), as well as other crop attributes. Plant attributes can include commodity (e.g., grain) attributes such as commodity (e.g., grain) moisture, commodity (e.g., grain) yield, commodity (e.g., grain) constituents (e.g., concentrations of constituents (e.g., protein, starch, oil, etc.) of the commodity (e.g., grain)), commodity (e.g., grain) mechanics (e.g., commodity (e.g., grain) toughness, shatterability, threshability, etc.), commodity (e.g., grain) mass, commodity (e.g., grain) size, commodity (e.g., grain) test weight, commodity (e.g., grain) temperature, as well as various other commodity (e.g., grain) attributes. Plant attributes can include stalk attributes such as stalk size, stalk moisture, as well as other stalk attributes. Plant attributes can include leaf attributes such as leaf moisture, leaf location, as well as other leaf attributes. Plant attributes can include car/head/pod (EHP) attributes such as EHP height, EHP location, EHP orientation, EHP size, EHP mechanics (e.g., EHP toughness or threshability, EHP shatter resistance or shatterability, etc.), as well as other EHP attributes. Plant attributes can include cob attributes such as cob diameter (e.g., cross-sectional diameter), cob mechanics, as well as other cob attributes. Plant attributes can include crop damage attributes such as crop pest damage attributes, crop fungal/disease damage attributes, as well as other crop damage attributes. Plant attributes can include weed attributes such as weed presence, weed intensity (e.g., size, pressure, amount, etc.), weed type, as well as other weed attributes. Plant attributes can include pre-harvest commodity (e.g., grain) loss attributes (e.g., indicative of an amount of commodity (e.g., grain) lost pre-harvest, such as commodity (e.g., grain) on the ground prior to harvesting). Plant attributes can include various other attributes.

Performance attributes can include feedrate performance attributes such as total feedrate, MOG feedrate, grain feedrate, as well as other feedrate performance attributes. Performance attributes can include vehicle speed performance (e.g., how well the actual machine speed matches a target or setting speed). Performance attributes can include productivity attributes such as overall machine productivity, subsystem specific productivity, as well as other machine productivity attributes. Performance attributes can include efficiency attributes such as overall machine efficiency, subsystem specific efficiency, as well as other machine efficiency attributes. Performance attributes can include header performance attributes such as header cut height, cut variability, header commodity (e.g., grain) loss (e.g., missed crop, commodity (e.g., grain) lost at header, such as tossed from header, not captured by header or leaked from header, shattered/shelled by header, etc.), header material flow (e.g., header material flow uniformity (e.g., flow consistency, flow interruption, such as plugs, etc.), header material feeding/gathering (e.g., wrapping, carryover, tossing, pushing, bouncing, etc.), header material convergence, as well as other header performance attributes. Performance attributes can include separation commodity (e.g., grain) loss. Performance attributes can include threshing commodity (e.g., grain) loss. Performance attributes can include cleaning grain loss. Performance attributes can include storage grain loss (e.g., grain spilled from storage tank). Threshing, separation, and cleaning commodity loss can be detected by detecting commodity lost out of the back of the machine (e.g., distributed or expelled with residue) or by detecting commodity on the ground behind the machine. Performance attributes can include unloading/transfer commodity (e.g., grain) loss (e.g., commodity (e.g., grain) loss during transfer of material from one machine to another machine). Performance attributes can include residue job quality attributes, such as residue spread width, residue spread offset, residue distribution uniformity, residue windrow shape, residue cut length, residue material content (e.g., straw quality, chaff content, chaff-straw ratio, amount of grain intermixed with residue output by machine, etc.), as well as other residue job quality attributes. Performance attributes can include job quality attributes such as job completeness (e.g., was the job executed or not), job completeness distribution (e.g., to what extent was the job executed across the width of the implement of the machine or across a swath width), job completeness level (e.g., to what extent was the job completed, such as relative to a target), as well as other job quality attributes. Performance attributes can include commodity (e.g., grain) quality performance attributes such as commodity (e.g., grain) damage (e.g. commodity (e.g., grain) brokenness), commodity (e.g., grain) cleanliness (e.g., how much foreign material (e.g., MOG/trash) is intermixed with the commodity (e.g., grain)), as well as other commodity (e.g., grain) quality performance attributes. Performance attributes can include tailings performance attributes such as tailing level, tailings material content, as well as other tailings performance attributes. Performance attributes can include pressure performance attributes such as ground pressure, sound pressure, as well as other pressure performance attributes. Performance attributes can include machine vibration performance attributes such as magnitude of machine vibration and frequency of machine vibration. Performance attributes can include distance travelled. Performance attributes can include wheel slip. Performance attributes can include profitability attributes (e.g., productive time and downtime, total time to complete, etc.). Performance attributes can include machine productive time (e.g., time actively operating) and machine downtime (e.g., time machine was down for maintenance/repair, calibration, operator changeover, or otherwise not actively operating). Performance attributes can include machine wear. Performance attributes can include machine dynamics, such as ride quality, drivability (e.g., acceleration jerk, slew, and response), as well as other machine dynamics. Machine performance attributes can include time to complete the operation. Performance attributes can include field condition performance attributes such as damage to the field (e.g., ruts, scrapes, compaction, etc.), unwanted piles of material, as well as other field condition performance attributes. Performance attributes can include machine cleanliness (e.g., amount of dirt and debris on the machine). Performance attributes can include coverage performance attributes such as how well/to what extent the operation covered the desired area of the field, pass overlaps, missed spots, as well as other coverage performance attributes. Performance attributes can include various other attributes.

Machine attributes can include machine location attributes such as geographic locations of machines. Machine attributes can include machine operating effect attributes such as smoke and smoke attributes such as presence of smoke, location of smoke, level (e.g., amount, etc.) of smoke, pathway of smoke (e.g., including origin point), as well as other smoke attributes. Machine operating effect attributes can include temperature attributes indicating the temperature of one or more components of a work machine, including an associated location. Machine operating effect attributes can include material accumulation (i.e., accumulated material) and material accumulation attributes, such as location of accumulated material (e.g., location on work machine), type of material accumulated (e.g., commodity (e.g., grain), non-commodity (e.g., MOG), chaff, straw, weeds, plant species, etc.), level (e.g., amount, distribution, etc.) of accumulated material, accumulated material size, accumulated material color, temperature of accumulated material, accumulated material size, as well as other material accumulation attributes. Additionally, as will be shown below, machine operating effect attributes can be detected on or proximate the machine or at one or more areas of the worksite (e.g., on the surface of the worksite or in the environment of the worksite. Machine operating effect attributes can include various other attributes. Machine attributes can include machine travel attributes such as machine heading (e.g., heading direction, steering angle, steering offsets for automatic steering system), machine travel speed, as well as other machine travel attributes. Machine attributes can include header attributes such as header height, header orientation, as well as other header attributes. Machine attributes can include header auger attributes such as header auger speed, header auger position, as well as other header auger attributes. Machine attributes can include header reel attributes such as header reel height, header reel fore/aft position, header reel speed, header reel finger timing, as well as other header reel attributes. Machine attributes can include header end fender attributes such as header ender fender position, header end fender speed, as well as other header end fender attributes. Machine attributes can include backshaft speed. Machine attributes can include header cutterbar position. Machine attributes can include header draper belt attributes such as header draper belt speed, header draper belt position, as well as other header draper belt attributes. Machine attributes can include header deck plate attributes such as header deck plate position (or spacing), as well as other header deck plate attributes. Machine attributes can include feederhouse attributes such as feederhouse position, feederhouse drum position (e.g. an indicator coupled to the feederhouse assembly that is at least partially external to the machine and thus detectable externally), as well as other feederhouse attributes. Machine attributes can include grain fill level. Machine attributes can include unloading subsystem attributes, such as unloading subsystem position (e.g., chute and spout positions), unloading subsystem activation state (e.g., on or off), as well as other unloading subsystem attributes. Machine size attributes such as machine dimensions, machine footprint, as well as other machine size attributes. Machine attributes can include ground engaging traction element attributes such as tire pressure level (e.g., detect indicator of low inflation or flat tire), track tension, as well as other ground engaging traction element attributes. Machine attributes can include machine storage attributes such as commodity (e.g., grain) storage capacity, commodity (e.g., grain) fill level (e.g., the extent to which an on-board commodity storage receptacle is filled), as well as other machine storage attributes. Machine attributes can include machine status attributes such as whether the machine is on or off, whether the machine is down or disabled, whether a functionality of the machine is on or off, whether the machine is in field mode or road mode, whether a component of the machine is deployed or undeployed (folded or unfolded, down or up, extended or retracted, etc.), as well as other machine status attributes. Machine attributes can include various other attributes.

It will be understood that in some examples, attribute sensor systems 250 and attribute sensor systems 427 can include or utilize data from other sensors described herein. For example, attribute sensor systems 250 can include or utilize data from weather sensors 207, geographic position sensors 203, heading/speed sensors 225, and other sensors 228. Attribute sensor systems 427 can include or utilize data from weather sensors 407, geographic position sensors 403, heading/speed sensors 425, and other sensors 428.

Sensors 408 can also include various other types of sensors 428. Sensors 208 can also include various other types of sensors 228.

Control system 414 can include one or more controllers 435 (e.g., electronic control units, which can include or be implemented by one or more processors, such as one or more processors 402) that generate control signals to control one or more components of a machine 100 or components of system 500, or both. For example, but not by limitation, controllers 435 can include, a communication system controller to control communication system 406, an interface controller to control one or more interface mechanisms (e.g., 418 or 364, or both), a propulsion controller to control propulsion subsystem 450 to control a travel speed of a machine 100, a path planning controller to control steering subsystem 452 to control a route or heading of a machine 100, and one or more actuator controllers to control operation of actuators 454 of a machine 100. In other examples, a central controller 435 can be used to generate control signals to control a plurality of the controllable subsystems 416 as well, in some examples, other items of system 500.

Control system 214 can include a variety of controllers 235 (e.g., electronic control units, which can include or be implemented by one or more processors, such as one or more processors 202) that generate control signals to control one or more components of a drone 200 or components of system 500, or both. For example, but not by limitation, controllers 235 can include a communication system controller to control communication system 206, an interface controller to control one or more interface mechanisms (e.g., 218 or 364, or both), a travel controller to control travel subsystem 252 to control a travel speed, travel direction, and location of a drone 200, a sensor configuration controller to control sensor configuration subsystem 253 to activate or deactivate one or more sensors 208 or to control a configuration (e.g., settings) of each of one or more sensors 208 such as a position, an orientation, a field of view, a frequency spectrum, as well as other configuration characteristics (or settings) . . . . In other examples, a central controller 235 can be used to generate control signals to control a plurality of the controllable subsystems 216 as well, in some examples, other items of system 500.

Propulsion subsystem 450 includes one or more controllable actuators (e.g., internal combustion engine, motors, pumps, gear boxes, etc.) that drive the ground engaging traction elements (e.g., wheels or tracks) of a work machine 100.

Steering subsystem 452 includes one or more controllable actuators (e.g., electric actuators, hydraulic actuators, etc.) that are controllably actuatable to control the steering and thus heading of a work machine 100.

Travel subsystem 252 includes one or more controllable actuators operable to drive movement of drones 200 to control travel speed, travel direction, and positioning of the drones 200. In the example of UAVs 200-1, travel subsystem 252 includes one or more controllable actuators (e.g., motors 266) that drive movement of the propeller systems 260 to move and position a UAV 200-1. It will be understood that the speed or direction of rotation, or both, of the motors 266, and thus the propeller systems, can be controlled. Additionally, each motor 266 can be individually controlled, though, in some examples, sub-sets of the motors 266 (e.g., pairs, etc.) are controlled similarly. It will be understood that travel subsystem 252 is controllable to control the travel speed, travel direction, and position of a UAV 200-1. In the example of UGVs 200-2, travel subsystem 252 includes one or more controllable actuators (e.g., motors, etc.) that drive the ground engaging traction elements 272 of a UGV 200-2 and further includes one or more controllable actuators (e.g., electric actuator, hydraulic actuators, etc.) that are controllably actuatable to control the steering and thus heading of a UGV 200-2. It will be understood that travel subsystem 252 is controllable to control the travel speed, travel direction, and position of a UGV 200-2.

Actuators 454 include a variety of different types of actuators that control operating parameters of one or more components of a work machine 100. Actuators 454 can include actuators that control the position (e.g., height, depth, or spacing from another component of the machine or to the worksite) or orientation (e.g., pitch, roll, yaw, etc.) of components of a work machine 100 as well as actuators that control a speed of movement (e.g., speed of rotation, speed of reciprocation, etc.) of components of a work machine 100. Actuators 454 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators. Where work machine 100 is an agricultural harvester 100-1, actuators 454 can include actuators controllable to control operating parameters of one or more of the components described in FIG. 1.

FIG. 4 also shows that control system 214 can include monitoring system 235. Monitoring system 235 in planning and controlling the monitoring performed by drones 200 at the worksite. Monitoring system 235 will be discussed in more detail in FIG. 5.

Communication system 406 is used to communicate between components of a work machine 100 or with other items of system 500, such as remote computing systems 300, drones 200, other work machines 100, or user interface mechanisms 364, or a combination thereof. Communication system 206 is used to communicate between components of a drone 200 or with other items of system 500, such as remote computing systems 300, work machines 100, other drones 200, or user interface mechanisms 364, or a combination thereof. Communication system 306 is used to communicate between components of a remote computing system 300 or with other items of system 500, such as work machines 100, drones 200, other remote computing systems 300, or user interface mechanisms 364, or a combination thereof.

Communication systems 206, 306, and 406 can each include one or more of wired communication circuitry and wireless communication circuitry, as well as wired and wireless communication components. In some examples, communication systems 206, 306, and 406 can each be a system for communicating over the Internet, a cellular communication system, a system for communicating over a wide area network or a local area network, a system for communicating over a controller area network (CAN), such as a CAN bus, a system for communicating over a controller area network flexible data-rate (CAN-FD), such as a CAN-FD bus, a system for communication over a near field communication network, a system for communicating over ethernet, or a communication system configured to communicate over any of a variety of other networks. Communication systems 206, 306, and 406 can each also include a system that facilitates downloads or transfers of information to and from a secure digital (SD) card or a universal serial bus (USB) card, or both. Communication systems 206, 306, and 406 can each utilize network 359. Networks 359 can be any of a wide variety of different types of networks such as the Internet, a cellular network, a wide area network (WAN), a local area network (LAN), a controller area network (CAN), a controller area network flexible data-rate (CAN-FD), a near-field communication network, ethernet, or any of a wide variety of other networks.

FIG. 4 shows that one or more operators 361 can operate work machines 100 and drones 200. The operators 361 interact with operator interface mechanisms 418 or operator interface mechanisms 218. In some examples, operator interface mechanisms 418 and operator interface mechanisms 218 can each include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the operators 361 can interact with operator interface mechanisms 418 and operator interface mechanisms 218 using touch gestures. Additionally, at least some of the operator interface mechanisms 418 and operator interface mechanisms 218 can be used to present (e.g., display, audible presentation, haptic presentation, etc.) various information. The examples described above are provided as illustrative examples and are not intended to limit the scope of the present disclosure. Consequently, other types of operator interface mechanisms 418 and operator interface mechanisms 218 can be used and are within the scope of the present disclosure.

Additionally, as shown in FIG. 4, operator interface mechanisms 218 can be separate from, but communicatively coupled to, drones 200. In some examples, operator interface mechanisms 218 are a part of or included as functionality of operator interface mechanisms 418.

FIG. 4 also shows remote users 366 interacting with work machines 100, drones 200, and remote computing systems 300 through user interface mechanisms 364 over networks 359. In some examples, user interface mechanisms 364 can include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the users 366 can interact with user interface mechanisms 364 using touch gestures. Additionally, at least some of the user interface mechanisms 364 can be used to present (e.g., display, audible presentation, haptic presentation, etc.) various information. The examples described above are provided as illustrative examples and are not intended to limit the scope of the present disclosure. Consequently, other types of user interface mechanisms 364 can be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, work machines 100 can be controlled remotely by remote computing systems 300 or by remote users 366, or both. In one example, drones 200 can be controlled remotely by remote computing systems 300 or by remote users 366, or both. In some examples, operators 361 are on-board (e.g., in an operator compartment, such as a cab) the work machines 100. In some examples, operators 361 are remote from the machines (e.g., 100 or 200) and control the machines through one or more interface mechanisms (e.g. one or more of 418 and one or more of 218) which are remote from the machines but operatively coupled (e.g., communicatively coupled, such as over networks 359) to the machines.

It will be understood that, in some examples, items in system 500 can be distributed in various ways, including ways that differ from the example shown in FIG. 4. For example, but not by limitation, monitoring system 235, shown in FIG. 4 as being disposed on drones 200, be located elsewhere, such as at one or more work machines 100 or one or more remote computing systems 300. In yet other examples, monitoring system 235 can be distributed across two or more of a drone 200, a work machine 100, and a remote computing system 300.

Figure 5:
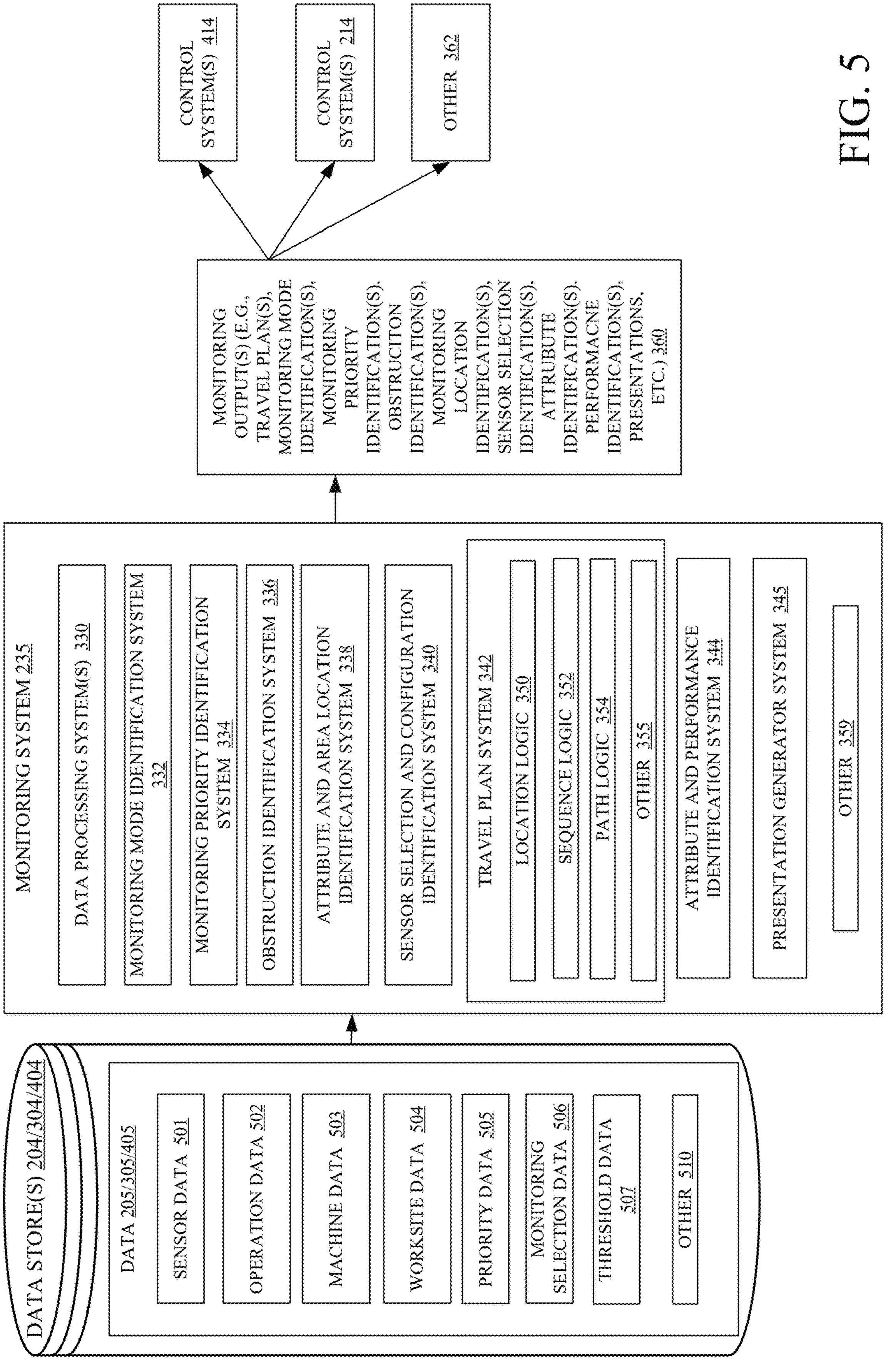
FIG. 5 is a block diagram showing some examples of components of the agricultural system architecture, including monitoring system, in more detail.

FIG. 5 is a block diagram that shows examples of some of the components of system 500 in more detail and information flow between the components.

As illustrated in FIG. 5, it can be seen that data stores 204, data stores 304, data stores 404, or a combination thereof, can include as data (205, 305, and 405, respectively), sensor data 501, operation data 502, machine data 503, worksite data 504, priority data 505, monitoring selection data 506, threshold data 507, and can include various other data 510, including, but not limited to, other data described elsewhere herein. In some examples, where the data is located can depend on where monitoring system 235 (also called system 310) is located.

As shown in FIG. 5, monitoring system 235 includes one or more data processing systems 330, monitoring mode identification system 332, monitoring priority identification system 334, obstruction identification system 336, attribute and area location identification system 338, sensor selection and configuration identification system 340, travel plan system 342, attribute and performance identification system 344, presentation generator system 345, as well as various other items and functionality 359. Travel plan system 342, itself, includes location logic 350, sequence logic 352, path logic 354, and various other items 354. As will be described in more detail, system is operable to generate one or more monitoring outputs 360.

Sensor data 501 includes sensor data (e.g., images, sensor signals, etc.) generated by sensors 208 and sensors 408. Sensor data 501 can thus include, attribute sensor data generated by attribute sensor systems 250 and attribute sensor systems 427, weather sensor data generated by weather sensors 207 and weather sensors 407, geographic position sensor data generated by geographic position sensors 203 and geographic position sensors 403, heading/speed sensor data generated by heading/speed sensors 225 and heading/speed sensors 425, as well as various other sensor data generated by other sensors 228 and other sensors 428.

Operation data 502 includes data indicative of one or more characteristics of the operation being performed by the one or more work machines 100. For example, operation data 502 can include data that indicates planned/prescribed machine operating parameters, such as planned/prescribed machine settings, planned/prescribed machine travel path (route), as well as other operating parameters. Additionally, operation data 502 can include data that indicates the type of operation to be/being performed (e.g., harvesting, tilling, planting, material application, etc.). Further, operation data 502 can include data that indicates the number and identity of machines to perform/performing the operation. Operation plan data 502 can be derived from a variety of sources including, but not limited to, operator or user input, sensor data, as well as a variety of other sources.

Machine data 503 includes data indicative of one or more machine characteristics of the machines that are to perform (or are performing) the operation at the worksite. Machine data 506 can include data indicative of the type of machine (e.g. model, etc.), data indicative of the dimensions of the machine, data indicative of locations of components of the machines, machine configuration (e.g., type and characteristics of attachments/implements of the machines), data indicative of ratings of the machine (e.g., machine latency, etc.), as well as various other machine characteristics. Machine data 503 can be derived from a variety of sources including, but not limited to, dealer or manufacturer provided information, operator or user input, stored machine identifying information, as well as from a variety of other sources.

Worksite data 504 includes data indicative of attributes of the worksite derived from sources other than sensors 208 and 408 or can be derived from sensors 208 and 408 during past (historical) operations. As previously mentioned, some attribute data need not be derived from sensors 208 and 408. For example, some attribute data can be obtained from other sources, such as, third-party providers, maps, historical data, operator or user input, as well as other sources. For instance, maps of the worksite, such as from overhead imagery or historical operations, can provide attribute data. In another example, third-party providers can provide attribute data. For instance, a third-party weather information provider can provide weather attribute data. Additionally, operators or users can provide, by input, various attribute information. Further, some attribute data can be obtained from historical data (e.g., data collected during prior operations). The historical data can be obtained from the same machines or from different machines. It will thus be understood that while in some examples, attribute data can be derived solely from sensor data 501, in other examples, attribute data can be derived from a combination of sensor data 501 and worksite data 504.

Priority data 505 can include data indicative of a priority of attributes to be monitored, such as a hierarchy of attributes, for instance a ranked list of attributes. Priority data includes data indicative of a priority of measurement areas to be monitored, such as hierarchy of measurement areas, for instance a ranked list of measurement areas. Priority data 505 includes data indicative of a priority of monitoring modes, such as a hierarchy of monitoring modes, for instance a ranked list of monitoring modes. Priority data 505 can be derived from operator or user inputs, can be system defaults, such as defaults based on the type of operation or the type of machine, or can be derived from learning functionality.

Monitoring selection data 506 includes data indicative of a selection of attributes to be monitored, a selection of measurement areas to be monitored, or a selection of a monitoring mode. Monitoring selection data 506 can be derived from operator or user inputs, can be system defaults, such as defaults based on the type of operation or the type of machine, or can be derived from learning functionality.

Threshold data 507 includes data indicative of various thresholds, some examples of which will be discussed herein. Threshold data 507 can be derived from various sources such as operator or user inputs, expert knowledge, manufacturer provided information, learning functionality, as well as various other sources.

Data processing systems process sensor data 501, operation data 502, machine data 503, worksite data 504, priority data 505, monitoring selection data 506, threshold data 507, and other data 510 to generate processed data. The processed data can include computer readable values, useable (or readable) by other items of monitoring system 310. Data processing system can include various processing functionality, including image processing functionality, sensor signal processing functionality, filtering functionality, categorization functionality, normalization functionality, aggregation functionality, color extraction functionality, analog-to-digital conversion functionality, other conversion functionality (e.g., look up tables, equations, mathematical functions, models, etc.), as well as various other data processing functionalities. It will be understood then that data processing systems 330 can, for example, convert analog signals to readable digital signals (or digital values). It will be understood that data processing systems can, for example, process captured images to extract values (e.g., pixel values, etc.), and can further convert the extracted values. It will be understood that data processing systems 330 can perform pre-processing and post-processing. It will be understood that data processing systems 330 can perform various forms of aggregation on the extracted or converted values.

Monitoring mode identification system 332 is operable to identify a monitoring mode for use in controlling the monitoring operation of one or more drones 200. Each monitoring mode can include a given set of one or more attributes to be monitored or can correspond to different area(s) of a machine 100 or worksite (e.g., area of the worksite relative to the machine 100), or both. Thus, a monitoring mode can indicate, and be used to identify, the attributes to be monitored by the one or more drones 200 or the areas to be monitored by the one or more drones 200, or both. There can be preset (or preconfigured monitoring modes) or customized monitoring modes. An operator or user can select a preset (or preconfigured) monitoring mode or select a customized monitoring mode (the operator or user selection being indicated by monitoring selection data). In some examples, the monitoring mode can be default and changeable by operator or user selection. In some examples, monitoring system 235 can select and change the monitoring mode.

Some examples of preset (or preconfigured) monitoring modes include a machine operating effect monitoring mode, a header performance monitoring mode, a lateral monitoring mode, a support machine monitoring mode, a forward monitoring mode, a rearward (or job quality) monitoring mode, and a combination monitoring mode. In the machine operating effect monitoring mode, one or more drones 200 are controlled to monitor for machine operating effect attributes (e.g., detect machine operating effect attributes such as smoke or smoke attributes, temperature or temperature attributes, or material accumulation or material accumulation attributes) at the worksite or on a work machine 100. In the header performance monitoring mode, one or more drones 200 are controlled to monitor for attributes of header performance of a header (e.g., 104) of a machine 100, such as header cut quality, header grain loss, header material flow, as well as other header performance attributes. In a lateral monitoring mode, one or more drones 200 are controlled to monitor for attributes lateral to the machine 100, such as attributes in previous passes or attributes in next passes or attributes in the current pass in an area between an edge of an implement (e.g., header, towed implement, etc.) and an edge of the body of the machine (shown in FIG. 10). In a support machine monitoring mode, one or more drones 200 are controlled to monitor attributes associated with a support machine 100 (e.g., 100-3), or attributes of areas of the worksite ahead of or behind the support machine (relative to a travel direction or route), or attributes of a support machine operation (e.g., unloading operation, etc.), or a combination thereof. In a forward monitoring mode, one or more drones 200 are controlled to monitor for attributes forward (or ahead) of the machine 100 (e.g., relative to the direction of travel or route of the machine 100). In a rearward (or job quality) monitoring mode, one or more drones 200 are controlled to monitor for attributes behind the machine 100 (e.g., relative to the direction of travel or route of the machine 100) such as job quality attributes. In a combination monitoring mode, one or more drones 200 are controlled to perform a combination of two or more of a machine operating effect monitoring mode, a header performance monitoring mode, a lateral monitoring mode, a support machine monitoring mode, a forward monitoring mode, or a rearward (or job quality) monitoring mode.

A user or operator, or system 235, can generate a customized monitoring mode. The customized monitoring mode can indicate the attributes of interest or the areas of interest, or both. In one example, a customized monitoring mode can be a select combination of two or more of a machine operating effect monitoring mode, a header performance monitoring mode, a lateral monitoring mode, a support machine monitoring mode, a forward monitoring mode, or a rearward (or job quality) monitoring mode.

As discussed, monitoring mode identification system 332 can identify the monitoring mode based on monitoring selection data 506, or the monitoring mode can be default (and changeable based on other input). In other examples, monitoring mode identification system 332 can identify a monitoring mode based on attributes at the worksite or based on performance of sensors 408 on-board a machine 100. For example, where, an attribute, such as an obstruction (e.g., debris (e.g., dust) cloud), is detected at the worksite in a location that can affect (e.g., diminish the quality of, prevent, etc.) the sensing of sensors 408, monitoring mode identification system 332 can identify a monitoring mode (customized or preset (or preconfigured) monitoring mode) that compensates for that effect (e.g., causes the one or more drones 200 to fill in or substitute for the affected sensor(s) 408). In another example, monitoring mode identification system 332 can identify a monitoring mode based on performance of sensors 408, as indicated, for instance, by feedback or sensor data generated by sensors 408. For example, where a sensor 408 is providing feedback or sensor data indicative of error or low quality detection, monitoring mode identification system 332 can identify a monitoring mode (customized or preset (or preconfigured) monitoring mode) that compensates for the impacted sensor performance (e.g., causes the one or more drones 200 to fill in or substitute for the erroneous or low performance sensor(s) 408).

Monitoring priority identification system 334 is operable to identify a priority of attributes, areas, or monitoring modes, such a hierarchy (e.g., ranked list) of attributes, areas, or monitoring modes. Travel of each of one or more drones 200 can be controlled based on the priority. Monitoring priority identification system 334 can identify a priority of attributes, areas, or monitoring modes based on priority data 505. For instance, priority data 505 can include operator or user selected priorities, default priorities, or learned priorities (learned during previous operations). In other examples, monitoring priority identification system 334 can identify a priority of attributes, areas, or monitoring modes based on machine state such as control system operation or machine operating modes, for instance, depending on whether automated functionality is enabled or not (e.g., auto-steering, auto-implement height control, etc.). In other examples, monitoring priority identification system 334 can identify a priority of attributes, areas, or monitoring modes based on attributes of a work machine 100 (e.g., as indicated by sensor data 501). For example, but not by limitation, such attributes of the work machine 100 can include engine coolant temperature, battery coolant temperature, hydraulic fluid temperature, other fluid temperatures, fluid pressures, fuel levels etc. (which can be derived from sensors 408 (e.g., 428, etc.) on-board the machine 100 or temperatures of other components of the machine 100 (which can be detected by sensors 208 or sensor 408), as well as various other attributes of the work machine 100. In other examples, monitoring priority identification system 334 can identify a priority of attributes, areas, or monitoring modes based on attributes at the worksite (e.g., indicated by sensor data 501 or other sources) or based on performance of sensors 408 on-board a machine 100. For example, priority of one or more attributes to be monitored can be determined based on one or more other attributes at the worksite, priority of one or more areas to be monitored can be determined based on one or more attributes at the worksite, and a priority of one or more monitoring modes can be determined based on one or more attributes at the worksite. For instance, where an attribute, such as an obstruction (e.g., debris (e.g., dust) cloud), is detected at the worksite in a location that can affect (e.g., diminish the quality of, prevent, etc.) the sensing of sensors 408, monitoring priority identification system 334 can identify a priority that compensates for that effect (e.g., causes the one or more drones 200 to fill in or substitute for the affected sensor(s) 408, that is, prioritizes the attributes, or area, or monitoring mode that fills in or substitutes for the affected sensor(s) 408). Priority of one or more attributes to be monitored can be determined based on performance of sensors 408, priority of one or more areas to be monitored can be determined based on performance of sensors 408, and a priority of one or more monitoring modes can be determined based performance of sensors 408. For instance, where a sensor 408 is providing feedback or sensor data indicative of error or low quality detection, monitoring priority identification system 334 can identify a priority that compensates for the impacted sensor performance (e.g., causes the drone 200 to fill in or substitute for the erroneous or low performance sensor(s) 408, that is, prioritizes the attributes, or area, or monitoring mode that fills in or substitutes for the affected sensor(s) 408). Monitoring priority identification system 334 can identify a priority of attributes, areas, or monitoring modes based on performance of sensors 208 on-board a drone 200. For instance, where a sensor 209 is providing feedback or sensor data indicative of error or low quality detection, monitoring priority identification system 334 can identify a priority that compensates for the impacted sensor performance (e.g., causes the drone 200 to again monitor the attributes, areas, or monitoring modes that were impacted by the error or low quality detection or cause another drone 200 to substitute for the erroneous or low performance sensors 208).

It will be understood that in some examples, sensor performance can be further determined based on thresholds of threshold data 507.

An order in which the one or more drones 200 monitor each attribute of a plurality of attributes to be monitored, or an order in which the one or more drones 200 monitor each area of a plurality of areas to be monitored, or an order in which the one or more drones 200 perform each monitoring mode of a plurality of monitoring modes to be performed can be determined based off a priority (e.g., monitoring or performing first the highest priority and monitoring or performing subsequently according to descending priority). The amount of time or frequency with which the one or more drones 200 monitor each attribute of a plurality of attributes to be monitored, or an order in which the one or more drones 200 monitor each area of a plurality of areas to be monitored, or an order in which the one or more drones 200 perform each monitoring mode of a plurality of monitoring modes to be performed can be determined based off a priority (e.g., spending more time monitoring or performing the higher priority attributes or monitoring modes relative to lower priority attributes or monitoring modes).

Obstruction identification system 336 is operable to identify an obstruction, and characteristics thereof, based on one or more items of data 205/305/405, such as, but not limited to, sensor data 501, operation data 502, machine data 503, and worksite data 504. For example, sensors 208 or 408 can provide sensor data indicative of the presence and location of an obstruction (e.g., a debris (e.g., dust cloud), etc.) based upon which obstruction identification system 336 can identify the type, presence, and location of the obstruction. In some examples, obstruction identification system 336 can further estimate (or predict) movement and future locations of the obstruction based on sensor data 501 or worksite data 504. For instance, obstruction identification system 336 can estimate (or predict) how an obstruction, such as a debris cloud, will move and to what future locations based on weather attributes, such as wind speed and direction. In another example, obstruction identification system 336 can estimate (or predict) how an obstruction, such as an unloading apparatus (e.g., chute 135), will move and to what future locations based on the fill level of a harvester, the fill capacity or fill level threshold, dimensions of the harvester, and the speed of the harvester. In some examples, obstruction identification system 336 can predict type, presence, and locations of obstructions, such as debris clouds, based on sensor data 501 or worksite data 504 providing weather attributes such as wind speed and direction, temperature, humidity, and dewpoint as well as providing soil attributes, such as soil moisture and soil type. As noted above, weather attributes and soil attributes can also be provided as sensor data 501 Further, in some examples, obstruction identification system 336 can predict type, presence, and locations of obstructions, such as debris clouds, based further on operation data 502 indicative of the type of operation being performed and machine data 503 indicative of the configuration and dimensions of the machine 100. The travel of each of one or more drones 200 can be controlled based on an identified and/or predicted obstruction, and characteristics thereof. For example, the position or location of each of one or more drones 200 can be controlled to account for the obstruction such that the one or more drones 200 can monitor the attributes, areas, or modes accounting for the obstruction (i.e., the one or more drones 200 can be positioned such that the obstruction does not interfere with the desired monitoring). The monitoring sequence (the order of attributes, areas, or modes monitored and the amount of time spent monitoring each attribute, each area, or each mode) can be controlled to account for the obstruction such that the one or more drones 200 can monitor the attributes, areas, or modes accounting for the obstruction (i.e., the order or amount of time can be adjusted to prevent the obstruction from interfering with operation of the machine 100).

Attribute and area location identification system 338 is operable to identify the locations of the attributes or areas to be monitored based on the identifications of monitoring mode identification system 332 (e.g., identified monitoring mode, identified areas to be monitored, or identified attributes to be monitored) as well as sensor data 501 or operation data 502, or both, indicative of a location and heading of the work machine 100. In addition to identifying locations of the attributes or areas, attribute and area location identification system 338 can identify a location of measurement areas corresponding to the attributes or areas based on various data, such as sensor data 501 indicative of a travel speed of the machine 100, machine data 503 indicative of a latency of the machine 100, operation data 502 indicative the type of operation being performed by the machine 100, or based on the identified attributes or areas. As an example, monitoring mode identification system 332 can identify an area, attributes, or mode that requires monitoring ahead of the machine 100. Attribute and area location identification system 338 can identify the locations of the attributes or areas as being locations ahead of the machine 100. Further, attribute and area location identification system 338 can identify a measurement area that is spaced ahead of the machine by a given distance based on the travel speed of the machine 100 and the latency of the machine 100 such that attributes are detected and transmitted in a sufficient manner to allow for proactive control of the machine 100 relative to the latency and travel speed of the machine 100. Still further, attribute and area location identification system 338 can identify a measurement area that maximizes the resolution of the sensor data while still allowing for detection of the necessary attributes for control. For instance, a UAV 200-1 could be flown high and detect a larger area ahead of the machine 100, however, the resolution of the sensor data, and thus, potentially, the accuracy of the sensor data may be less than the resolution and accuracy of sensor data resulting from smaller measurement area (e.g., where the UAV 200-1 is positioned lower). Additionally, detecting only the amount of area or attributes necessary for a given control cycle, or at least detecting a relatively smaller area, can reduce the complexity or load of processing on the resultant sensor data. Additionally, it will be understood that the measurement area can be varied by attribute and area location identification system 338 based on the attributes to be detected. For instance, a measurement area can be smaller where monitoring mode identification system 332 identifies less attributes or areas to be monitored than when monitoring mode identification system 332 identifies more attributes or areas to be monitored. Additionally, it is not necessarily or not only the quantity of attributes or areas that can affect the result measurement area, but also the locations of the attributes or areas relative to one another. The travel of each of one or more drones 200 can be controlled based on the locations and measurement areas identified by attribute and area location identification system 338 can be used.

Sensor selection and configuration identification system 340 is operable to identify one or more sensors of sensors 208 to be utilized on each of one or more drones 200 as the one or more drones 200 monitor. Additionally, sensor selection and configuration identification system is operable to identify a configuration (e.g., settings) of each of the identified sensors 208, for instance a position, an orientation, a field of view, a frequency spectrum, as well as other configuration characteristics (or settings). In some examples, for each travel path, sensor selection and configuration identification system 340 can identify a respective set of one or more sensors 208 (as well as a configuration for each of the one or more sensors 208) for each monitoring location in the travel path. Sensor selection and configuration identification system 340 can identify the sensors 208 and configurations based on identifications of monitoring mode identification system 332 (e.g., identified monitoring mode, identified areas to be monitored, or identified attributes to be monitored). For example, the type of attributes to be detected can be determinative of the type of sensors 208 and configurations to be utilized. For instance, when topography ahead of the machine 100 is to be detected, lidar or radar (and select configurations thereof) may be preferable whereas when plant characteristics ahead of the machine 100 are to be detected a camera (and a select configuration thereof) may be preferable. Additionally, the area to be detected can be determinative of the type of sensors 208 and configurations to be utilized. For example, in some instances, when detecting ahead of the machine 100, it may be preferable to utilize radar or lidar (and select configurations thereof) as compared to a camera (and a select configuration thereof) as radar and lidar are operable to detect through the canopy of the still standing crop ahead of the machine 100 whereas a view of a camera can be obstructed by the canopy. In another example, in some instances, when detecting behind the machine 100 or behind a component of the machine 100 (e.g., behind a header), a camera (and a select configuration thereof) may be preferable, as compared to radar or lidar (and select configurations thereof), as images captured by a camera may provide more detail than the sensor data of radar or lidar. Additionally, sensor selection and configuration identification system 340 is operable to identify one or more sensors of sensors 208 and configurations based on obstructions, and characteristics thereof, as identified by obstruction identification system 336. For example, one type of sensor (e.g., radar), and a select configuration thereof, may be better suited to detect through an obstruction than another type of sensor (e.g., lidar, camera, etc.), and a select configuration thereof. Additionally, sensor selection and configuration identification system 340 is operable to identify one or more sensors of sensors 208 and configurations based on other attributes at the worksite (e.g., as indicated by sensor data 501 or worksite data 504). For example, one type of sensor 208, and a select configuration thereof, may be preferable over another type of sensor 208, and a select configuration thereof, depending on other attributes of the worksite. For instance, depending on the presence, type, and level of precipitation at the worksite, one type of sensor, and a select configuration thereof, may be preferable over another type of sensor (e.g., radar may be preferred over lidar during rain), and a select configuration thereof.

Sensor selections and configurations can be provided, as a monitoring output 360, to one or more items of system 500, including control system 214. A controller 235 (e.g., a sensor configuration controller 235) can control sensor configuration subsystem 253 to control the activation and deactivation of sensors 208 and the configurations (e.g., settings) of sensors 208 according to the sensor selections and configurations. Each monitoring location in a travel plan may have a respective set of one or more sensors 208 to be utilized, as well as their respective configuration, as identified by sensor selection and configuration identification system 340, and sensor configuration subsystem 253 can be controlled accordingly.

Travel plan system 342 is operable to generate travel plans for each of one or more drones 200 based on identifications of monitoring mode identification system 332, monitoring priority identification system 334, obstruction identification system 336, attribute and area location identification system 338 as well as one or more of sensor data 501, operation data 502, machine data 503, worksite data 504, priority data 505, monitoring selection data 506, threshold data 507, or other data 510. A travel plan includes one or more monitoring locations, a travel path that guides a drone to and between the monitoring locations as well as positioning settings (e.g., altitude in the case of UAVs, orientation, etc.) along the path and at the monitoring locations, as well as a monitoring sequence. Monitoring locations are locations at which one or more drones 200 are to be positioned to monitor one or more attributes or areas. In some examples, a monitoring location is referenced to a machine 100 (e.g., a location relative to a machine 100). In some examples, a monitoring location is referenced to the worksite (e.g., a location relative to the worksite). A travel path is a travel route along which a drone 200 is to travel to a monitoring location and between monitoring locations and can also include positioning settings (e.g., altitude in the case of UAVs, orientation, etc.) along the path and at the monitoring locations. In some examples, a travel path can be generated based on machine data 503, such as machine dimensions as well as obstructions (e.g., chute 135, etc.), such that the drone 200 or, if present, the tether 162, or both, do not become entangled with the machine 100 or the obstructions. Additionally, it will be understood that, in some examples, a travel path could instruct a drone 200 to maintain a longitude and latitude to change a position relative to the machine 100 and to arrive at a monitoring location (i.e., maintain a latitude and longitude and wait for machine 100 to change position). Additionally, it will be understood that, in some examples, a travel path 200 could instruct a drone 200 to change (briefly) speed or (in the case of a UAV 200-1) altitude, or both, to change position relative to the machine and to arrive at a monitoring location. Additionally, it will be understood that a travel path can instruct a drone 200 to match a speed of the machine 100 to maintain a position at a monitoring location. A monitoring sequence indicates an order in which monitoring locations are to be traveled to by the one or more drones 200 as well as duration of time that the one or more drones 200 are to spend at each monitoring location.

Location logic 350 is operable to identify one or more monitoring locations for each travel plan generated by travel plan system 342 based on identifications of monitoring mode identification system 332, monitoring priority identification system 334, obstruction identification system 336, attribute and area location identification system 338 as well as one or more of sensor data 501, operation data 502, machine data 503, worksite data 504, priority data 505, monitoring selection data 506, threshold data 507, or other data 510. For example, based on the attributes or areas to be detected (e.g., as indicated by monitoring mode identification system 332) and the locations of the attributes or areas (e.g., as indicated by monitoring location identification system 338) location logic 350 is operable to identify one or more monitoring locations to position one or more drones 200 to detect the attributes or areas to be detected. Additionally, location logic 350 can identify the monitoring locations to account for obstructions (e.g., as indicated by obstruction identification system 336), that is, to identify monitoring locations that position one or more drones to be able to detect the attributes or areas in spite of the obstructions. Additionally, location logic 350 can identify the monitoring locations based on machine data 503, such as machine data indicative of dimensions of a machine 100 and positions of components of machine 100, and worksite data 504, such as worksite data indicative of locations and dimensions of worksite features. In some examples, the locations can be identified based on machine data 503, such as machine dimensions as well as obstructions (e.g., chute 135, etc.), such that the drone 200 (or, if present, the tether 162) do not become entangled with the machine 100 or the obstructions. Additionally, location logic 350 can identify the monitoring locations based on one or more of a variety of other identifications or data.

Sequence logic 352 is operable to identify a monitoring sequence for each travel plan generated by travel plan system 342 based on the monitoring locations identified by location logic 350, priorities identified by monitoring priority identification system 334, obstructions identified by obstruction identification system 336 as well as one or more of sensor data 501, operation data 502, machine data 503, worksite data 504, priority data 505, monitoring selection data 506, threshold data 507, or other data 510. For example, sequence logic 352 is operable to identify a monitoring sequence for a given set of one or more monitoring locations identified by location logic 350 and based on a priority identified by monitoring priority identification system 334. For example, a sequence can cause one or more drones 200 to travel to monitoring locations according to the priority of the attributes or areas to which each monitoring location corresponds (e.g., travel first to the highest priority and travel to each subsequent monitoring locations in order of descending priority). Additionally, a sequence can cause one or more drones 200 to spend more time at a monitoring location, relative to another monitoring location, based on the priority of the attributes or areas to which each monitoring location corresponds (e.g., spend more time at higher priority monitoring locations than at a lower priority locations). It will be understood that a sequence can be disjointed.

For example, for a given travel plan, there could be four monitoring locations (1, 2, 3, and 4). In the example, location 1 has the highest priority, location 2 has a second highest priority, location 3 has the third highest priority, and location 4 has the fourth highest (or lowest) priority. In one example, the sequence could be in descending order of priority going first to location 1, then to location 2, then to location 3, and then to location 4, and then starting the cycle over by going back to location 1. The UAV 200 could be controlled to spend a different amount of time at each location (e.g., more time at the higher priority locations) For instance, 10 seconds at location 1, 8 seconds at location 2, 6 seconds at location 3, and 4 seconds at location 4 for each cycle. Or, in other examples, a duration at each location could be the same, or a duration at only one of the locations is different. In other examples, the sequence could be in a disjointed order. For instance, keeping with the same 4 locations discussed above, the sequence could be to travel first to location 1, then to location 2, then back to location 1, then to location 3, then back to location 1, and then to location 4, and then back to location 1 to start the cycle over. The duration at each location could be the same for each time the one or more drones 200 are positioned there, but the higher priority location will have a higher total duration due to the frequency with which the one or more drone 200 are controlled to travel there during the sequence. Alternatively, the durations could all be different, or the durations of some could be different and the durations of others could be the same. In other examples, a lower priority monitoring location could be visited first. For instance, keeping with the same 4 locations, the one or more drones 200 could be controlled to travel first to location 3, then to location 1, then to location 2, then to location 4, and then back to 3 to start the cycle over.

A lower priority location can be visited first to account for attributes at the worksite, such as obstructions. For instance, keeping with the 4 locations above, a sequence could cause one or more drones 200 to travel first to one or more of locations 2, 3, or 4 before traveling to location 1 to account for an obstruction that would affect detection at monitoring location 1. For example, suppose an obstruction, such as the extended chute 135 of a harvester 100-1 will be present for a limited amount of time (e.g., during the duration of an unloading operation) that would interfere with detection at location 1, the one or more drones 200 could be controlled to travel first to one or more of locations 2, 3, or 4, before traveling to location 1, for instance, waiting to travel to location 1 until the chute 135 is retracted (e.g., once the unloading operation is ended). In another example, suppose an obstruction, such as a debris cloud, would interfere with detection at location but only for a given amount of time (e.g., given the travel direction of the machine 100 and the wind direction), the one or more drones 200 could be controlled to travel first one or more of locations 2, 3, or 4, before traveling to location 1, for instance, waiting to travel to location 1 until the debris cloud no longer interferes with detection at location 1 (e.g., when the travel direction of the machine 100 has changed or perhaps, when the wind direction has changed). These are merely some examples. Of course, it will also be understood, as explained above, that the monitoring locations could instead be changed to account for attributes at the worksite, such as obstructions.

Further, it will be understood that each monitoring location may be associated with a plurality of attributes (i.e., a plurality of attributes can be detected at each monitoring location). As an example, a monitoring location can be associated with two attributes. One attribute May have a high priority and the other attribute may have a lower priority. In some examples, the drone can be controlled to travel to the monitoring location and detect both attributes (even though one has a lower priority than another attribute at another monitoring location) as it may be more efficient to detect all (or a plurality) of the attributes associated with the monitoring location while the drone 200 is there. In other examples, the drone 200 could be controlled to travel to the monitoring location and detect the higher priority attribute, then travel to one or more other monitoring locations to detect other attributes associated with the one or more other monitoring locations, and then controlled to travel back to the monitoring location to detect the lower priority attribute. The duration that the drone 200 spends at each monitoring location can be controlled based on the number of attributes to be detected at each monitoring location.

Additionally, it will be understood that each travel plan could have multiple sequences, for instance, keeping with the same 4 locations, a first sequence that causes the one or more drones 200 to travel to location 1, then to location 2, then to location 3, then to location 4, with an associated duration for each location, and then a second sequence causing the one or more drones 200 to travel to location 1, then to location 2, then back to location 1, then to location 3, then back to location 1, and then to location 4, with an associated duration for each location which may be different or the same as the durations of sequence 1. Multiple sequences can be used to account for variables at the worksite, as indicated by data 205/305/405, or based on dynamically shifting priorities.

These are merely some examples. As can be seen, sequence logic 352 can identify a sequence identifying an order in which monitoring locations are visited or identifying an order in which attributes are detected as well as a duration that the UAV 200 spends at each monitoring location (both a total duration and a duration for each visit) or spend detecting each attribute. Further, as can be seen, sequence logic 352 can identify multiple different sequences for a travel plan, and further, that a sequence can be adjusted or generated dynamically. As can be seen, sequence logic 352 can identify the order and the durations based on priorities. Further, as can be seen, sequence logic 352 can identify the order and the durations based on obstructions.

Path logic 354 is operable to identify a travel path or route to and between monitoring locations for each travel plan generate by travel plan system 342 based on the monitoring locations identified by location logic 350, the sequence(s) identified by sequence logic 352, obstructions identified by obstruction identification system 336 as well as one or more of sensor data 501, operation data 502, machine data 503, worksite data 504, priority data 505, monitoring selection data 506, threshold data 507, or other data 510. For example, the travel path can take into account dimensions of a machine 100, location of components of a machine 100 (e.g., open grain tank covers, etc.), the height or location of a surface of a grain pile on-board a harvester, obstructions, locations and dimensions of field features, as well as various other identifications and data to avoid collision between one or more drones 200 and other items.

Each travel plan, including the monitoring locations, the sequence(s), and the travel path, can be provided, as a monitoring output 360, to one or more items of system 500, including, control system 214. A controller 235 (e.g., a travel controller 235) can control travel subsystem 252 to control the travel and positioning of a drone 200 according to the travel plan (e.g., to travel to, to desirably position at the monitoring location, and to maintain desired positioning at monitoring locations according to the sequence(s) and travel path). When a monitoring location is a location relative to a machine 100, it will be understood that the travel subsystem 352 can be controlled to maintain a drone 200 at the monitoring location relative to the machine 100 even while the machine 100 is moving.

Attribute and performance identification system 344 is operable to identify one or more attributes and one or more performance metrics based on at least one of sensor data 501, worksite data 504, or threshold data 507. In some examples, attribute and performance identification system 344 utilized the processed sensor data 501 or processed worksite data 504, or both.

For example, attribute and performance identification system 344 is operable to identify one or more attributes or values associated with the one or more attributes, or both, based on at least one of sensor data 501 (or processed sensor data 501) or worksite data 504 (or processed worksite data 504) as well, in some examples, based on thresholds of threshold data 507. As an example, but not by limitation, attribute and performance identification system 344 can identify machine operating effect attributes (e.g., smoke or smoke attributes, temperature or temperature attributes, or material accumulation or material accumulation attributes) based on sensor data 501 (or processed sensor data 501). For example, one or more drones 200 can capture machine operating effect sensor data (e.g., an image of machine operating effect attribute(s)) and attribute and performance identification system 344 can identify machine operating effect attribute(s) in the image. In another example, one or more drones 200 can capture machine operating effect sensor data (e.g. an image or other sensor data of attribute(s) indicative of machine operating effect attributes) and attribute and performance identification system 344 can identify machine operating effect attributes based on a comparison of the attribute indicative of a machine operating effect attribute to a corresponding threshold. Machine operating effect attribute detection is used merely as one example. Similar functionality can be used by attribute and performance identification system 344 for the identification of various other attributes and/or values associated therewith.

Additionally, attribute and performance identification system 344 is operable to identify one or more performance metrics (e.g., job quality, header performance, etc.) based on detected attributes and/or values thereof associated with the given performance. For example, with regard to job quality, spectral attributes (e.g., color, etc.), and values thereof, associated with the detected ground (in the case of tillage job quality) or associated with the detected material output by the residue subsystem (in the case of harvesting performance) can be used by attribute and performance identification system 344 to generate a job quality performance metric which can be an aggregation of the individual attributes, or values thereof, associated with the given performance. In other examples, the job quality performance metric can be an individualized (or itemized) listing of each of the different associated attributes, and values thereof. In some examples, attribute and performance identification system 344 can output both an aggregated metric and an individualized (itemized) list. Similarly, with regard to header performance, associated attributes of header performance (e.g., cutting attributes (e.g., cut height, cut variability (e.g., missed crop, pushed crop, pushed soil, etc.), etc.), material flow, grain loss, etc.), and values thereof, can be used by attribute and performance identification system 344 to generate a header performance quality metric which can be an aggregation of the individual attributes, or values thereof, associated with header performance. In other examples, the header performance metric can be an individualized (or itemized) listing of each of the different associated attributes, and values thereof. In some examples, attribute and performance identification system 344 can output both an aggregated metric and an individualized (itemized) list.

Header performance and job quality performance are merely some examples. It will be understood that attribute and performance identification system 344 can function similarly to output various other performance metrics for different types of performances.

Presentation generator system 345 is operable to generate one or more presentations (e.g., displays, etc.) for presentation (e.g., display, etc.) on one or more interface mechanisms (e.g., one or more of 218, 418, or 364). The presentations can include display portions showing sensor data (e.g., images) captures by sensors (e.g., 208, 408), computer generated display portions showing machine representations or worksite representations, or both, and attribute indicators (the attribute indicators can be located on the machine representations or worksite representations to indicate the locations of the attributes relative to the worksite or relative to a work machine), and attribute display portions indicating detected attributes and associated values. One example of a presentation generated by presentation generator system 345 is graphical user interface 802 (machine operating effect graphical user interface) shown in FIG. 14.

It can be seen that system 235 is operable to generate one or more monitoring outputs 360. A monitoring output 360 can include one or more of one or more travel plans (each including one or monitoring locations, one or more sequences, and one or more travel paths), one or more monitoring mode identifications, one or more monitoring priority identifications, one or more obstruction identifications, one or more monitoring location identifications, one or more sensor selection identifications, one or more attribute identifications, one or more performance identifications, one or more presentations, or one or more other items. A monitoring output 360 can be used in the control of one or more mobile work machines (e.g., one or more work machines and one or more drones 200). For example, a monitoring output 360 can be obtained (e.g., retrieved or received) by one or more control systems 414 to control one or more work machines 100 (e.g., one or more controllable subsystems 416, etc.) and by one or more control systems 214 to control one or more drones 200 (e.g., one or more controllable subsystems 216, etc.). Additionally, or alternatively, a monitoring output 360 can be presented to one or more operators or one or more users, or both. For example, a monitoring output 360 can be obtained (e.g., retrieved or received) by one or more control systems 414 to control one or more interface mechanisms 418 to present (e.g., display, etc.) information of (or based on) the monitoring output 360 to one or more operators 361 of one or more work machines 100 and by one or more control systems 214 to control one or more interface mechanisms 218 to present (e.g., display, etc.) information of (or based on) the monitoring output 360 to one or more operators 361 of one or more drones 200. Additionally, or alternatively, a monitoring output 360 can be obtained (e.g., retrieved or received) by various other items and used in various other ways. For example, but not by limitation, a harvesting logistics output 360 can be obtained (e.g., retrieved or received) by one or more other items 367, such as one or more interface mechanisms 364 which can present (e.g., display, etc.) information of (or based on) the monitoring output 360 to one or more users 366.

Figure 6A:
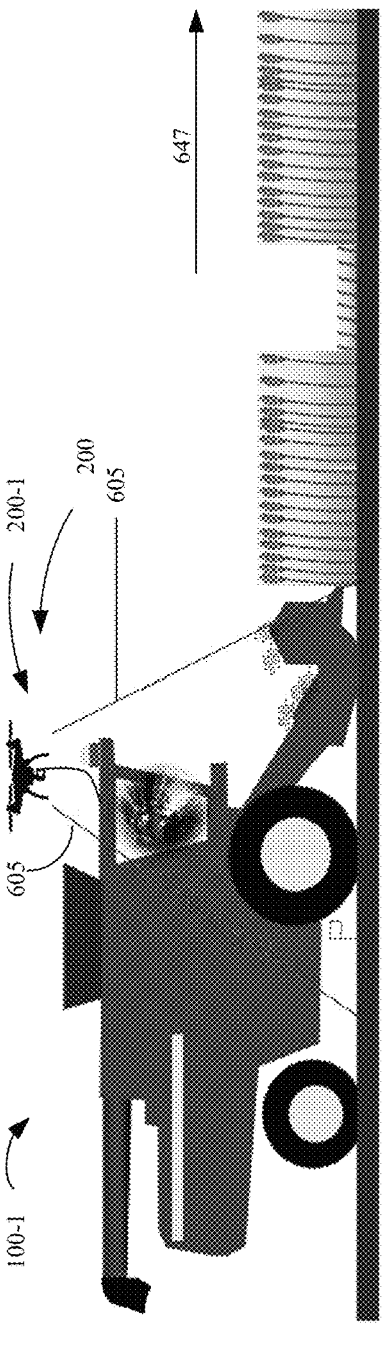
FIGS. 6A, 6B, and 6C are pictorial illustrations illustrating example monitoring operations of the agricultural system architecture.
Figure 6B:
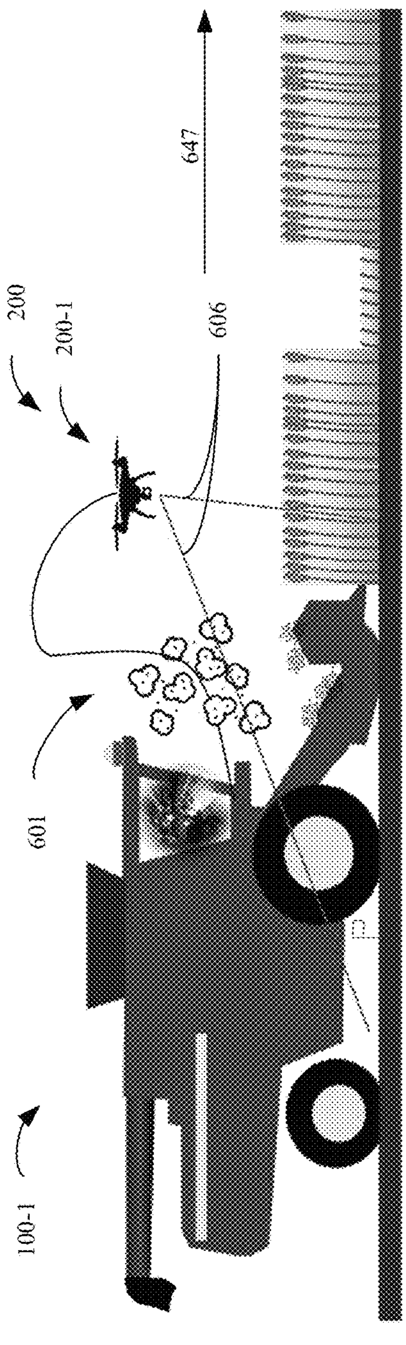
Figure 6C:
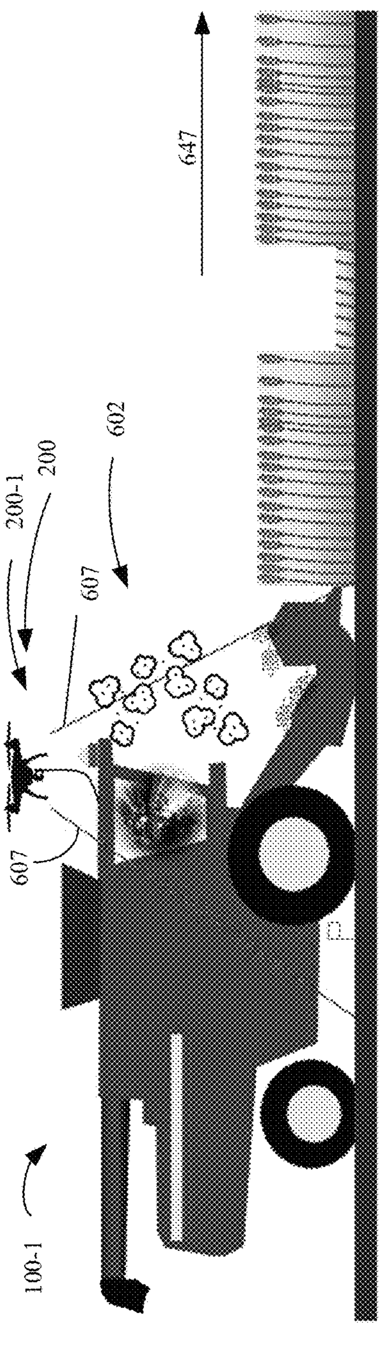

FIGS. 6A, 6B, and 6C are pictorial illustrations showing example operations of system 500 in performing monitoring at a worksite. In the illustrated examples of FIGS. 6A, 6B, and 6C, a drone 200 (illustratively a UAV 200-1) is controlled to perform header performance monitoring of a header of a work machine 100 (illustratively a harvester 100-1) as the work machine 100 operates at a worksite. FIGS. 6A, 6B, 6C show examples of a header performance monitoring mode. In the illustrated examples, work machine 100 is traveling North at the worksite, as indicated by arrow 647.

In FIG. 6A, it can be seen that monitoring system 235 generates a travel plan that positions the UAV above machine 100 to detect attributes in a measurement area that extends from the front of the header (e.g., from the cutter bar of the header) or an area on the ground in front of the header, between the sides of the header, and to an area on the ground behind a front axle (or front wheels) of the work machine 100, such as to an area on the ground behind a centerline of the front axle (or front wheels). As the header can be wider than the width of the axle or the width from front wheel to front wheel, the measurement area detected can have a width corresponding to the width of the header. The measurement area is illustratively indicated by lines 605. It can be seen in FIG. 6A that the UAV detects down towards the ground. The UAV 200-1 will detect attributes associated with header performance and monitoring system 235 can generate outputs 360 indicative of header performance, which can be used in the control of work machine 100, such as to control settings of the header or of one or more components of the header.

In the example of FIG. 6B, an obstruction 601 (illustratively a debris cloud) is identified by monitoring system 235. Monitoring system 235 further identifies future locations of the obstruction 601, based, at least, on one or more weather attributes (e.g., wind direction and speed). In the illustrated example of FIG. 6B, the wind direction is South. Thus, monitoring system 235 generates a travel plan that positions the UAV at a distance in front of machine 100, to account for the obstruction 601, to detect attributes in a measurement area from the front of the header (e.g., from the cutter bar of the header) or an area on the ground in front of the header to an area on the ground behind a front axle (or front wheels) of the work machine 100. The measurement area is illustratively indicated by lines 606. It can be seen in FIG. 6B that the UAV detects down towards the ground and back towards the machine 100. The UAV will detect attributes associated with header performance and monitoring system 235 can generate outputs 360 indicative of header performance, which can be used in the control of work machine 100, such as to control settings of the header or of one or more components of the header.

In the example of FIG. 6C, an obstruction 602 (illustratively a debris cloud) is identified by monitoring system 235. Monitoring system 235 further identifies future locations of the obstruction 602, based, at least, on one or more weather attributes (e.g., wind direction and speed). In the illustrated example of FIG. 6C, the wind direction is West. Thus, monitoring system generates a travel plan that positions the UAV above and to the right (or East) of machine 100, to account for the obstruction 602, to detect attributes in a measurement area from the front of the header (e.g., from the cutter bar of the header) or an area on the ground in front of the header to an area on the ground behind a front axle (or front wheels) of the work machine 100. The measurement area is illustratively indicated by lines 607. It can be seen in FIG. 6C that the UAV detects down towards the ground and slightly westward 100. The UAV will detect attributes associated with header performance and monitoring system 235 can generate outputs 360 indicative of header performance, which can be used in the control of work machine 100, such as to control settings of the header or of one or more components of the header.

Additionally, while the examples shown in FIGS. 6A, 6B, and 6C show a UAV 200-1 performing the header performance monitoring, in other examples, one or more drones 200 (e.g., one or more UAVs 200-1 or one or more UGVs 200-2, or both) could be controlled to perform the header performance monitoring.

Figure 7A:
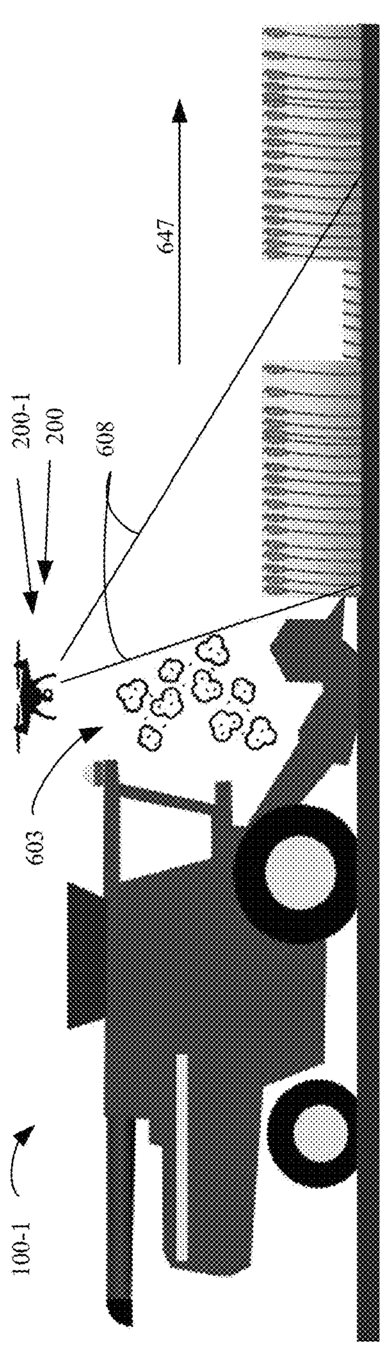
FIGS. 7A, 7B, and 7C are pictorial illustrations illustrating example monitoring operations of the agricultural system architecture.
Figure 7B:
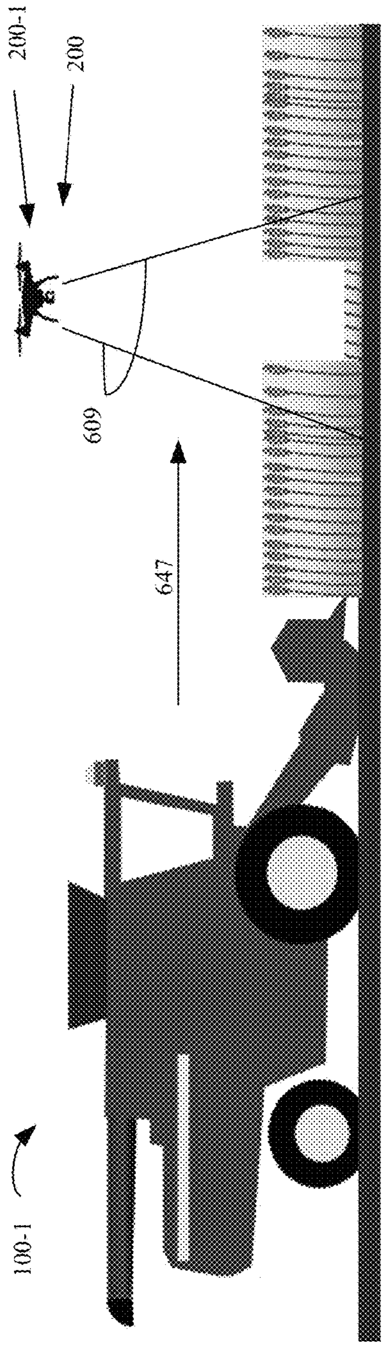
Figure 7C:
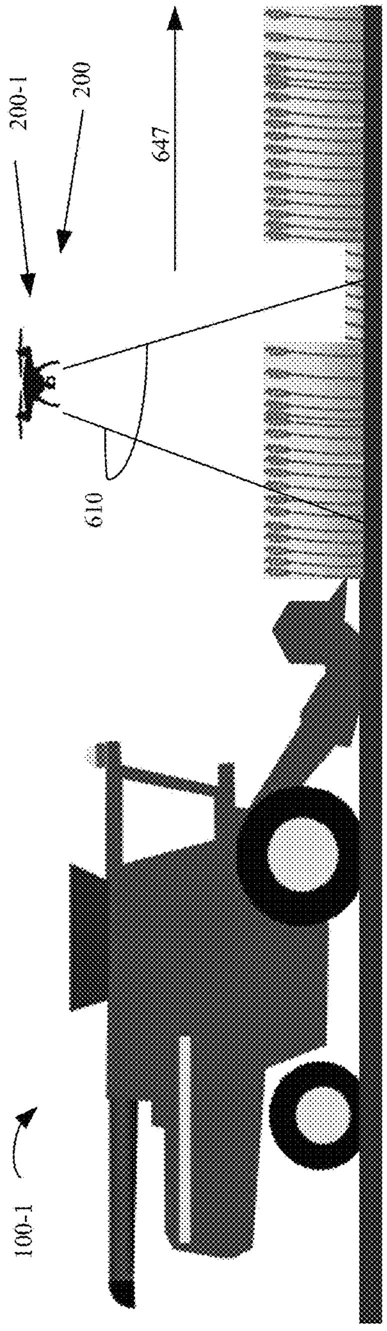

FIGS. 7A, 7B, and 7C are pictorial illustrations showing example operations of system 500 in performing monitoring at a worksite. In the illustrated examples of FIGS. 7A, 7B, and 7C, a drone 200 (illustratively a UAV 200-1) is controlled to perform monitoring forward or ahead of a work machine 100 (illustratively a harvester 100-1) as the work machine 100 operates at a worksite. FIGS. 7A, 7B, and 7C show examples of a forward monitoring mode. In the illustrated examples, work machine 100 is traveling North at the worksite, as indicated by arrow 647.

In FIG. 7A it can be seen that an obstruction 603 (illustratively a debris cloud) is identified by monitoring system 235. Monitoring system 235 further identifies that the obstruction 603 is causing poor performance of sensors 408 on-board the machine 100 (i.e., interfering with sensors 408 detection of attributes ahead of the machine 100). Thus, monitoring system 235 generates a travel plan that positions the UAV above and forward (or North) of the machine 100, to account for the obstruction, to detect attributes in a measurement area forward of the machine 100. The measurement area is illustratively indicated by lines 608. It can be seen in FIG. 7A that the UAV detects down and forward. The UAV will detect attributes and monitoring system 235 can generate outputs 360 indicative of the detected attributes, which can be used in the control of work machine 100, such as to adjust the position of the header.

In FIG. 7B, monitoring system 235 identifies poor performance of sensors 408 on-board the machine 100 in detecting topography of the worksite ahead of the machine 100 (e.g., due to interference from the crop stand given the angular position of the sensors 408 on-board harvester 100). Thus, monitoring system 235 generates a travel plan that positions the UAV above and forward (or North) of the machine 100 to detect topography in a measurement area forward of the machine 100. The travel plan takes into account the travel speed and latency of the machine such that topography can be measured and provided with sufficient time to proactively control the machine 100. The measurement area is illustratively identified by lines 609. It can be seen in FIG. 7B that the UAV detects down toward the ground. The UAV will detect topography and monitoring system 235 can generate outputs 360 indicative of the detected topography, which can be used in the control of work machine 100, such as to adjust the position of the header.

FIG. 7C is similar to FIG. 7B, except that FIG. 7C illustrates an example where the travel speed or latency, or both, of machine 100 are different (slower travel speed or lower latency, or both, in the illustrated example of FIG. 6C) than in the example of FIG. 7B. Thus, the travel plan generated by monitoring system 235 positions the UAV above and forward (or North) of the machine 100 to detect topography in a measurement area forward of the machine 100. The travel plan takes into account the travel speed and latency of the machine 100 such that topography can be measured and provided with sufficient time to proactively control the machine 100. Given the reduced travel speed or reduced latency, or both, of machine 100 in FIG. 7C (as compared to machine 100 in FIG. 7B) it can be seen that the UAV is positioned closer to the machine 100 (or not as far north from the machine 100). The measurement area is illustratively identified by lines 610. It can be seen in FIG. 7C that the UAV detects down toward the ground. The UAV will detect topography and monitoring system 235 can generate outputs 360 indicative of the detected topography, which can be used in the control of work machine 100, such as to adjust the position of the header.

Additionally, while the examples shown in FIGS. 7A, 7B, and 7C show a UAV 200-1 performing the forward monitoring, in other examples, one or more drones 200 (e.g., one or more UAVs 200-1 or one or more UGVs 200-2, or both) could be controlled to perform the forward monitoring.

Figure 8B:
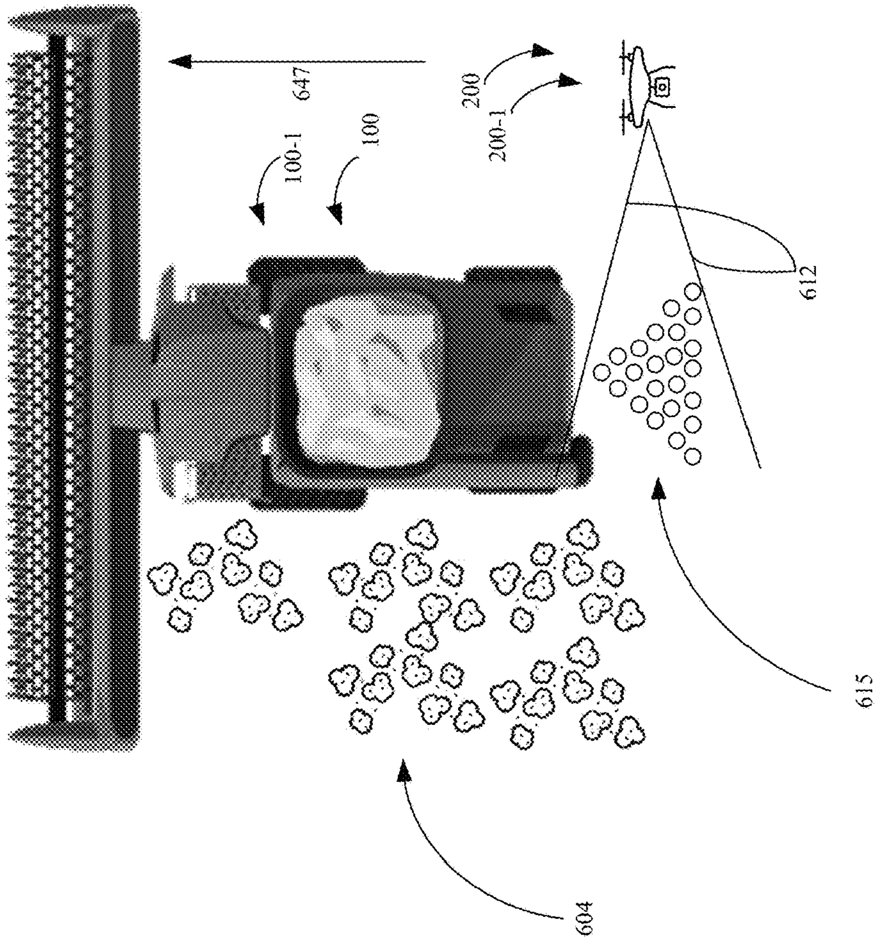
FIGS. 8A and 8B are pictorial illustrations illustrating example monitoring operations of the agricultural system architecture.
Figure 8A:
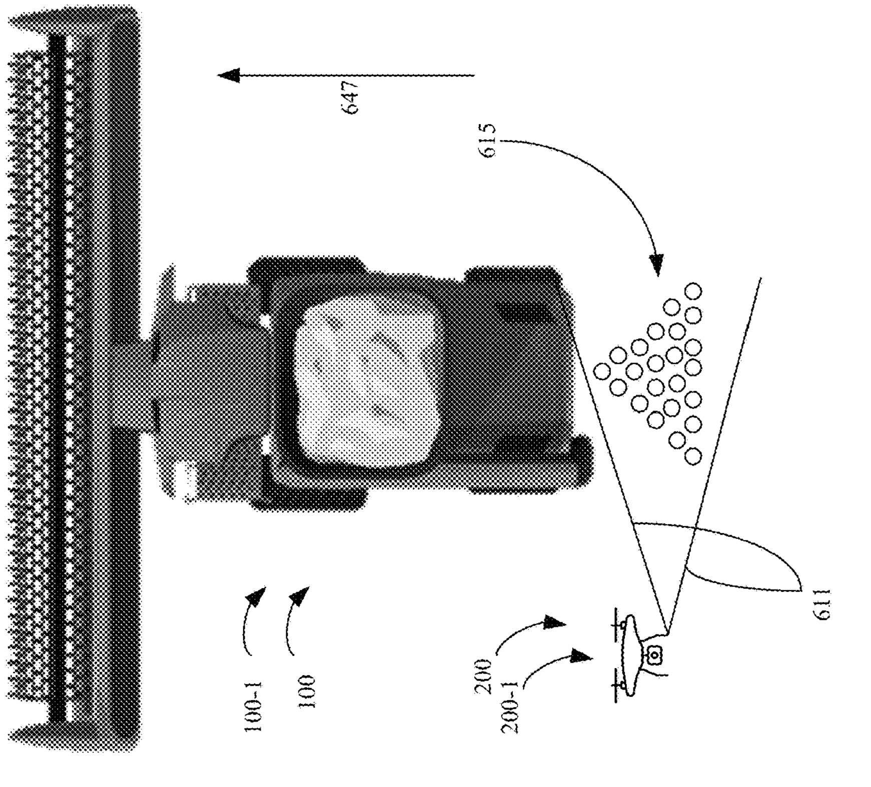

FIGS. 8A and 8B are pictorial illustrations showing example operations of system 500 in performing monitoring at a worksite. In the illustrated examples of FIGS. 8A and 8B, a drone 200 (illustratively a UAV 200-1) is controlled to perform monitoring rearward of a work machine 100 or job quality monitoring of a machine 100 as the work machine 100 operates at a worksite. FIGS. 8A and 8B show examples of a rearward (or job quality) monitoring mode. The work machine 100 in FIGS. 8A and 8B is illustratively a harvester 100-1. In the illustrated examples, work machine 100 is traveling North at the worksite, as indicated by arrow 647.

In the illustrated examples of FIGS. 8A and 8B the UAV is monitoring job quality by monitoring material 615 output by the residue subsystem of the machine 100. This can include detecting attributes such as material spread and grain loss (e.g., grain intermixed with residue). Thus, monitoring system 235 generates a travel plan that positions the UAV to detect the attributes of the material 615.

In the example shown in FIG. 8A, the travel plan positions the UAV above and to the left (or West of) the machine 100 (though other positions are also contemplated) to detect attributes of the material 615 in the measurement area indicated by lines 611. The UAV will detect attributes of the material 615 and monitoring system 235 can generate outputs 360 indicative of the detected attributes of the material 615, which can be used in the control of work machine 100, for instance, to adjust settings of the residue subsystem or the chopper to adjust material spread, or to adjust cleaning, threshing, or separating settings to reduce the amount of grain loss.

In the example shown in FIG. 8B, monitoring system 235 has identified an obstruction 604 (illustratively a debris cloud). Monitoring system 235 further identifies future locations of the obstruction 604 based, at least, on one or more weather attributes (e.g., wind direction and speed). In the illustrated example of FIG. 8B, the wind direction is South by Southwest. Thus, monitoring system 235 generates a travel plan that positions the UAV above and to the right (or East of) the machine 100 (though other positions are also contemplated) to account for the obstruction 604, and to detect attributes of the material 615 in the measurement area indicated by lines 612. The UAV will detect attributes of the material 615 and monitoring system 235 can generate outputs 360 indicative of the detected attributes of the material 615, which can be used in the control of work machine 100, for instance, to adjust settings of the spreader or the chopper to adjust material spread, or to adjust cleaning, threshing, or separating settings to reduce the amount of grain loss.

It will be understood that a debris cloud is merely one example of an obstruction 404. In other examples a different type of obstruction can be present at the worksite. For example, as previously discussed, the chute of the harvester could be deployed (extending to the left or West of the machine in FIG. 8B) and thus, the travel plan would position the UAV to account for the deployed chute.

Additionally, it will be understood that monitoring the material expelled by the harvester is merely one example of job quality monitoring. In other examples, job quality of a harvester can be detected in other ways, for example, but not by limitation, a drone 200 can be positioned to detect attributes behind the harvester or behind a component of the harvester (e.g., behind the header), such as attributes of the ground to detect damage to the soil (e.g., compaction, ruts, scrapes, etc.).

Additionally, while the examples shown in FIGS. 8A and 8B show a UAV 200-1 performing the rearward or job quality monitoring, in other examples, one or more drones 200 (e.g., one or more UAVs 200-1 or one or more UGVs 200-2, or both) could be controlled to perform the rearward or job quality monitoring.

Figure 9:
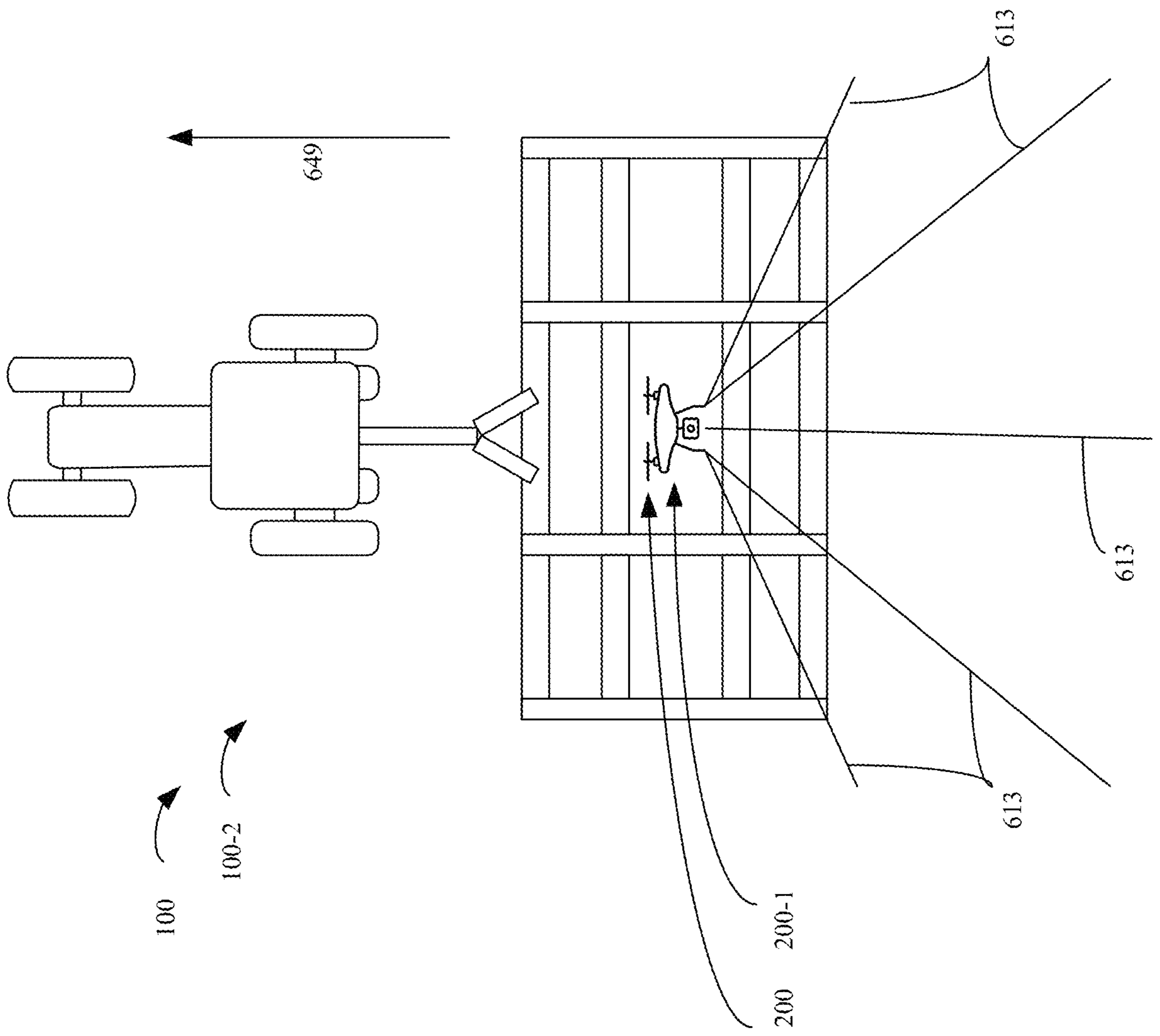
FIG. 9 is a pictorial illustration illustrating example monitoring operations of the agricultural system architecture.

FIG. 9 is a pictorial illustration showing an example operation of system 500 in performing monitoring at a worksite. In the illustrated example of FIG. 9, a drone 200 (illustratively a UAV 200-1) is controlled to perform rearward monitoring of a work machine 100 or job quality (e.g., job completeness) monitoring of a machine 100 as the work machine operates at a worksite. FIG. 9 shows an example of a rearward (or job quality) monitoring mode. The work machine 100 in FIG. 9 is illustratively a tillage machine 100-2 (including a towing vehicle and a towed tillage implement). In the illustrated example of FIG. 9, the work machine 100 is traveling in the travel direction indicated by arrow 649.

In the example shown in FIG. 9, the drone 200 is monitoring job quality (e.g., job completeness) by monitoring attributes of the ground behind the machine 100 relative to the travel direction or route of the machine (i.e., the drone 200 is monitoring ground passed over by the machine 100). This monitoring can be used by monitoring system 235 to determine the quality of the tilling (including whether tilling has occurred and how satisfactorily relative to a target level). This monitoring can include, for example, detecting spectral attributes of the ground (e.g., tilled soil can have different spectral attributes (e.g., color, etc.) than that of untilled soil) or topographic attributes of the ground (e.g., tilled soil can have different topographic attributes (e.g., height profile, surface roughness, etc.) than that of untilled soil). In some examples, the detected attributes of the ground can be compared to thresholds. In some examples, the detected attributes of the ground behind the machine 100 can be compared to detected attributes of the same ground when it was in front of the machine (i.e., before the same ground was passed over).

As can be seen in FIG. 9, the travel plan positions the UAV above the machine 100 and behind the towing vehicle (though other positions are also contemplated) to detect attributes of the ground behind the machine 100 (or attributes associated with job quality (e.g., job completeness) in the measurement area indicated by lines 613 and monitoring system 235 can generate outputs 360 indicative of job quality (e.g., job completeness), which can be used in the control of work machine 100, such as to control settings of the tillage implement or the towing vehicle, or both.

Additionally, while the example shown in FIG. 9 shows a UAV 200-1 performing the rearward or job quality monitoring, in other examples, one or more drones 200 (e.g., one or more UAVs 200-1 or one or more UGVs 200-2, or both) could be controlled to perform the rearward or job quality monitoring.

Figure 10:
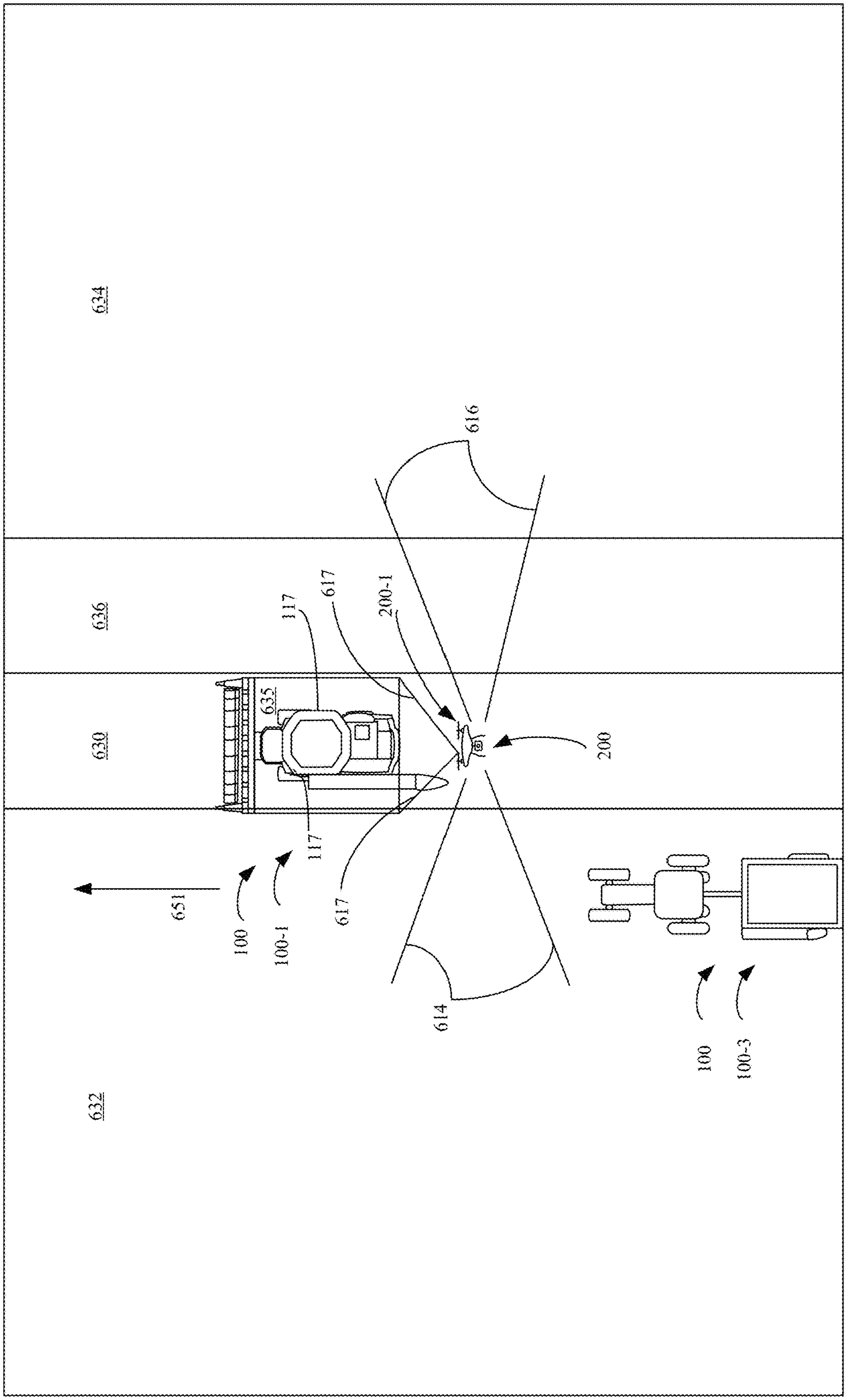
FIG. 10 is a pictorial illustration illustrating example monitoring operations of the agricultural system architecture.

FIG. 10 is a pictorial illustration showing an example operation of system 500 in performing monitoring at a worksite. In the illustrated example of FIG. 10, a drone 200 (illustratively a UAV 200-1) is controlled to perform monitoring lateral of (or lateral to) a work machine 100 (illustratively harvester 100-1) as the work machine 100 operates at a worksite. FIG. 10 shows an example of a lateral monitoring mode. In the illustrated example of FIG. 10, work machine 100-1 is traveling in the direction (North) indicated by arrow 651.

In the illustrated example of FIG. 10, the drone is monitoring attributes lateral of (or to) the work machine 100-1. This can include detecting attributes of one or more prior (e.g., already harvested) passes 632 of work machine 100-1 (as indicated by the measurement area represented by lines 614) or detecting attributes of one or more upcoming (e.g., unharvested) passes 634, which include a next pass 636, (as indicated by the measurement area represented by lines 616), as the work machine 100-1 travels along a current pass 630. Additionally, this can include detecting attributes in the current pass 630 in an area 635 extending between the edges of the implement (a header in the illustrated example) and the edge of the machine body and from an end of the implement (illustratively back end of the header) to an end of the machine (illustratively back end of the harvester). Arca 635 is lateral to the body of the machine or to the sides 117 of the machine.

In the example shown in FIG. 10, the travel plan positions the UAV 200-1 above and behind (or to the South) of the machine 100-1 (though other positions are also contemplated) to detect attributes in the measurement area indicated by lines 614 (corresponding to previous passes 632), or to detect attributes in the measurement area indicated by lines 616 (corresponding to upcoming passes 634 or a next pass 636 or both), or to detect attributes in the measurement area indicated by lines 617 (corresponding to area 635), or a combination thereof. In the illustrated example, the UAV 200-1 will detect attributes in one or more previous passes 632, in one or more upcoming passes 634 (including 636), or in area 635, or a combination thereof, and monitoring system 235 can generate outputs 360 indicative of the detected attributes of the one or more previous passes 632, indicative of the detected attributes of the one or more upcoming passes 634 (including 636), or indicative of the detected attributes of the area 635, or a combination thereof, which can be used in the control of a work machine 100. For example, detected attributes of a previous pass 632 can be used to control a work machine 100, such as a support machine 100-3 (illustratively a material receiving machine, in the form of a mobile grain cart, including a towing vehicle and a towed material cart/trailer) that is to travel on the previous pass to rendezvous with the harvester 100-1 to receive harvested material from the harvester 100-1. Additionally, detected attributes of a previous pass 632 can be used to control the harvester 100-1 on the current pass 630, such as to adjust various settings of the harvester 100-1. Detected attributes of an upcoming pass 634 (including a next pass 636) can be used to control a work machine, for instance, to control a harvester 100-1 proactively as it travels along an upcoming pass 634, such as a next pass 636. Detected attributes of area 635 can be used to control a work machine, for instance, to reactively control a harvester 100-1.

Advantageously, lateral monitoring performed by a remotely positionable sensor system, such as that on a drone 200, can provide for detection of attributes that may not be feasible with a sensor system on a machine 100. For example, but not by limitation, a drone 200 can be positioned, utilizing the space created by the harvester 100-1 removing crop materials to view upcoming crop (e.g., crop in unharvested passes) from a perspective and/or for a duration not feasible by a sensor system on a machine 100. For example, in FIG. 10, a drone 200 could be positioned above (e.g., UAV 200-1) or in (e.g., UGV 200-2) the current pass 630 to view crop in an upcoming pass 634 (including a next pass 636) detecting towards the East. These perspectives can provide for better or more accurate detection than that of a sensor 408 on the harvester 100-1, for instance such a perspective can avoid obstruction from the canopy of the crop and detect through the space between the crop plants.

Additionally, while the example shown in FIG. 10 shows a UAV 200-1 performing the lateral monitoring, in other examples, one or more drones 200 (e.g., one or more UAVs 200-1 or one or more UGVs 200-2, or both) could be controlled to perform the lateral monitoring. For example, but not by limitation, one drone 200 could be controlled to monitor previous passes 632 and one drone 200 could be controlled to monitor upcoming passes.

Figure 11A:
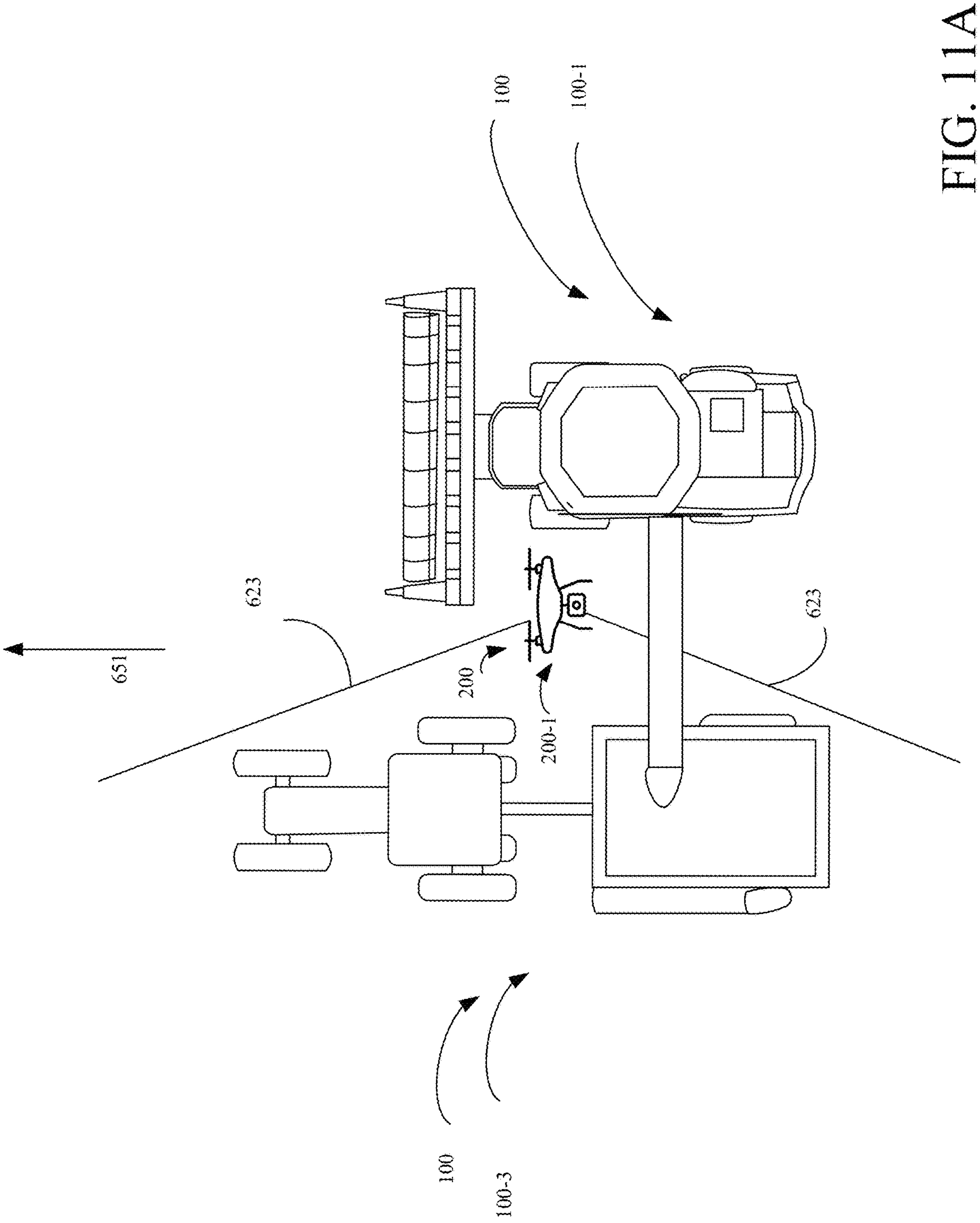
FIGS. 11A and 11B are pictorial illustrations illustrating example monitoring operations of the agricultural system architecture
Figure 11B:
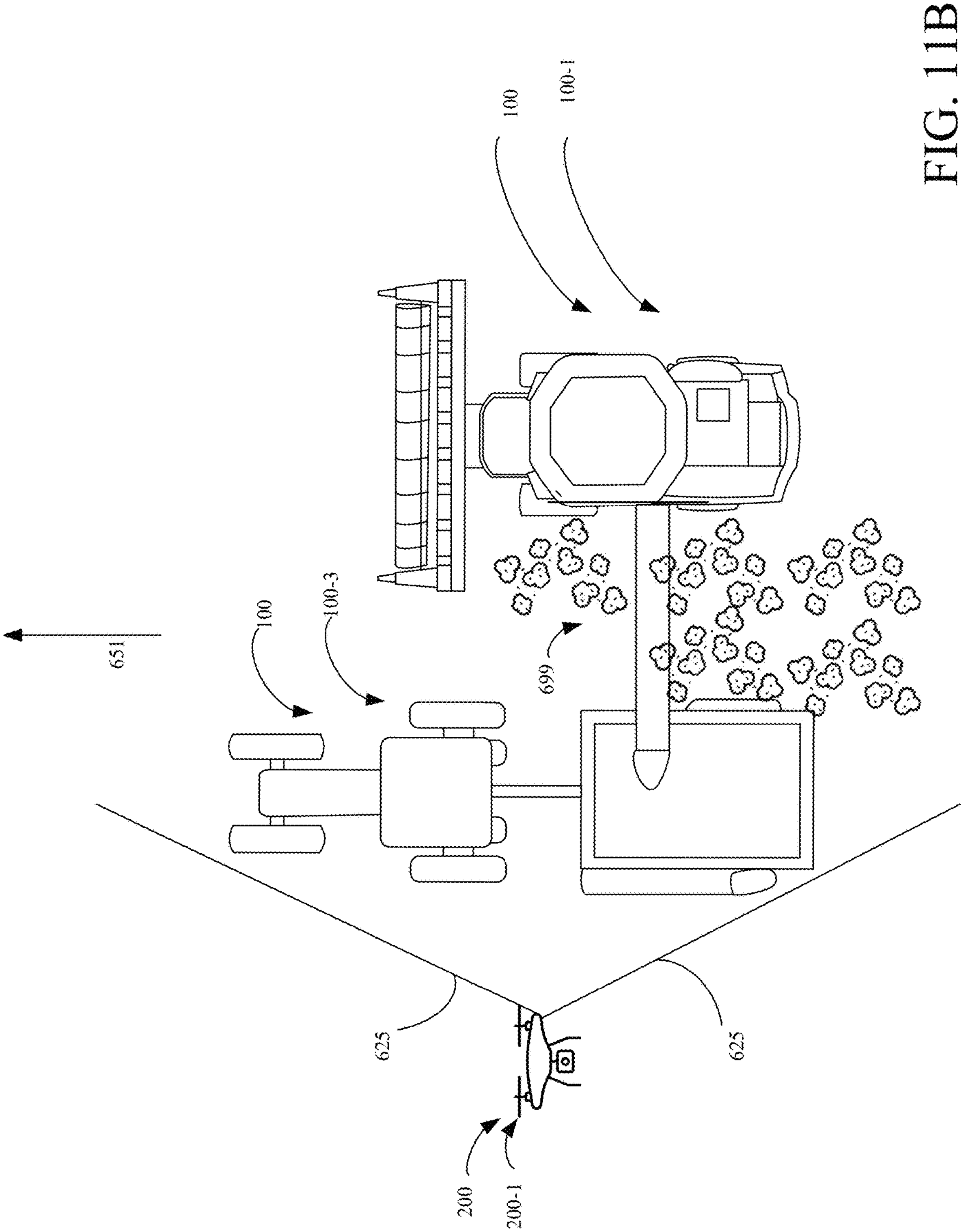

FIGS. 11A and 11B are pictorial illustrations showing example operations of system 500 in performing monitoring at a worksite. In the illustrated examples of FIGS. 11A and 11B, a drone 200 (illustratively a UAV 200-1) associated (e.g., in communication with, tethered to, etc.) with a work machine 100 (illustratively a harvester 100-1) is controlled to perform monitoring relative to a support machine 100-3 (illustratively a material receiving machine in the form of a mobile grain cart) as the machines operate at the worksite. FIGS. 11A and 11B show examples of a support machine monitoring mode. It will be understood that, in some examples, a drone 200 performing support machine monitoring, such as the drone in FIGS. 11A and 11B can also be in communication with the support machine, such as over a network (e.g., 359). For instance, a drone performing support machine monitoring may be associated with (e.g., tethered to, controlled by, stored on, in communication with) a primary work machine (e.g., a harvester 100-1) and also in communication with a support machine, such as over a network. In the illustrated examples of FIGS. 11A and 11B, machines 100-1 and 100-3 are traveling in the direction (North) indicated by arrow 651 and are conducting an in-tandem unloading operation in which harvester 100-1 transfers material (e.g., grain) to receiving machine 100-3.

In the illustrated examples of FIGS. 11A and 11B, the drone is monitoring attributes associated with the support machine 100-3 (e.g., attributes on the support machine 100-3 or attributes associated with the operation (e.g., unloading operation) of the support machine 100-3, or both) or attributes associated with a travel direction or route of the support machine, or both. In the illustrated example of FIG. 11A, as indicated by the measurement area represented by lines 623, the drone 200 is operable to detect areas of the worksite ahead of and behind the support machine 100-3 (relative to a travel direction or route of the support machine 100-3, to detect the support machine 100-3, as well as to detect attributes of the support machine 100-3 operation. It will be understood then that the measurement area of a drone performing support machine monitoring can include one or more of an area of the worksite ahead of the support machine, an area of the worksite behind the support machine, or the support machine (or at least a portion of the support machine). In the illustrated example of FIG. 11B, as indicated by the measurement area represented by lines 625, the drone 200 is operable to detect areas of the worksite ahead of and behind the support machine 100-3 (relative to a travel direction or route of the support machine 100-3, to detect the support machine 100-3, as well as to detect attributes of the support machine 100-3 operation.

As an example, the drone is operable to monitor for attributes ahead of the support machine 100-3 and in the path or travel direction of the support machine 100-3, such as obstacles of the worksite (e.g., standing water, ruts, ditches, terraces, etc.). Further, a drone is operable to monitor for attributes behind the support machine 100-3 such as commodity (e.g., grain) on the ground (indicative of material spilled during the unloading operation), attributes of damage to the worksite (e.g., scrapes, compaction, ruts, etc.) which may indicate overloading of the support machine 100-3 (e.g., at least relative to the load carrying capacity of the worksite) or wheel slip of the support machine 100-3. Still further, a drone is operable to monitor for attributes of the commodity (e.g., grain) by detecting the commodity on the support machine 100-3 or as it is transferred to the support machine, such as commodity size, commodity moisture, commodity yield, commodity constituents, commodity mechanics, commodity mass, commodity temperature, commodity quality (e.g., damage (e.g., cracked grain), presence and amount of foreign material (e.g., grain cleanliness), etc.), as well as other attributes of the commodity. It will be understood that in some examples, the drone may be controlled to engage the commodity (and in some examples grab a sample of the commodity) to detect one or more of the attributes of the commodity, such as commodity test weight, commodity mass, commodity moisture, commodity constituents, etc. Further, a drone is operable to monitor for attributes associated with the operation (e.g., unloading operation), such as relative positioning between the support machine 100-3 and the harvester 100-1, the position of the unloading subsystem (e.g., chute 135 and spout 136) of the harvester 100-1, the state of the unloading subsystem (e.g., whether the unloading subsystem is activated/deactivated, whether the unloading subsystem is unloading material), attributes of the material flow from the unloading subsystem (e.g., uniformity/consistency of the material flow, etc.), material spill (e.g., whether commodity is landing in the support machine 100-3 or outside of the support machine 100-3, commodity landing point (e.g., where the commodity is landing), whether material is being spilled from the support machine 100-3, etc.), as well as other attributes associated with the operation. The drone is operable to monitor for attributes associated with the support machine 100-3 such as fill level of commodity in the support machine, remaining commodity capacity of the support machine, material distribution of the commodity in the support machine, speed of the support machine 100-3 (e.g., by detecting position of the support machine 100-3 over time), as well as other attributes relative to the support machine 100-3.

In the example shown in FIG. 11A, the travel plan positions the UAV 200-1 above and between the machines (though other positions are also contemplated) to detect attributes in the measurement area indicated by lines 623. The attributes detected by the drone 200 in FIG. 11A can be used to control one or more work machines 100, such as one or more of harvester 100-1 or support machine 100-3.

In the example shown in FIG. 11B, monitoring system 235 has identified an obstruction 699 (illustratively a debris cloud). Monitoring system 235 further identifies future locations of the obstruction 604 based, at least, on one or more weather attributes (e.g., wind direction and speed). In the illustrated example of FIG. 11B, the wind direction is South by Southwest. Thus, monitoring system 235 generates a travel plan that positions the UAV 200-1 above and to the left (or West of) the machine 100-3 (though other positions are also contemplated) to account for the obstruction 699, and to detect attributes in the measurement area indicated by lines 625. The attributes detected by the drone 200 in FIG. 11B can be used to control one or more work machines 100, such as one or more of harvester 100-1 or support machine 100-3.

While the examples shown in FIGS. 11A and 11B show a UAV 200-1 performing the monitoring, in other examples, one or more drones 200 (e.g., one or more UAVs 200-1 or one or more UGVs 200-2, or both) could be controlled to perform the monitoring shown in FIG. 11. For example, but not by limitation, one drone 200 could be controlled to monitor ahead of the support machine 100-3, one drone 200 could be controlled to monitor behind the support machine 100-3, and one drone 200 could be controlled to monitor the support machine 100-3 or the support machine operation (e.g., unloading operation, or both.

Figure 12A:
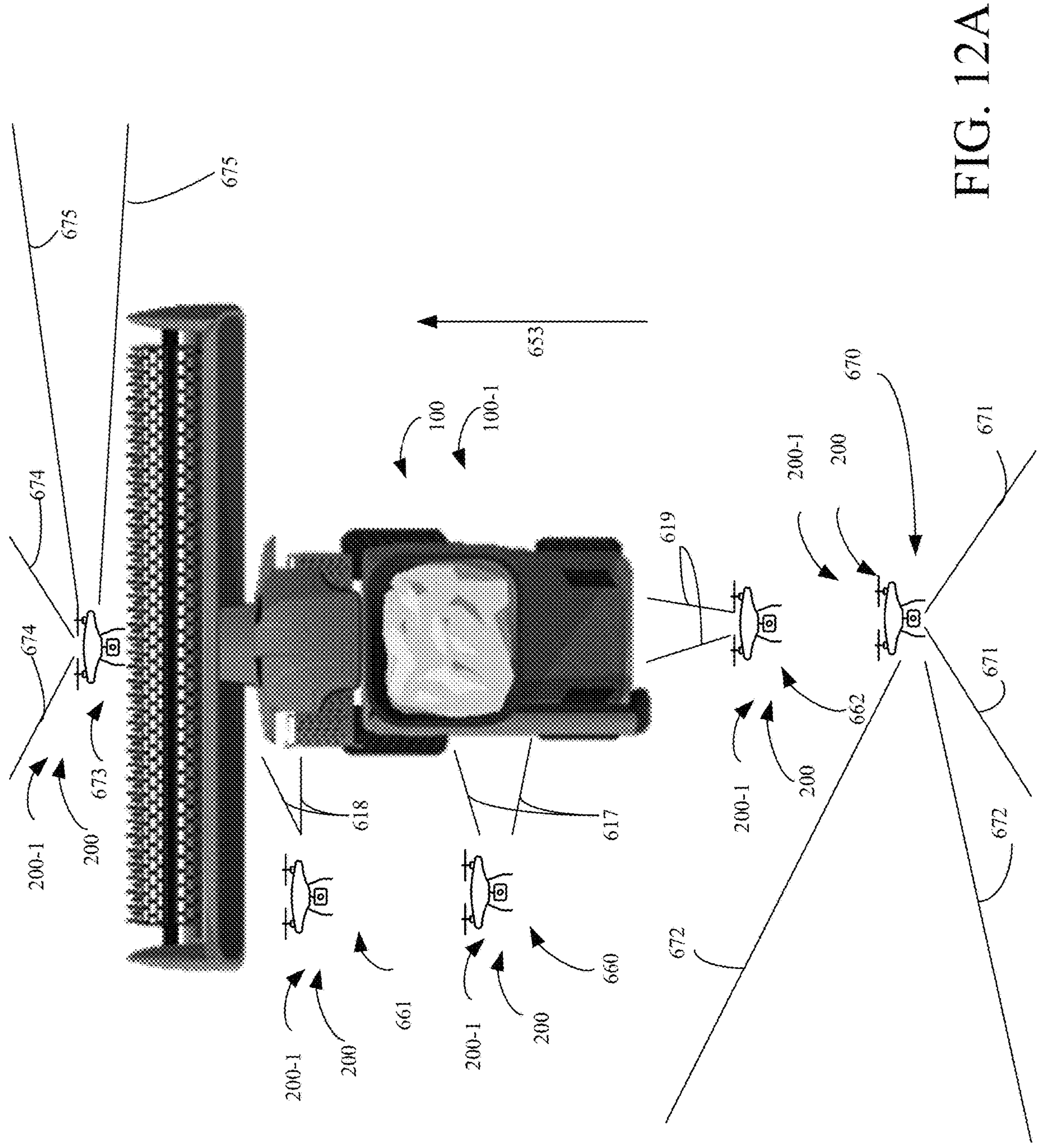
FIGS. 12A and 12B are pictorial illustrations illustrating example monitoring operations of the agricultural system architecture.
Figure 12B:
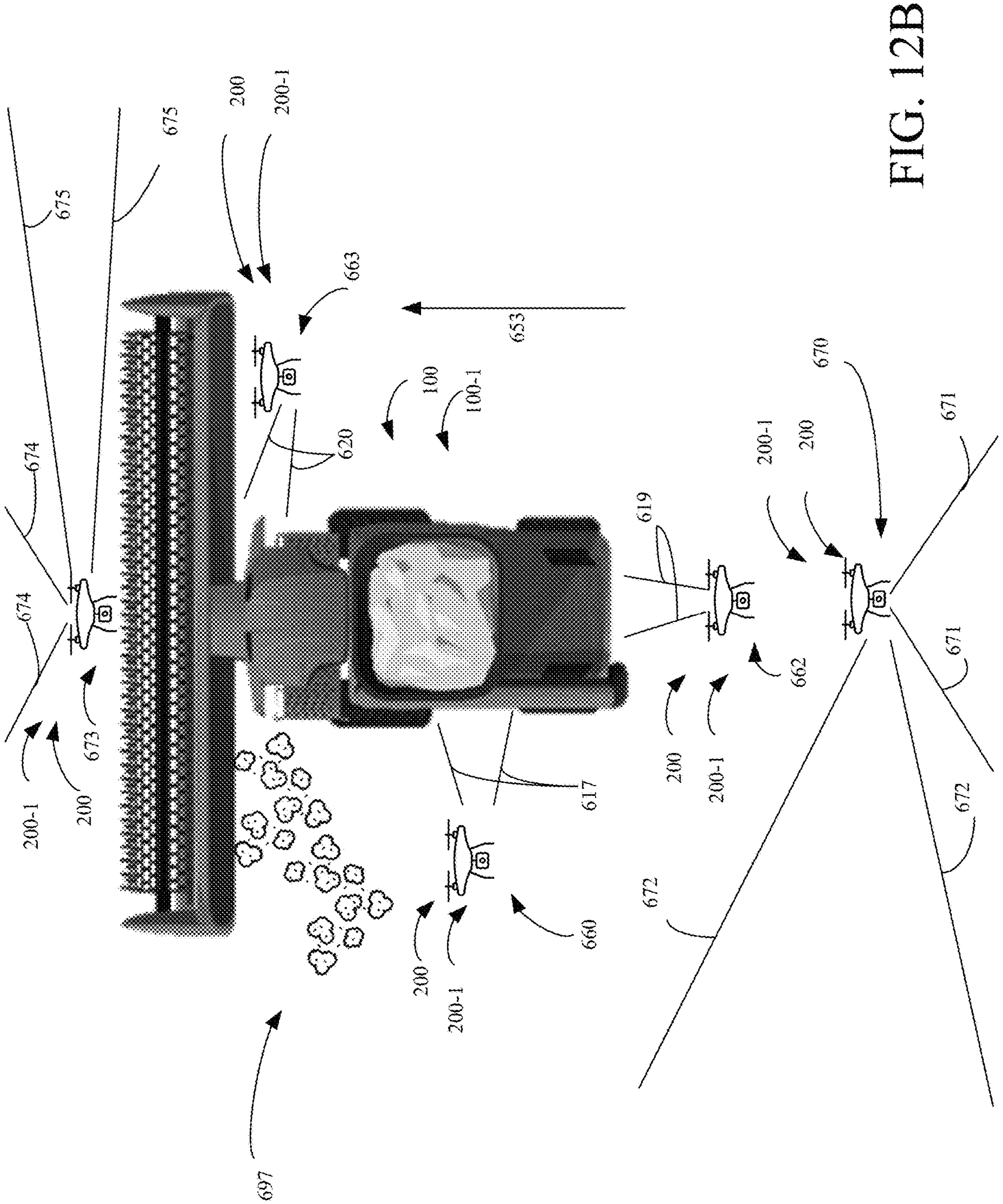

FIGS. 12A and 12B are pictorial illustrations showing example operations of system 500 in performing monitoring at a worksite. In the illustrated examples of FIGS. 12A and 12B, a drone 200 (illustratively a UAV 200-1) is controlled to perform machine operating effect monitoring as the work machine 100 operates at a worksite. FIGS. 12A and 12B show examples of a machine operating effect monitoring mode. The work machine 100 in FIGS. 12A and 12B is illustratively a harvester 100-1. In the illustrated examples, work machine 100 is travelling North at the worksite, as indicated by arrow 653.

In the illustrated examples of FIGS. 12A and 12B, the UAV 200 is performing machine operating effect monitoring by monitoring for machine operating effect attributes (e.g., smoke or smoke attributes, temperature or temperature attributes, or material accumulation or material accumulation attributes). This can include detecting attributes at or proximate to different areas of the machine 100 as well as detecting attributes at different areas of the worksite. Thus, monitoring system 235 generates a travel plan that positions the drone 200 to detect machine operating effect attributes.

In the example shown in FIG. 12A, the travel plan includes five monitoring locations 660, 661, 662, 670, and 673 (though other monitoring locations are contemplated) to detect machine operating effect attributes.

At the monitoring location 660, drone 200 detects machine operating effect attributes proximate to or at a left side (or West side in the illustrated example) of the harvester 100-1 as indicated by the measurement area indicated by lines 617. This left side area is associated with the powerplant (e.g., engine) of the machine 100, the exhaust or components thereof (such as the exhaust manifold, exhaust outlet, engine exhaust aftertreatment device), and other items (e.g., such as pulleys, shafts, belts, bearings, etc.). An example measurement area associated with location 660 is indicated by lines 617.

At the monitoring location 661, drone 200 detects machine operating effect attributes proximate or at the area of the machine 100 associated with the header and/or feeder house of the harvester 100-1. This area includes a variety of components (e.g., pulleys, shafts, belts, bearings, etc.). An example measurement area associated with location 661 is indicated by lines 618.

At the monitoring location 662, drone 200 detects machine operating effect attributes proximate or at the area of the harvester 100-1 associated with the chopper and spreader. This area includes a variety of components. An example measurement area associated with location 660 is indicated by lines 619.

At the monitoring location 670, drone 200 detects machine operating effect attributes at one or more areas of the worksite, such as an area of the worksite in the current pass of the harvester 100-1 and behind the harvester 100-1, relative to the travel direction or heading of the harvester 100-1. One example measurement area associated with location 670 and for detection of machine operating effect attributes in an area of the worksite in the current pass of the harvester 100-1 and behind the harvester 100-1 is indicated by lines 671. Additionally, or alternatively, at location 670, drone 200 detects machine operating effect attributes at an area of the worksite lateral to the current pass of the harvester 100-1, such as a previous pass of the harvester 100-1. One example measurement area associated with location 670 and for detection of machine operating effect attributes in an area of the worksite lateral to the current pass, such as in a previous pass, is indicated by lines 672.

At the monitoring location 673, drone 200 detects machine operating effect attributes at one or more areas of the worksite, such as an area of the worksite in the current pass of the harvester 100-1 and ahead of the harvester 100-1, relative to the travel direction or heading of the harvester 100-1. One example measurement area associated with location 673 and for detection of machine operating effect attributes in an area of the worksite in the current pass of the harvester 100-1 and ahead of the harvester 100-1 is indicated by lines 674. Additionally, or alternatively, at location 673, drone 200 detects machine operating effect attributes at an area of the worksite lateral to the current pass of the harvester 100-1, such as a next pass of the harvester 100-1. One example measurement area associated with location 673 and for detection of machine operating effect attributes in an area of the worksite lateral to the current pass, such as in a next pass, is indicated by lines 675.

Figure 14:
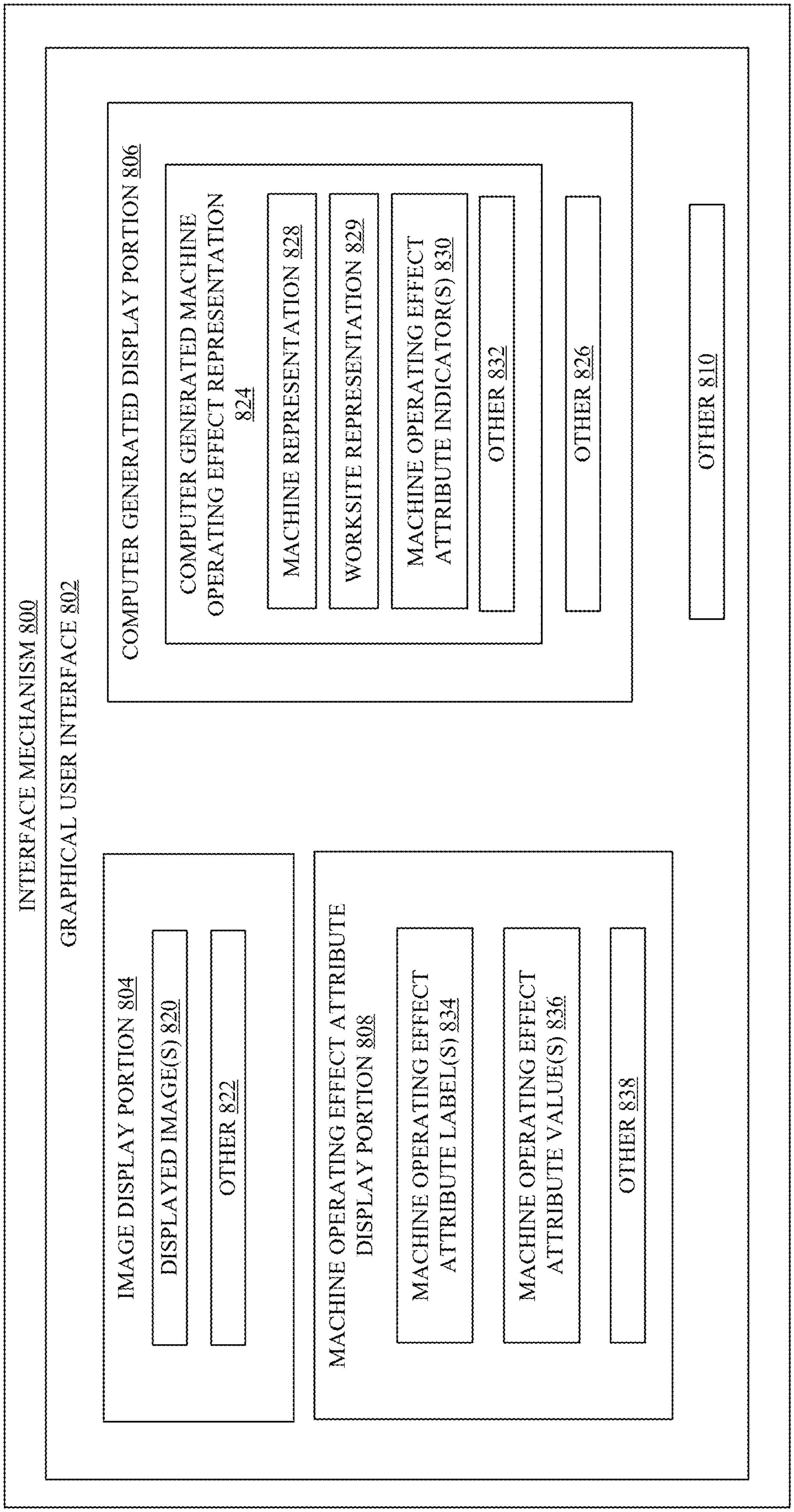
FIG. 14 is a block diagram showing one example of a graphical user interface.

In addition, the travel plan can include a sequence that indicates an order in which and a duration for which the drone 200 will monitor at the locations 660, 661, 662, 670, and 673. For example, the order of priority of the locations could be 660 (highest priority), 661 (second highest priority), 662 (third highest priority), 670 (fourth highest priority), and 673 (fifth highest, or lowest, priority). The sequence could cause the drone 200 to travel first to location 660 (for a first given duration), then travel next to location 661 (for a second given duration), then travel next to location 662 (for a third given duration), then travel next to location 670 (for a fourth given duration), then travel next to location 673 (for a fifth given duration), and then travel back to location 660 to start the cycle over. The first, second, third, fourth, and fifth durations could all be the same, could all be different, or could be a combination of different and the same. For instance, the durations at higher priority locations can be higher than the duration at lower priority locations (e.g., first duration higher than second duration, second duration higher than the third duration, third duration higher than the fourth duration, fourth duration higher than the fifth duration, etc.). In another example, the sequence could cause the drone 200 to travel first to location 660 (for a first given duration), then travel next to location 661 (for a second given duration), then travel back to location 660 (again for the first duration or for a third duration different than the first duration), then travel to location 662 (for a fourth given duration), then travel to location 670 (for a fifth given duration), and then travel back to location 660 (again for the first duration or the third duration or for a sixth duration different than the first duration and the third duration), then travel to location 673 (for seventh given duration), and then travel back to location 660 to start the cycle over. These are merely some examples of sequencing of a travel plan. In the example of FIG. 12A, the drone 200 will detect machine operating effect attributes and monitoring system 235 can generate outputs 360 indicative of the detected machine operating effect attributes, which can be used in the control of the work machine 100, or in the control of other items of system 500. For example, a subsystem 416, such as propulsion subsystem 450, can be controlled to bring the machine 100 to a stop based on the detected machine operating effect attributes. Additionally, or alternatively, an operator interface mechanism 418 of machine 100 can be controlled to generate an indication (e.g., display, alert, etc.) based on the detected machine operating effect attributes, such as to alert the operator that one or more machine operating effect attributes are detected. Additionally, or alternatively, an operator interface mechanism 218 associated with a drone 200 can be controlled to generate an indication (e.g., display, alert, etc.) based on the detected machine operating effect attributes, such as to alert the operator that one or more machine operating effect attributes are detected. Additionally, or alternatively, a user interface mechanism 364 can be controlled to generate an indication (e.g., display, alert, etc.) based on the detected machine operating effect attributes, such as to alert the operator that one or more machine operating effect attributes are detected. One example of an indication (e.g., a display) is shown in FIG. 14.

In the example shown in FIG. 12B, monitoring system 235 has identified an obstruction 697 (illustratively a debris cloud). Monitoring system 235 further identifies future locations of the obstruction 697 based, at least, on one or more weather attributes (e.g., wind direction and speed). In the illustrated example of FIG. 12B, the wind direction is West by Southwest. Thus, the travel plan generated by monitoring system 235 includes, in addition to monitoring locations 660, 662, 670, and 673, a monitoring location 663 (as an alternative to monitoring location 661) to account for the obstruction 697.

The monitoring location 663 serves as a substitute for the monitoring location 661 as monitoring at the location 661, given the obstruction 697, would be detrimentally affected. At the monitoring location 663, drone 200 detects machine operating effect attributes proximate or at the area of the machine 100 associated with the header and/or feeder house of the machine 100. This area includes a variety of components (e.g., pulleys, shafts, belts, bearings, etc.). An example measurement area associated with location 663 is indicated by lines 620.

In addition, the travel plan of FIG. 12B can include a sequence that indicates an order in which and a duration for which the drone 200 will monitor at the locations 660, 662, 663, 670, and 673. For example, the order of priority of the locations could be 660 (highest priority), 663 (second highest priority), 662 (third highest priority), 670 (fourth highest priority), and 673 (fifth highest, or lowest, priority). The sequence could cause the drone 200 to travel first to location 660 (for a first given duration), then travel next to location 663 (for a second given duration), then travel next to location 662 (for a third given duration), then travel next to location 670 (for a fourth given duration), then travel to location 673 (for a fifth given duration), and then travel back to location 660 to start the cycle over. The first, second, third, fourth, and fifth durations could all be the same, could all be different, or could be a combination of different and the same. For instance, the durations at higher priority locations can be higher than the duration at lower priority locations (e.g., first duration higher than second duration, second duration higher than the third duration, third duration higher than the fourth duration, fourth duration higher than the fifth duration, etc.). In another example, the sequence could cause the drone 200 to travel first to location 600 (for a first given duration), then travel next to location 663 (for a second given duration), then travel back to location 660 (again for the first duration or for a third duration different than the first duration), then travel to location 662 (for a fourth given duration), then travel to location 670 (for a fifth given duration), and then travel back to location 660 (again for the first duration or the third duration or for a sixth duration different than the first duration and the third duration), then travel to location 673 (for seventh given duration), and then travel back to location 660 to start the cycle over. These are merely some examples of sequencing of a travel plan.

In the example of FIG. 12B, the drone 200 will detect machine operating effect attributes and monitoring system 235 can generate outputs 360 indicative of the detected machine operating effect attributes, which can be used in the control of the work machine 100, or in the control of other items of system 500. For example, a subsystem 416, such as propulsion subsystem 450, can be controlled to bring the machine 100 to a stop based on the detected machine operating effect attributes. Additionally, or alternatively, an operator interface mechanism 418 of machine 100 can be controlled to generate an indication (e.g., display, alert, etc.) based on the detected machine operating effect attributes, such as to alert the operator that one or more machine operating effect attributes are detected. Additionally, or alternatively, an operator interface mechanism 218 associated with drone 200 can be controlled to generate an indication (e.g., display, alert, etc.) based on the detected machine operating effect attributes, such as to alert the operator that one or more machine operating effect attributes are detected. Additionally, or alternatively, a user interface mechanism 364 can be controlled to generate an indication (e.g., display, alert, etc.) based on the detected machine operating effect attributes, such as to alert the operator that one or more machine operating effect attributes are detected. One example of an indication (e.g., a display) is shown in FIG. 14.

Additionally, while the examples shown in FIGS. 12A and 12B show a UAV 200-1 performing the machine operating effect monitoring, in other examples, one or more drones 200 (e.g., one or more UAVs 200-1 or one or more UGVs 200-2, or both) could be controlled to perform the machine operating effect monitoring. For example, a separate drone 200 could be controlled to monitor at each monitoring location or two drones 200 could be controlled to monitor at the monitoring locations (e.g., splitting the monitoring locations between them or each monitoring at the monitoring locations in turn).

Figure 13A:
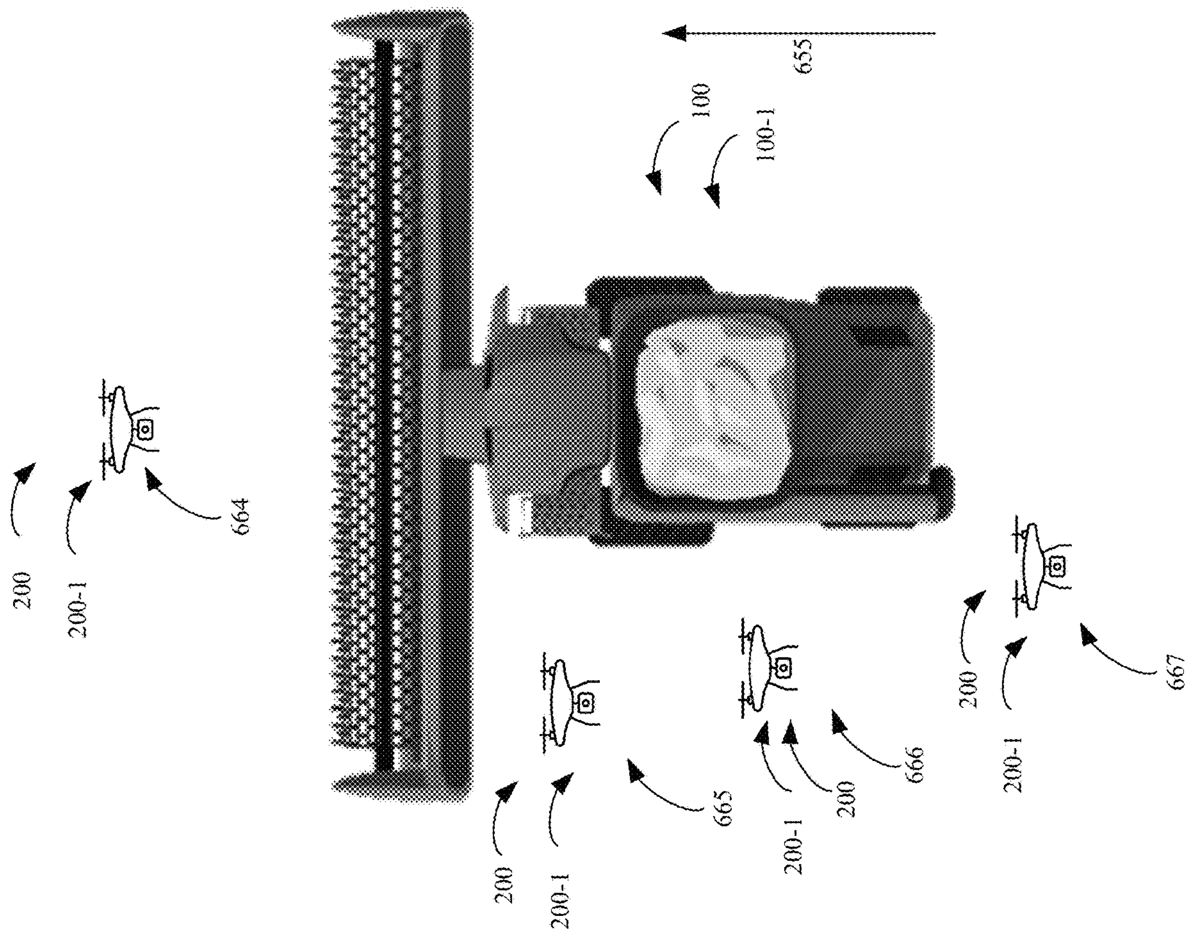
FIGS. 13A and 13B are pictorial illustrations illustrating example monitoring operations of the agricultural system architecture.
Figure 13B:
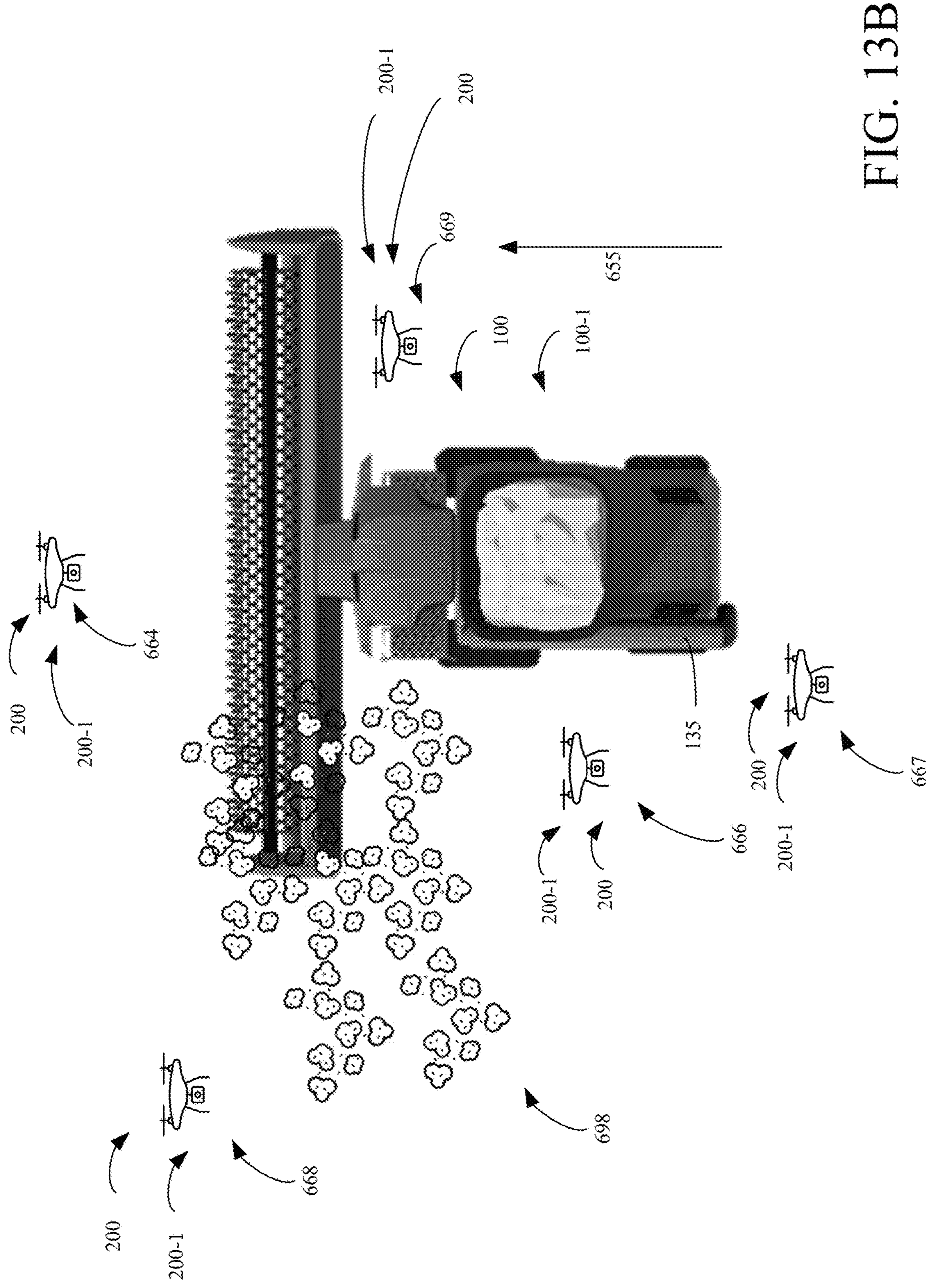

FIGS. 13A and 13B are pictorial illustrations showing example operations of system 500 in performing monitoring at a worksite. In the illustrated examples of FIGS. 13A and 13B, a drone 200 (illustratively a UAV 200-1) is controlled to perform combination or customized monitoring as the work machine operates at the field. As previously explained, combination or customized monitoring includes monitoring of a variety of attributes and/or areas. The work machine 100 in FIGS. 13A and 13B is illustratively a harvester 100-1. In the illustrated examples, work machine 100 is traveling East at the worksite, as indicated by arrow 655.

In the illustrated example of FIG. 13A, the drone 200 is performing monitoring forward or ahead of the machine 100, header performance monitoring, machine operating effect monitoring, and job quality monitoring.

In the example shown in FIG. 13A, the travel plan includes four monitoring locations 664, 665, 666, and 667 (though other monitoring locations are contemplated) to perform the combination or customized monitoring.

At the monitoring location 664, drone 200 detects attributes forward or ahead of the machine 100, such as terrain attributes (e.g., topography) and crop attributes (e.g., down crop, etc.). At the monitoring location 665, drone 200 detects attributes associated with header performance. At the monitoring location 666, drone 200 detects machine operating effect attributes. At the monitoring location 667, drone 200 detects attributes associated with job quality (e.g., attributes of the material expelled by the machine 100).

Monitoring system 235 detects a priority of the different monitoring and thus, the different monitoring locations, based on various information, as previously explained in FIG. 5. The priority identified by monitoring system 235 indicates location 664 as the highest priority, location 665 as the second highest priority, location 666 as the third highest priority, and location 667 as the fourth highest priority. This priority could be provided by operator or user input or could be generated by monitoring system 235, itself.

For example, monitoring system 235 could generate the priority based on attributes relative to the worksite. For instance, location 664 could be identified as the highest priority because the harvester 100-1 is in high yield area and because the worksite suffered wind over the last week that makes downed crop more likely. Adjusting control of the machine 100 to account for variations in attributes ahead of the machine 100 is critical to optimize profitability, particularly in high yield areas and when high yield-impacting variables, such as downed crop, may be present. Location 665 may be identified as the second highest priority because performance of the header, particularly in high yield areas and when yield-impacting variables, such as downed crop, may be present, is critical to optimize profitability. However, because the forward-looking detection provides for proactive control, location 664 is prioritized over location 665. Location 667 may be identified as a third highest priority because monitoring for grain loss out of the back of the machine 100, particularly in high yield areas, is important, but is of less priority than forward detection and header performance detection as the particular hybrid of the crop being harvested is a shorter variety (e.g., shorter crop height) and thus, has less biomass (relative to a taller crop variety) and the chances of grain loss out of the back of the harvester is somewhat reduced. Location 666 may be identified as the fourth highest priority because, while important, is of less priority than forward detection, header performance detection, and rearward job quality (e.g., grain loss) because it is during an early part of the operation (i.e., lower likelihood that machine operating effect attributes will be detectable or be of interest). This is merely one example.

In addition to the monitoring locations, the travel plan includes a sequence that indicates an order in which and a duration for which the drone 200 will monitor at the locations 664, 665, 666, and 667. The sequence could cause the drone 200 to travel first to location 664 (for a first given duration), then travel next to location 665 (for a second given duration), then travel next to location 667 (for a third given duration), then travel next to location 666 (for a fourth given duration), and then travel back to location 664 to start the cycle over. The first, second, third, and fourth durations could all be the same, could all be different, or could be a combination of different and the same. For instance, the durations at higher priority locations can be higher than the duration at lower priority locations (e.g., first duration higher than second duration, second duration higher than the third duration, third duration higher than fourth duration, etc.). In another example, the sequence could cause the drone 200 to travel first to location 664 (for a first given duration), then travel next to location 665 (for a second given duration), then travel back to location 664 (again for the first duration or for a third duration different than the first duration), then travel to location 667 (for a fourth given duration), then travel back to location 664 (again for the first duration, or for the third duration, or for a fifth duration different than the first duration and the third duration), then travel to location 666 (for a sixth duration), and then travel back to location 664 to start the cycle over. These are merely some examples of sequencing of a travel plan.

In the example of FIG. 13A, the drone 200 will detect attributes forward or ahead of the machine 100, header performance (or header performance attributes), machine operating effect attributes, and job quality (or job quality attributes). Monitoring system 235 can generate outputs 360 indicative of the detected attributes forward or ahead of the machine 100, the detected header performance (or header performance attributes), the detected machine operating effect attributes, and the detected job quality (or job quality attributes), which can be used in the control of a work machine 100, or in the control of other items of system 500 (e.g., operator interface mechanisms 418, user interface mechanisms 364, etc.).

In the example of FIG. 13B, monitoring system 235 has identified multiple obstructions, obstruction 698 (illustratively a debris cloud) and chute 135. Monitoring system 235 further identifies future locations of the obstruction 698 based, at least, on one or more weather attributes (e.g., wind direction and speed). In the illustrated example of FIG. 13B, the wind direction is North by Northwest.

Monitoring system 235 further identifies future locations of the chute 135 based on the dimensions of the machine 100 (e.g., dimensions of the chute 135), the travel direction of the machine 100, and the travel speed of the machine 100. It will be noted that monitoring system 235 can identify the chute 135 as an obstruction based on sensor data 501, such as sensor data indicating a current fill level of the harvester 100-1 relative to a capacity or threshold fill level 607 (e.g., can predict an upcoming unloading operation based on the fill level and capacity or fill level threshold), or such as sensor data indicating a control output commanding extension of the chute 135, or such as sensor data indicating a location and heading of material receiving machine 100-3 (e.g., indicating a material receiving machine 100-3 is heading towards the harvester 100-1). Monitoring system 235 can identify the chute 135 as an obstruction based on operator or user input commanding extension of the chute 135. Monitoring system 235 can identify the chute as an obstruction based on detection of the chute 135 itself (e.g., detect motion or change in position of the chute 135). These are merely some examples.

Thus, the travel plan in FIG. 13B includes, in addition to monitoring locations 664, 666, and 667, a monitoring location 669 (as an alternative to monitoring location 665) to account for the obstruction 698 and an additional monitoring location 668 to account for the obstruction 698.

The monitoring at location 669 serves as a substitute for the monitoring at location 665 as monitoring at the location 665, given the obstruction 698, would be detrimentally affected. At the monitoring location 669, drone 200 detects attributes associated with header performance.

The monitoring location 668 is added. At the monitoring location 668, drone 200 performs lateral monitoring, that is, detects attributes lateral to the harvester 100-1, specifically, attributes (e.g., topography) in the previous pass to the North of harvester 100-1 to provide data for the control of a material receiving machine 100-3 (which will approach and travel along the harvester 100-1 in the previous pass to the North of harvester during an unloading operation) as the sensors 408 of material receiving machine 100-3 are going to be obstructed by the obstruction 698.

Additionally, monitoring system 235 has generated an updated priority. The updated priority, in the example, indicates the priority of the locations as 664 (highest priority), (second highest priority), 669 (third highest priority), 667 (fourth highest priority), and 666 (fifth highest priority). Given that obstruction 698 will obstruct sensors 408 onboard material receiving machine 100-3 and given that the material receiving machine 100-3 is approaching for an unloading operation, location 668 is prioritized over some other locations.

In addition to the monitoring locations, the travel plan includes a sequence that indicates an order in which and a duration for which the drone 200 will monitor at the locations 664, 666, 667, 668, and 669. The sequence could cause the drone 200 to travel first to location 666 (for a first given duration), then travel next to location 664 (for a second given duration), then travel next to location 668 (for a third given duration), then travel next to location 669 (for a third given duration), then travel next to location 667 (for a fourth given duration), and then travel back to location 664 to start a new travel plan (the new travel plan excluding location 668 and changing location 666 to the last visited location because the unloading operation will have ended by the end of the first sequence). Notice that location 666 is traveled to first even though location 666 is of a less priority than other locations. This is because the chute 135 will be in the way of monitoring at location 666 during the time associated with the travel plan. The first, second, third, fourth, and fifth durations could all be the same, could all be different, or could be a combination of different and the same. For instance, the durations at higher priority locations can be higher than the duration at lower priority locations (e.g., second duration higher than the third duration, third duration higher than the fourth duration, fourth duration higher than the fifth duration, fifth duration higher than the first duration etc.). In one example, however, the duration at location 668 is less than the duration at location 669, even though location 668 is of higher priority. This is because at location 668, the drone is monitoring topography lateral to the harvester 100-1, in a previous pass, and ahead of the material receiving machine 100-3. However, the drone 200 can be controlled to travel higher and detect a larger area, thus needing less time at the location. These are merely some examples of sequencing of a travel plan.

In another example, the sequence could cause the drone 200 to travel first to location 666 (for a first given duration), then travel next to location 664 (for a second given duration), then travel next to location 668 (for a third duration), then travel back to location 664 (again for the second duration or for a fourth duration different than the second duration), then travel to location 669 (for a fifth given duration), then travel back to location 664 (again for the second duration, or for the fourth duration, or for a sixth duration different than the second duration and the fourth duration), then travel to location 667 (for a seventh duration), then travel back to location 664 to start a new travel plan (the new travel plan excluding location 668 and changing location 666 to the last visited location because the unloading operation will have ended by the end of the first sequence). Notice again that location 666 is traveled to first even though location 666 is of a less priority than other locations. This is because the chute 135 will be in the way of monitoring at location 666 during the time associated with the travel plan. These are merely some examples of sequencing of a travel plan.

Additionally, while the examples shown in FIGS. 13A and 13B show a UAV 200-1 performing the combination monitoring, in other examples, one or more drones 200 (e.g., one or more UAVs 200-1 or one or more UGVs 200-2, or both) could be controlled to perform the combination monitoring. For example, a separate drone 200 could be controlled to monitor at each monitoring location or two drones 200 could be controlled to monitor at the monitoring locations (e.g., splitting the monitoring locations between them or each monitoring at the monitoring locations in turn).

FIG. 14 is a block diagram showing one example of a graphical user interface 802. Graphical user interface 802 can be presented (e.g., displayed) on an interface mechanism 800. Interface mechanism 800 can be, in one example, an operator interface mechanism 218. Interface mechanism 800 can be, in one example, an operator interface mechanism 418. Interface mechanism 800 can be, in one example, a user interface mechanism 364. Interface mechanism 800 can be various other interface mechanisms. Graphical user interface 802 can be presented on one or more of an operator interface mechanism 218, an operator interface mechanism 418, or a user interface mechanism 364.

As illustrated, graphical user interface 802 include image display portion 804, computer generated display portion 806, a machine operating effect attribute display portion 808, and can include various other items 810.

Image display portion 804 can include one or more displayed images 820 and other items 822. Displayed images 820 can includes images captured by sensors 208 (e.g., attribute sensor systems 250) by one or more drones 200 such as images showing machine operating effect attribute(s) on (or proximate) a work machine 100 or at the worksite. As an example, the images 820 may be images captured by sensors 208 during a machine operating effect monitoring mode or a combination monitoring mode including machine operating effect monitoring. In some examples, the image display portion 804 and the one or more displayed images 820 can be displayed simultaneously with the computer generated display portion 806. In this way, an operator or user can see what the sensors captured as well as the computer generated representation provided in the computer generated display portion 806.

Computer generated display portion 806 can include a computer generated machine operating effect representation 824 and other items 826. Computer generated machine operating effect representation 824 can include a machine representation 828, worksite representation 829, one or more machine operating effect attribute indicators 830, and other items 832. Machine representation 828 is a computer generated representation of a work machine 100 (e.g., harvester 100-1, etc.) or a portion (e.g., implement (e.g., header), side portion, rear portion, etc.) of a work machine 100. Worksite representation 829 is a computer generated representation of a worksite 829, such as surface and/or environment of a worksite, or a portion of a worksite (e.g., portion of worksite associated with current location of machine plus a surrounding area, such as one or more of an area ahead of the machine, an area behind the machine, an area lateral to the machine in a first direction (including one or more previous passes), or an area lateral to the machine in a second direction (including one or more next passes). In some examples, the machine representation 828 can be overlaid the worksite representation 829 or the worksite representation 829 can be underlaid the machine representation 828.

Machine operating effect attribute indicators 830 are display elements representing detected machine operating effect attributes and, in some examples, values of detected machine operating effect attributes. Indicators 830 can be displayed symbols or characters. Indicators 830 can be colored or patterned, or can have other visual characteristics. The visual characteristics of the indicators 830 can vary to indicate different values or value ranges of machine operating effect attributes (e.g., green for low, yellow for medium, red for high, etc.) or to indicate proximity to thresholds (e.g., flash or blink to represent values near or at threshold values). Additionally, the indicators 830 can be displayed as part of or as an overlay over the machine representation 828 and can be located on the machine representation 828 corresponding to the area of the work machine 100 at which the machine operating effect attributes were detected. In this way, an operator or user can see where on the work machine 100 machine operating effect attributes were detected. In some examples, indicators 830 can be displayed as part of or as an overlay over the worksite representation 829 and can be located on worksite representation 829 corresponding to the area of the worksite at which the machine operating effect attributes were detected. In this way, an operator or user can see where at the worksite machine operating effect attributes were detected.

Machine operating effect attribute display portion 808 can include one or more machine operating effect attribute labels 834, one or more machine operating effect attribute values 836, and can include other items 838. Machine operating effect attribute labels 834 are display elements (e.g., words, letters, symbols, etc.) indicating types of machine operating effect attributes. Each label 834 corresponds to a particular type of machine operating effect attribute. Machine operating effect attribute values 836 are display elements (e.g., number(s), percentage(s), etc.) indicating a value of a corresponding machine operating effect attribute. Each value 836 corresponds to a label 834.

Figure 15A:
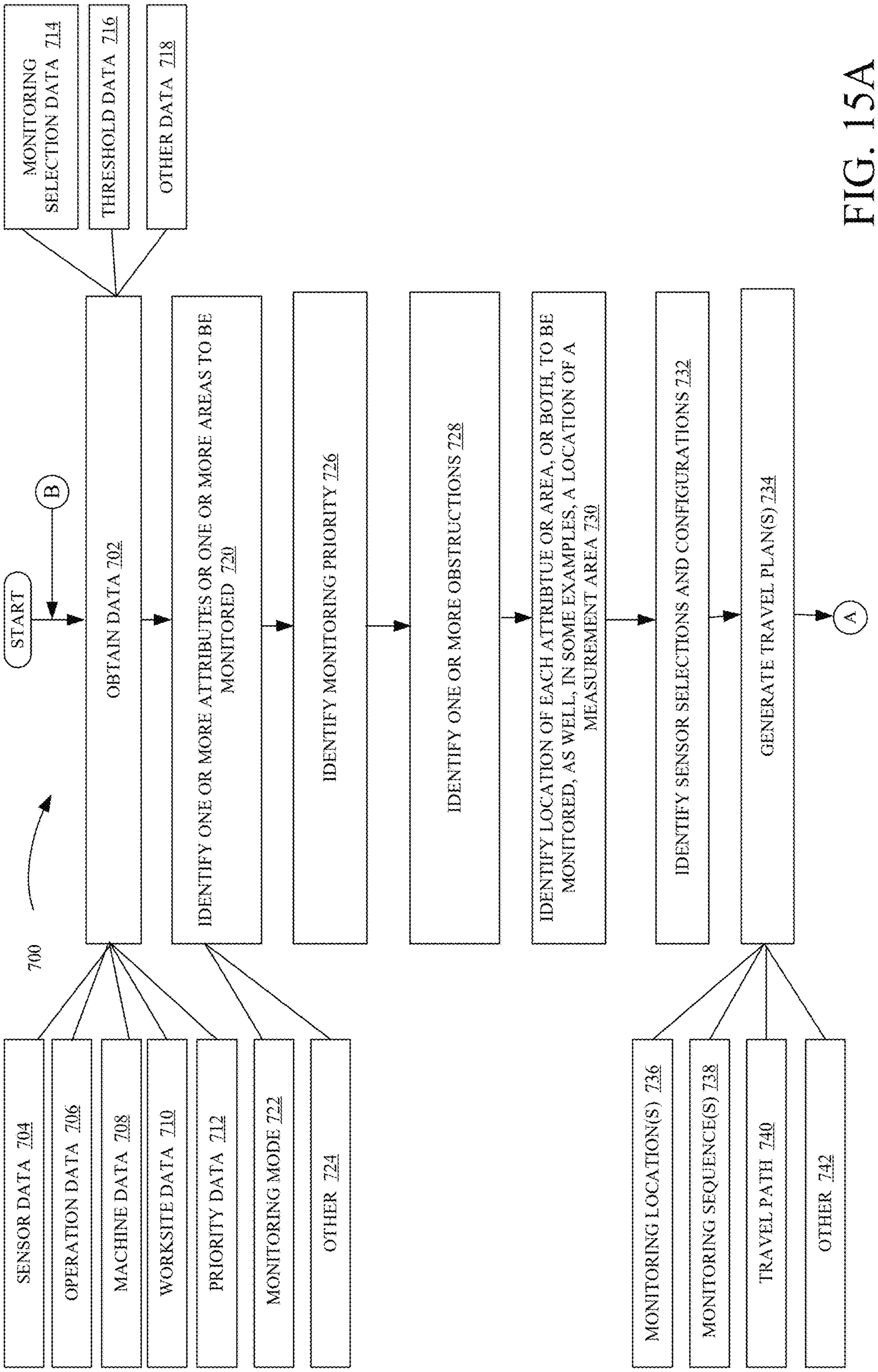
FIGS. 15A and 15B (collectively referred to herein as FIG. 15) show a flow diagram illustrating one example operation of the agricultural system architecture in performing monitoring and machine control.
Figure 15B:
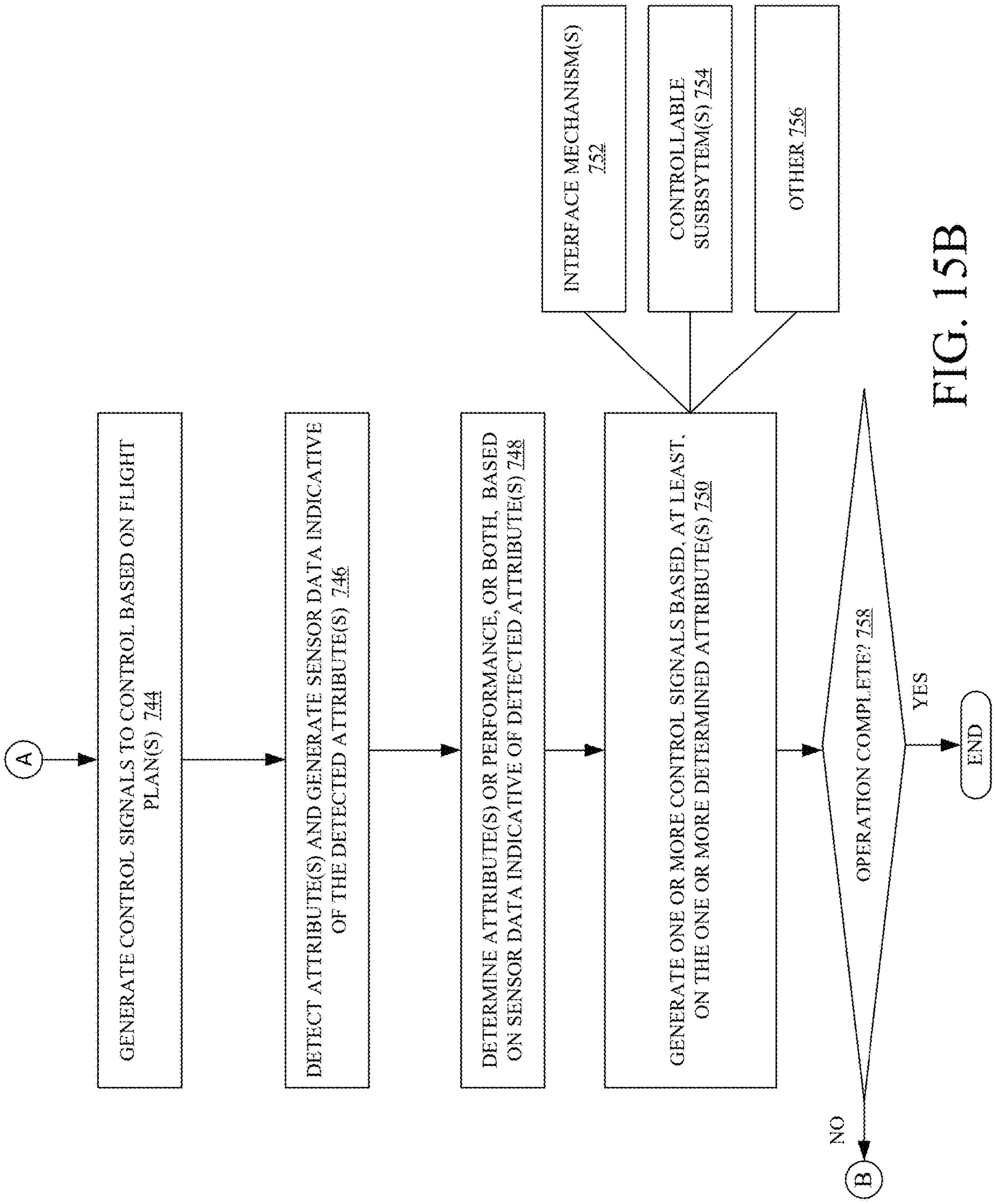

FIGS. 15A and 15B (collectively referred to herein as FIG. 15) show a flow diagram illustrating an example operation 700 of agricultural system 500 in performing monitoring and control based thereon.

At block 702 one or more items of data are obtained by system 500 (e.g., monitoring system 235). The obtained data can include sensor data 501, as indicated by block 704. The obtained data can include operation data 502, as indicated by block 706, The obtained data can include machine data 503, as indicated by block 708. The obtained data can include worksite data 504, as indicated by block 710. The obtained data can include priority data 505, as indicated by block 712. The obtained data can include monitoring selection data 506, as indicated by block 714. The obtained data can include threshold data 507, as indicated by block 716. The obtained data can include various other data 510, as indicated by block 718. As previously discussed, the obtained data can be processed by data processing systems 330. Further, it will be understood that one or more of the data can be continuously obtained (updated) throughout operation 700.

At block 720, monitoring system 235 (e.g., monitoring mode system 332) identifies one or more attributes or one or more areas, or both, to be monitored based, at least, on one or more of the data obtained at block 702. In some examples, the identification at block 720 includes identifying a monitoring mode as indicated by block 722. A monitoring mode can be default, preset (or preconfigured), or customized. Some examples of preset (or preconfigured) monitoring modes include a machine operating effect monitoring mode, a header performance monitoring mode, a lateral monitoring mode, a support machine monitoring mode, a forward monitoring mode, a rearward (or job quality) monitoring mode, and a combination monitoring mode. In the machine operating effect monitoring mode, one or more drones 200 are controlled to monitor for machine operating effect attributes (e.g., detect machine operating effect attributes such as smoke or smoke attributes, temperature or temperature attributes, or material accumulation or material accumulation attributes) at the worksite or on a work machine 100. In the header performance monitoring mode, one or more drones 200 are controlled to monitor for attributes of header performance of a header (e.g., 104) of a machine 100, such as header cut quality, header grain loss, header material flow, as well as other header performance attributes. In a lateral monitoring mode, one or more drones 200 are controlled to monitor for attributes lateral to the machine 100, such as attributes in previous passes, attributes in next passes, or attributes in the current pass (e.g., in an area extending between the edge of the implement (e.g., header, towed implement, etc.) to the edge of the body of the machine 100). In a support machine monitoring mode, one or more drones 200 are controlled to monitor attributes associated with a support machine 100 (e.g., 100-3), or attributes of areas of the worksite ahead of or behind the support machine (relative to a travel direction or route), or attributes of a support machine operation (e.g., unloading operation, etc.), or a combination thereof. In a forward monitoring mode, one or more drones 200 are controlled to monitor for attributes forward (or ahead) of the machine 100 (e.g., relative to the direction of travel or route of the machine 100). In a rearward (or job quality) monitoring mode, one or more drones 200 are controlled to monitor for attributes behind the machine 100 (e.g., relative to the direction of travel or route of the machine 100) such as job quality attributes. In a combination monitoring mode, one or more drones 200 are controlled to perform a combination of two or more of a machine operating effect monitoring mode, a header performance monitoring mode, a lateral monitoring mode, a forward monitoring mode, or a rearward (or job quality) monitoring mode. A user or operator, or system 235, can generate a customized monitoring mode. The customized monitoring mode can indicate the attributes of interest or the areas of interest, or both. In one example, a customized monitoring mode can be a select combination of two or more of a machine operating effect monitoring mode, a header performance monitoring mode, a lateral monitoring mode, a support machine monitoring mode, a forward monitoring mode, or a rearward (or job quality) monitoring mode. In some examples, a customized monitoring mode can indicate one or more attributes or one or more areas, or both, to be monitored.

The one or more attributes or one or more areas, or both, to be monitored can be identified in various other ways, as indicated by block 724.

At block 726, system 235 (e.g., monitoring priority identification system 334) identifies a monitoring priority based, at least, on the identifications at block 720 and on one or more of the data obtained at block 702. For example, system 235 can, at block 726, identify a priority of attributes, areas, or monitoring modes, such a hierarchy (e.g., ranked list) of attributes, areas, or monitoring modes.

At block 728, system 235 (e.g., obstruction identification system 336) identifies one or more obstructions, and characteristics thereof, based, at least, on one or more of the data obtained at block 702. For example, system 235 can, at block 728, identify presence, location, and type of each obstruction. Further, at block 728, system 235 can estimate (or predict) movement and future locations of each obstruction.

At block 730, system 235 (e.g., attribute and area location identification system 338) can identify a location of each attribute or area, or both, to be monitored based, at least, on the identifications at block 720 and one or more of the data obtained at block 702. A location identified at block 730 can be relative to a work machine 100 or relative to the worksite. In addition, at block 730, system 235 can identify a location of a measurement area to optimize resolution, limit data processing, and still provide timely sensor data for use in control of a machine 100. In some examples, the location of the measurement area is based on travel speed and latency of a machine 100.

At block 732, system 235 (e.g., sensor selection identification system 340) identifies one or more sensors of sensors 208 to be utilized by each of the one or more drones 200 as well as the configurations (e.g., settings) of the identified one or more sensors, as the one or more drones 200 monitor based on at least one of the one or more items of data obtained at block 702, the identifications at block 720, or the obstructions, and characteristics thereof, identified at block 728. The identification at block 732 can include an identification of one or more sensors 208 for each attribute or area to be monitored or for each monitoring mode to be conducted. The identification at block 732 can include an identification of the configuration of each of the one or more sensors 208 for each attribute or area to be monitored for each monitoring mode to be conducted.

At block 734, system 235 (e.g., travel plan system 342) generates a travel plan for each of the one or more drones 200 based on the data obtained at block 702, the identifications at blocks 720, 726, 728, 730, and 732. Each travel plan can include one or more monitoring locations (e.g., identified by location logic 350), as indicated by block 736. Each monitoring location indicates a location (e.g., location relative to a machine 100 or to the worksite) at which a drone 200 is to be positioned to perform monitoring. Each travel plan can include one or more monitoring sequences (e.g., identified by sequence logic 352), as indicated by block 738. A monitoring sequence indicates an order in which the monitoring locations are to be traveled to and a duration for which the drone 200 will stay at each monitoring location (e.g., cumulative duration or duration for each individual visit to the monitoring location, or both). Each travel plan can include a travel path (e.g., identified by path logic 354), as indicated by block 740. A travel path indicates a path or a route along which a drone 200 is to travel to and between the monitoring locations, according to the sequence, as well as, in the case of UAVs 200-1, altitudes along the travel path and at each monitoring location. Additionally, in some examples, each travel plan can include one or more of a variety of other items or information, as indicated by block 742, for example, but not by limitations, the selected one or more sensors (identified at block 732) corresponding to each monitoring location.

At block 744, the one or more travel plans are provided to one or more items of system 500 and one or more control signals are generated based on the one or more travel plans.

For example, at block 744, each travel plan is provided to a corresponding control system 214, and one or more control signals are generated by the corresponding control system 214 to control the drone 200 according to the corresponding travel plan. Control at block 744 can include each control system 214 (e.g., controller(s) 235) controlling the corresponding travel subsystem 252 to control the corresponding drone to travel and position according to the corresponding travel plan. Control at block 744 can include each control system 214 (e.g., controller(s) 235) controlling the corresponding sensor configuration subsystem 253 to control the activation and deactivation, as well as the configuration of the sensors 208 of the drone 200 according to the sensor selections and configurations indicated in the corresponding travel plan.

Further, at block 744, the one or more travel plans are provided, and one or more control signals can be generated to control one or more interface mechanisms (e.g., one or more of 218, one or more of 418, or one or more of 364) to generate presentations (e.g., displays, etc.) based on, or indicative of, the one or more travel plans.

At block 746, one or more sensors 208 of each of the one or more drones 200 detect one or more attributes while executing the travel plan and generate sensor data indicative of the one or more detected attributes. At block 748, system 235 (e.g., attribute and performance identification system 344) determines one or more attributes (or values thereof) or one or more performance metrics, or both, based on the sensor data generated at block 748.

At block 750, the determined attributes (or values thereof) or the determined one or more performance metrics, or both, provided to one or more items of system 500 and one or more control signals are generated based on the determined attributes (or values thereof) or the determined one or more performance metrics, or both. For example, as indicated by block 752, one or more control signals can be generated to control one or more interface mechanisms, such as one or more interface mechanisms 218, one or more interface mechanisms 418, or one or more interface mechanisms 364, or a combination of one or more interface mechanisms 218, one or more interface mechanisms 418, and one or more interface mechanisms 364, to generate presentations (e.g., displays, etc.) indicative of or based on the determined attributes (or values thereof) or the determined one or more performance metrics, or both. One example of a presentation includes graphical user interface 802 shown in FIG. 14.

Additionally, or alternatively, as indicated by block 754, one or more control signals can be generated to control one or more controllable subsystems 216 or one or more controllable subsystems 416, or a combination of one or more controllable subsystems 216 and one or more controllable subsystems 416. In some examples, one or more controllable subsystems 416 of each of one or more work machines 100 can be controlled. For example, as previously described, one or more controllable subsystems 416 of a primary work machine (e.g., harvester 100-1, etc.) and one or more controllable subsystems 416 of a support machine (e.g., 100-3, etc.) can be controlled.

Additionally, or alternatively, as indicated by block 756, one or more control signals can be generated to control one or more other items of system 500.

At block 758 it is determined if the operation at the worksite is complete. If the operation at the worksite is not complete, then processing returns to block 702, where the data obtained at blocks 746 and 748 can be utilized, along with the data previously discussed at block 702, (i.e., the data obtained at blocks 746 and 748 can be used in the identifications at blocks 720, 726, 728, 730, and 732, and the generation of one or more new travel plans at block 734). If the operation at the worksite is complete, then processing ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms can include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition can be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores can be local to the systems accessing the data stores, one or more of the data stores can all be located remote form a system utilizing the data store, or one or more data stores can be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality can be distributed among more components. In different examples, some functionality can be added, and some can be removed.

It will be noted that the above discussion has described a variety of different systems, logic, controllers, components, and interactions. It will be appreciated that any or all of such systems, logic, controllers, components, and interactions can be implemented by hardware items, such as one or more processors, one or more processors executing computer executable instructions stored in memory, memory, or other processing components, some of which are described below, that perform the functions associated with those systems, logic, controllers, components, or interactions. In addition, any or all of the systems, logic, controllers, components, and interactions can be implemented by software that is loaded into a memory and is subsequently executed by one or more processors or one or more servers or other computing component(s), as described below. Any or all of the systems, logic, controllers, components, and interactions can also be implemented by different combinations of hardware, software, firmware, etc., some examples of which are described below. These are some examples of different structures that can be used to implement any or all of the systems, logic, controllers, components, and interactions described above. Other structures can be used as well.

Figure 16:
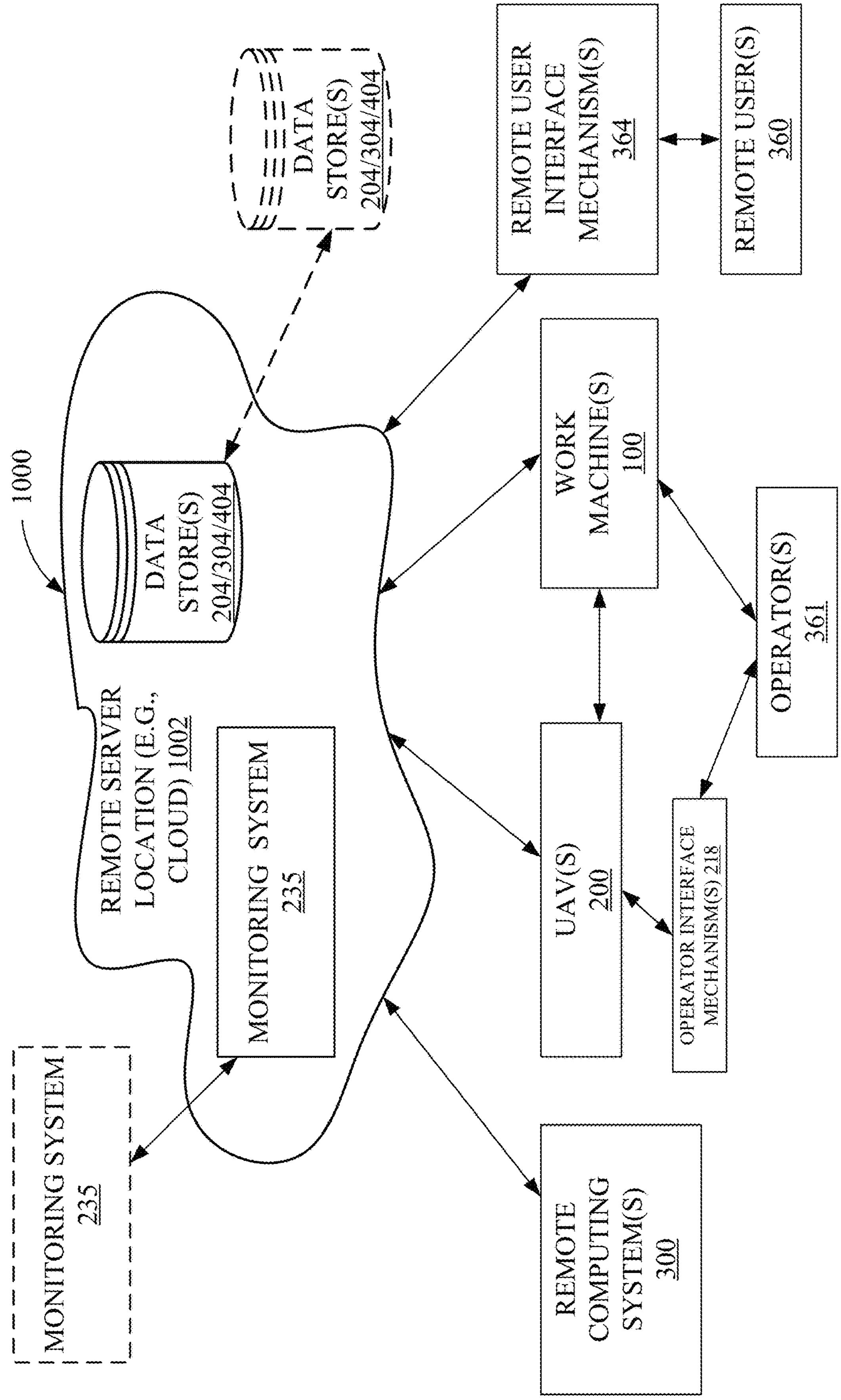
FIG. 16 is a block diagram showing one example of items of an agricultural system architecture in communication with a remote server architecture.

FIG. 16 is a block diagram of a remote server architecture 1000. FIG. 16, also shows one or more work machines 100, one or more UAVs 200, one or more remote computing systems 300, and one or more remote user interface mechanisms 364 in communication with the remote server environment. The work machines 100, UAVs 200, remote computing systems 300, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and can be accessible through a web browser or any other computing component. Software or components shown in previous figures as well as data associated therewith, can be stored on servers at a remote location. The computing resources in a remote server environment can be consolidated at a remote data center location, or the computing resources can be dispersed to a plurality of remote data centers. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a server, or the components and functions can be installed on client devices directly, or in other ways.

In the example shown in FIG. 16, some items are similar to those shown in previous figures and those items are similarly numbered. FIG. 16 specifically shows that monitoring system 235, data stores 204, data stores 304, or data stores 404, or a combination thereof, can be located at a server location 1002 that is remote from the work machines 100, UAVs 200, remote computing systems 300, and remote user interface mechanisms 364. Therefore, in the example shown in FIG. 16, work machines 100, UAVs 200, remote computing systems 300, and remote user interface mechanisms 364 access systems through remote server location 1002. In other examples, various other items can also be located at server location 1002, such as various other items of agricultural system architecture 500.

FIG. 16 also depicts another example of a remote server architecture. FIG. 16 shows that some elements of previous figures can be disposed at a remote server location 1002 while others can be located elsewhere. By way of example, one or more of data store(s) 204, 304, and 404 can be disposed at a location separate from location 1002 and accessed via the remote server at location 1002. Similarly, monitoring system 235 can be disposed at a location separate from location 1002 and accessed via the remote server at location 1002. Regardless of where the elements are located, the elements can be accessed directly by work machines 100, UAVs 200, remote computing systems 300, and remote user interface mechanisms 364 through a network such as a wide area network or a local area network; the elements can be hosted at a remote site by a service; or the elements can be provided as a service or accessed by a connection service that resides in a remote location. Also, data can be stored in any location, and the stored data can be accessed by, or forwarded to, operators, users, or systems. For instance, physical carriers can be used instead of, or in addition to, electromagnetic wave carriers. In some examples, where wireless telecommunication service coverage is poor or nonexistent, another machine, such as a fuel truck or other mobile machine or vehicle, can have an automated, semi-automated or manual information collection system. As a mobile machine (e.g., work machine 100 or UAV 200) comes close to the machine containing the information collection system, such as a fuel truck prior to fueling, or other mobile machine or vehicle, the information collection system collects the information from the mobile machine (e.g., work machine 100 or UAV 200) using any type of ad-hoc wireless connection. The collected information can then be forwarded to another network when the machine containing the received information reaches a location where wireless telecommunication service coverage or other wireless coverage is available. For instance, a fuel truck, can enter an area having wireless communication coverage when traveling to a location to fuel other machines or when at a main fuel storage location. Other mobile machines or vehicles can enter an area having wireless communication coverage when traveling to other locations or when at another location. All of these architectures are contemplated herein. Further, the information can be stored on a mobile machine (e.g., work machine 100 or UAV 200) until the mobile machine enters an area having wireless communication coverage. The mobile machine (e.g., work machine 100 or UAV 200), itself, can send the information to another network.

It will also be noted that the elements of previous figures, or portions thereof, can be disposed on a wide variety of different devices. One or more of those devices can include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 can include cybersecurity measures. Without limitation, these measures can include encryption of data on storage devices, encryption of data sent between network nodes, authentication of people or processes accessing data, as well as the use of ledgers for recording metadata, data, data transfers, data accesses, and data transformations. In some examples, the ledgers can be distributed and immutable (e.g., implemented as blockchain).

Figure 17:
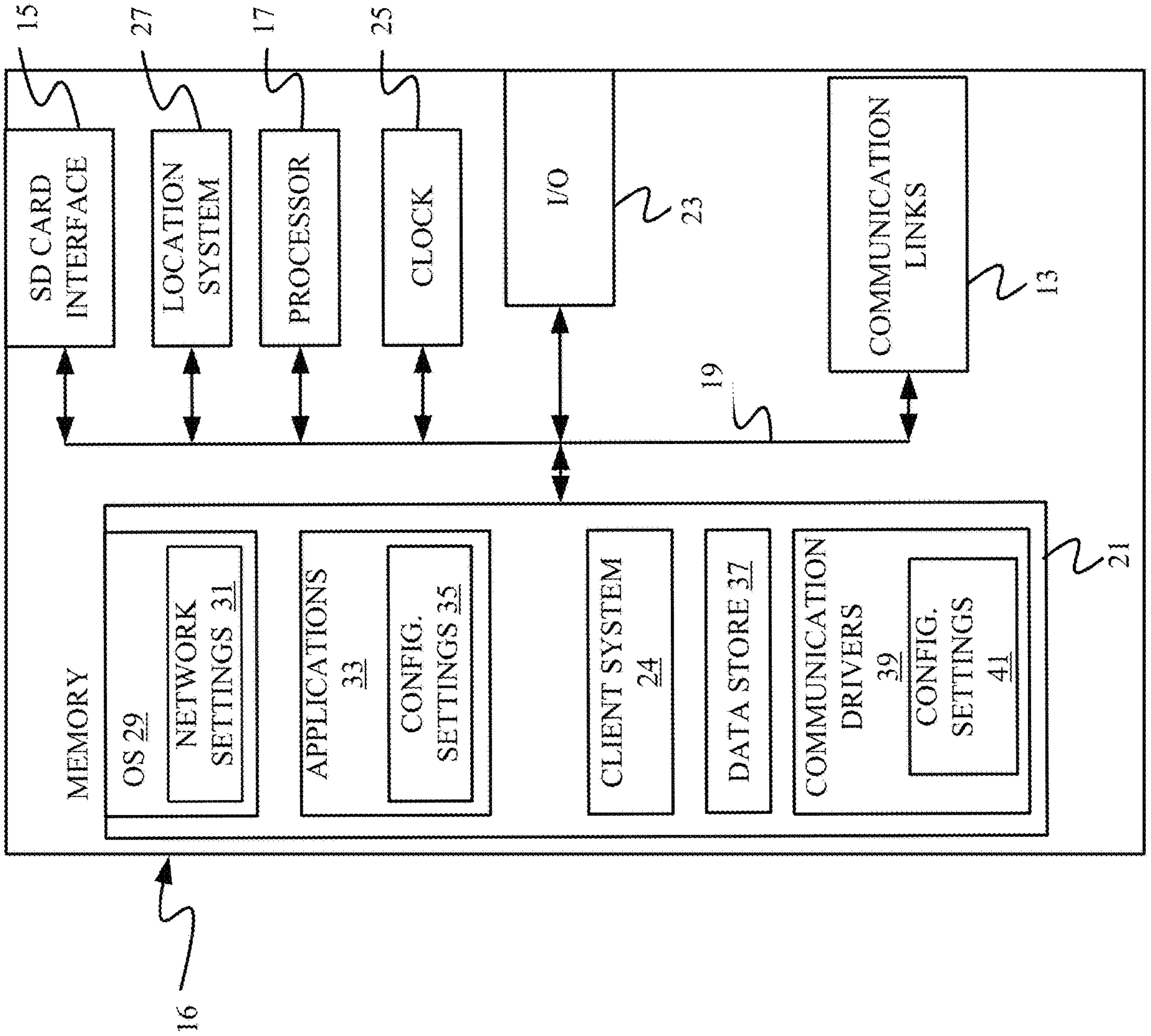
FIGS. 17, 18, and 19 show examples of mobile devices that can be used in an agricultural system architecture.
Figure 18:
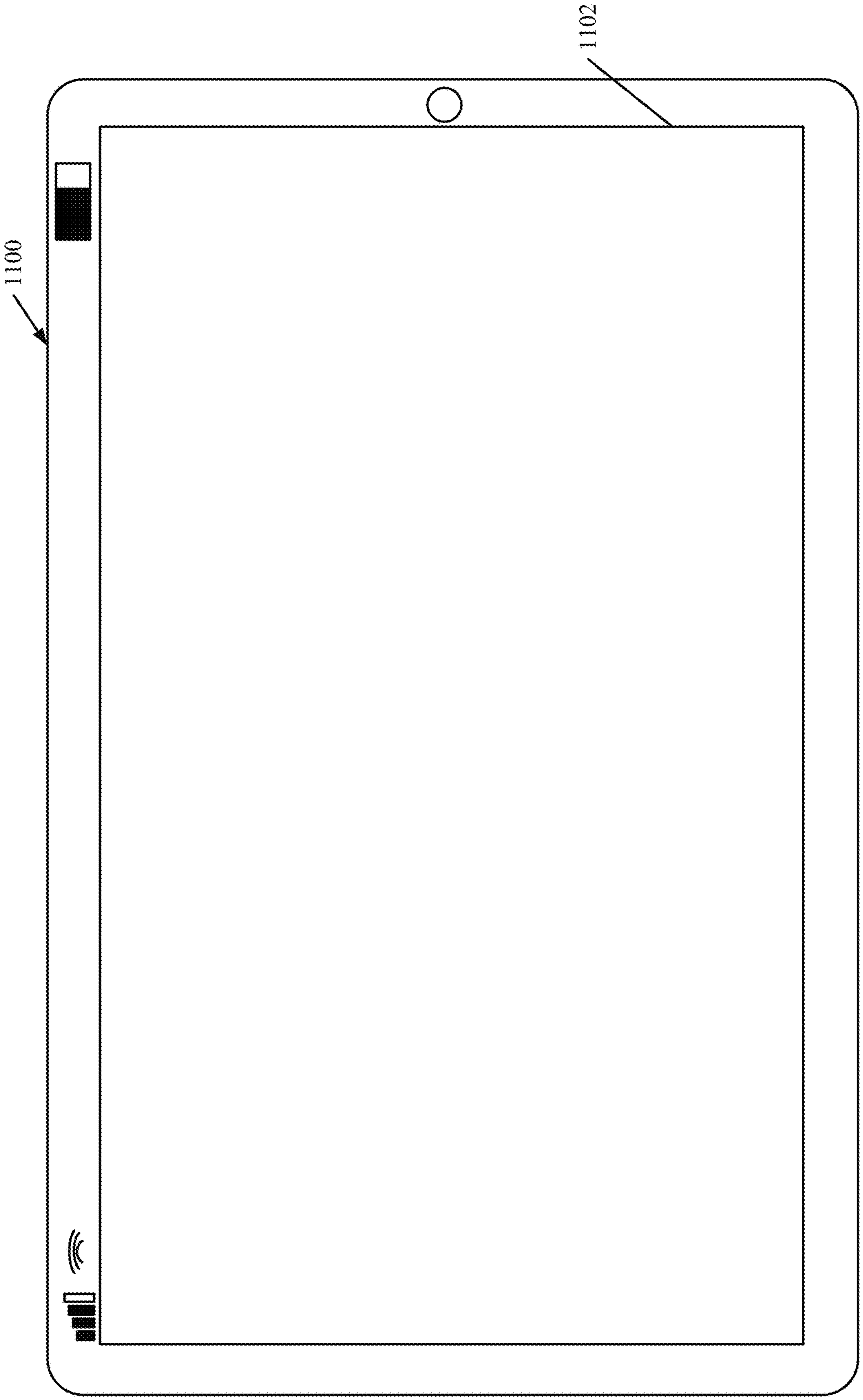
Figure 19:
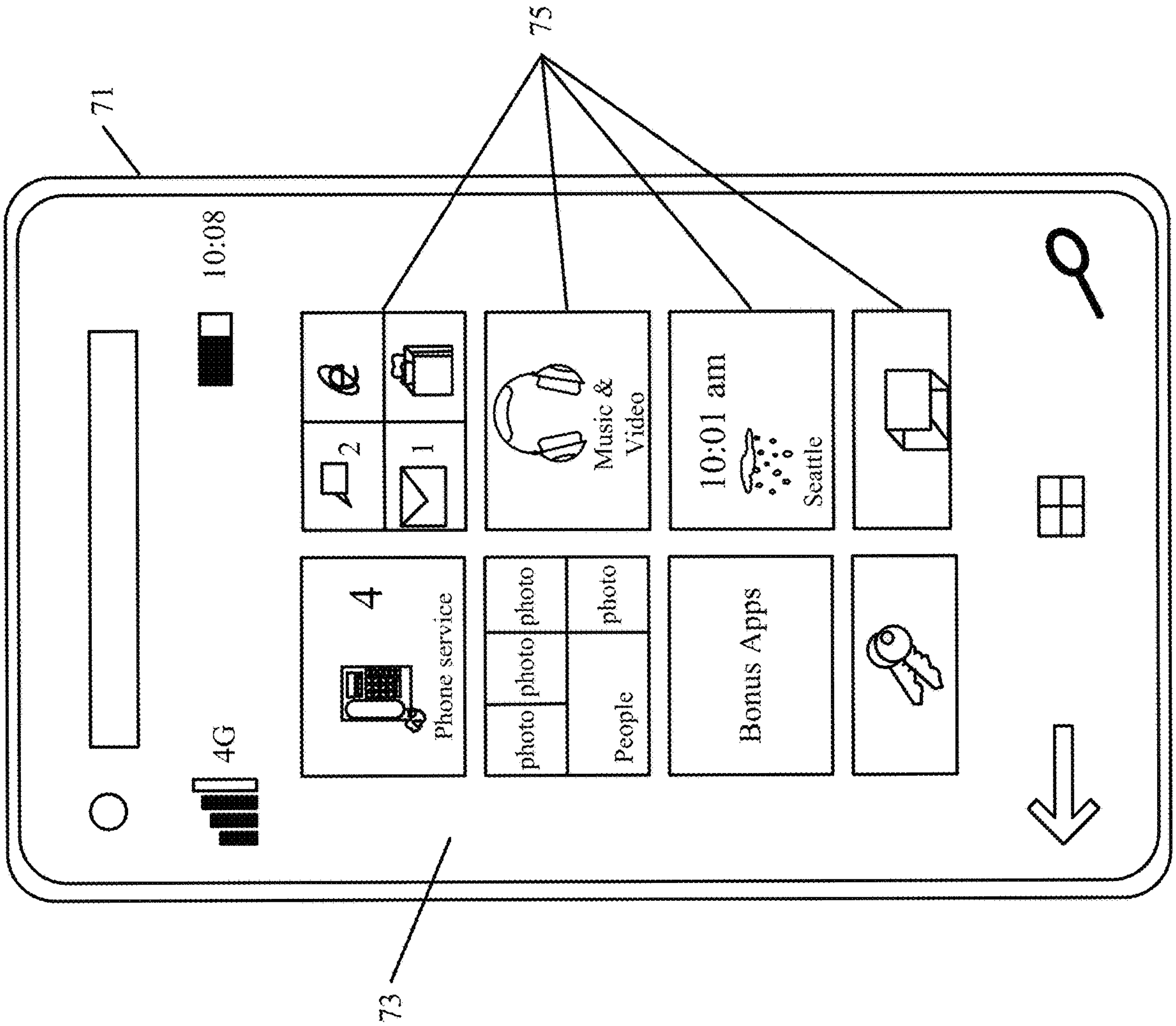

FIG. 17 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., work machine 100) or can be communicably coupled to a mobile machine (e.g., work machine 100 or UAV 200) for use in generating, processing, or displaying the outputs (e.g., 360) discussed above. FIGS. 18 and 19 are examples of handheld or mobile devices.

FIG. 17 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 18 shows one example in which device 16 is a tablet computer 1100. In FIG. 18, computer 1100 is shown with user interface display screen 1102. Screen 1102 can be a touch screen or a pen-enabled interface that receives inputs from a pen or stylus. Tablet computer 1100 can also use an on-screen virtual keyboard. Of course, computer 1100 can also be attached to a keyboard or other user input device through a suitable attachment mechanism, such as a wireless link or USB port, for instance. Computer 1100 can also illustratively receive voice inputs as well.

FIG. 19 is similar to FIG. 18 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 20:
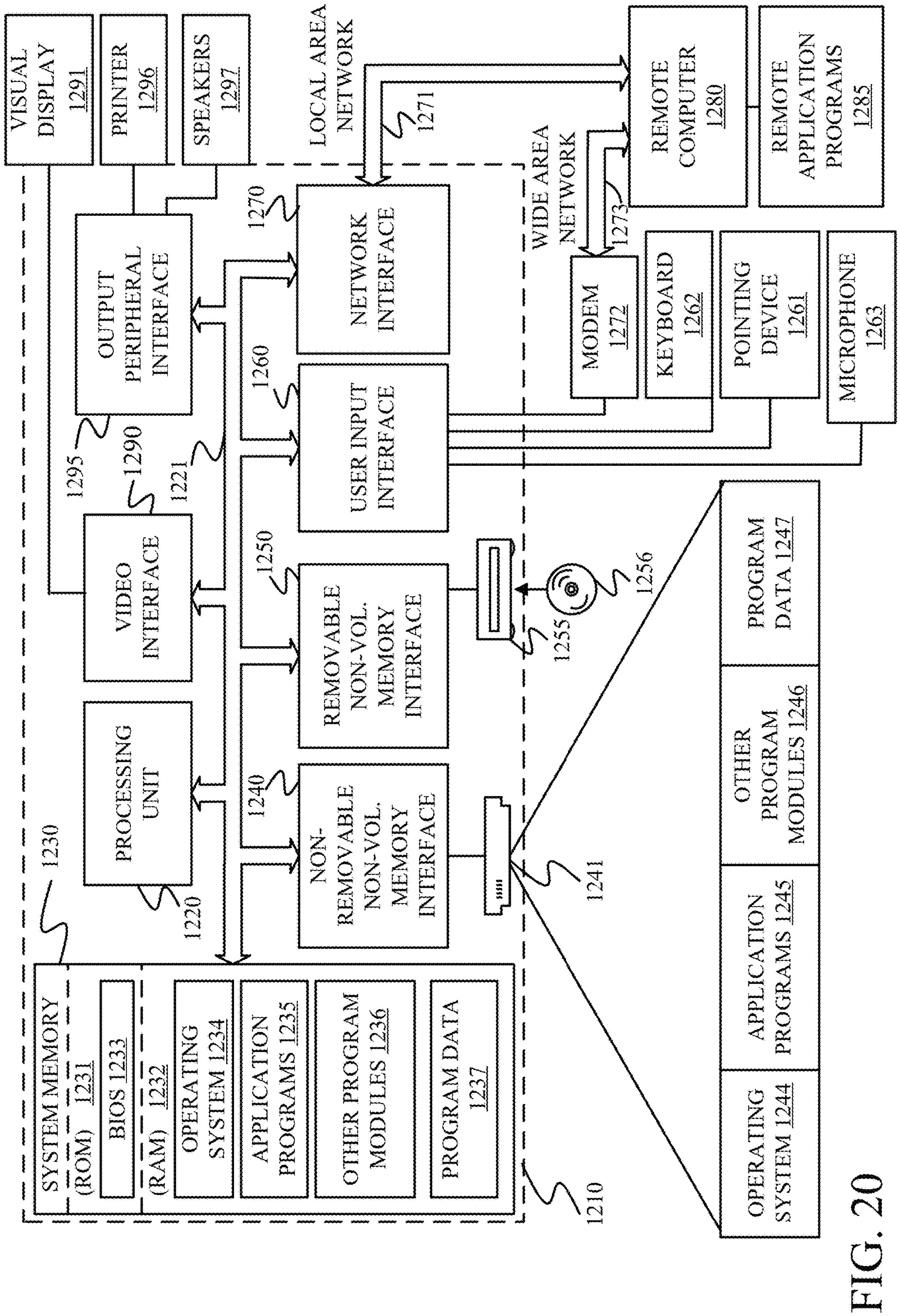
FIG. 20 is a block diagram showing one example of a computing environment that can be used in an agricultural system architecture.

FIG. 20 is one example of a computing environment in which elements of previous figures described herein can be deployed. With reference to FIG. 20, an example system for implementing some embodiments includes a computing device in the form of a computer 1210 programmed to operate as discussed above. Components of computer 1210 can include, but are not limited to, a processing unit 1220 (which can comprise processors or servers from previous figures), a system memory 1230, and a system bus 1221 that couples various system components including the system memory to the processing unit 1220. The system bus 1221 can be any of several types of bus structures including a memory bus or memory controller, a peripheral bus, and a local bus using any of a variety of bus architectures. Memory and programs described with respect to previous figures described herein can be deployed in corresponding portions of FIG. 20.

Computer 1210 typically includes a variety of computer readable media. Computer readable media can be any available media that can be accessed by computer 1210 and includes both volatile and nonvolatile media, removable and non-removable media. By way of example, and not limitation, computer readable media can comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 20 illustrates operating system 1234, application programs 1235, other program modules 1236, and program data 1237.

The computer 1210 can also include other removable/non-removable volatile/nonvolatile computer storage media. By way of example only, FIG. 20 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), quantum computers, etc.

The drives and their associated computer storage media discussed above and illustrated in FIG. 20, provide storage of computer readable instructions, data structures, program modules and other data for the computer 1210. In FIG. 20, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user can enter commands and information into the computer 1210 through input devices such as a keyboard 1262, a microphone 1263, and a pointing device 1261, such as a mouse, trackball or touch pad. Other input devices (not shown) can include a joystick, game pad, satellite dish, scanner, or the like. These and other input devices are often connected to the processing unit 1220 through a user input interface 1260 that is coupled to the system bus, but can be connected by other interface and bus structures. A visual display 1291 or other type of display device is also connected to the system bus 1221 via an interface, such as a video interface 1290. In addition to the monitor, computers can also include other peripheral output devices such as speakers 1297 and printer 1296, which can be connected through an output peripheral interface 1295.

The computer 1210 is operated in a networked environment using logical connections (such as a controller area network-CAN, local area network-LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules can be stored in a remote memory storage device. FIG. 20 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:

a sensor system disposed on a drone communicably coupled to and remotely positionable from an agricultural work machine at a worksite, the sensor system configured to detect a plurality of attributes at the worksite;

one or more processors; and memory storing instructions, executable by the one or more processors, that, when executed by the one or more processors, cause the one or more processors to:

identify a plurality of monitoring locations at the worksite, wherein each respective monitoring location, of the plurality of monitoring locations, is associated with a respective one or more attributes of the plurality of attributes;

identify a monitoring priority, the monitoring priority identifying a priority of each attribute, of the plurality of attributes, relative to one or more other attributes of the plurality of attributes;

identify a monitoring sequence based, at least, on the monitoring priority and the respective one or more attributes associated with each respective monitoring location, wherein the monitoring sequence instructs an order in which the drone is to travel to each monitoring location of the plurality of monitoring locations;

generate, based, at least, on the monitoring sequence, a travel plan for the drone, the travel plan instructing travel of the drone at the worksite; and control the drone based on the travel plan to travel at the worksite to detect, with the sensor system, the plurality of attributes and generate sensor data indicative of the plurality of attributes.

2. The agricultural system of claim 1, wherein the instructions, when executed by the one or more processors, further cause the one or more processors to:

identify the plurality of attributes based on the sensor data; and generate a control signal to control the agricultural work machine based on one or more identified attributes of the identified plurality of attributes.

3. The agricultural system of claim 1, wherein the instructions, when executed by the one or more processors, further cause the one or more processors to:

obtain priority data; and identify the monitoring priority based on the priority data.

4. The agricultural system of claim 1, wherein the instructions, when executed by the one or more processors, further cause the one or more processors to:

obtain data indicative of machine state; and identify the monitoring priority based on the data indicative of machine state.

5. The agricultural system of claim 1, wherein the instructions, when executed by the one or more processors, further cause the one or more processors to:

identify the monitoring priority of the plurality of attributes based on data indicative of one or more attributes other than the plurality of attributes.

6. The agricultural system of claim 1, wherein the instructions, when executed by the one or more processors, further cause the one or more processors to:

identify a performance of a sensor on-board the agricultural work machine; and identify the monitoring priority based on the performance of the sensor on-board the agricultural work machine.

7. A computer implemented method comprising:

identifying a plurality of attributes to be detected;

identifying a plurality of monitoring locations at a worksite, wherein each respective monitoring location, of the plurality of monitoring locations, is associated with a respective one or more attributes of the plurality of attributes;

identifying a monitoring priority, the monitoring priority identifying a priority of each attribute, of the plurality of attributes, relative to one or more other attributes of the plurality of attributes;

identifying a monitoring sequence based, at least, on the monitoring priority and the respective one or more attributes associated with each respective monitoring location, wherein the monitoring sequence instructs an order in which a drone is to travel to each monitoring location of the plurality of monitoring locations;

generating, based, at least, on the monitoring sequence, a travel plan for the drone, the travel plan instructing travel of the drone at the worksite; and controlling the drone based on the travel plan to travel at the worksite to detect, with a sensor system disposed on the drone, the plurality of attributes and generate sensor data indicative of the plurality of attributes.

8. The computer implemented method of claim 7 and further comprising:

identifying the plurality of attributes based on the sensor data; and generating a control signal to control an agricultural work machine based on one or more identified attributes of the identified plurality of attributes.

9. The computer implemented method of claim 7, wherein identifying the monitoring priority comprises:

obtaining priority data; and identifying the monitoring priority based on the priority data.

10. The computer implemented method of claim 7, wherein identifying the monitoring priority comprises:

obtaining data indicative of machine state; and identifying the monitoring priority based on the data indicative of machine state.

11. The computer implemented method of claim 7, wherein identifying the monitoring priority comprises:

obtaining data indicative of one or more attributes at the worksite, the one or more attributes different than the plurality of attributes; and identifying the monitoring priority of the plurality of attributes based on data indicative of one or more attributes, other than the plurality of attributes, at the worksite.

12. The computer implemented method of claim 7, wherein identifying the monitoring priority comprises:

identifying a performance of a sensor on-board an agricultural work machine; and identifying the monitoring priority based on the performance of the sensor on-board the agricultural work machine.

13. The computer implemented method of claim 7, wherein generating the travel plan comprises:

identifying the plurality of monitoring locations based, at least, on the plurality of attributes.

14. An agricultural system comprising:

a sensor system disposed on a drone communicably coupled to and remotely positionable from an agricultural work machine at a worksite, the sensor system configured to detect a plurality of attributes at the worksite;

one or more processors; and memory storing instructions, executable by the one or more processors, that, when executed by the one or more processors, cause the one or more processors to:

identify a plurality of monitoring locations at the worksite, wherein each respective monitoring location, of the plurality of monitoring locations, is associated with a respective one or more attributes of the plurality of attributes;

identify a monitoring priority, the monitoring priority identifying a priority of each attribute of the plurality of attributes, relative to one or more other attributes of the plurality of attributes;

generate, based, at least, on the monitoring priority and the respective one or more attributes associated with each respective monitoring location, a travel plan for the drone, the travel plan instructing travel of the drone at the worksite and including one or more monitoring locations and a monitoring sequence, wherein each monitoring location of the one or more monitoring locations is associated with a respective set of the plurality of attributes and wherein the monitoring sequence instructs an order in which the drone is to travel to each of the one or more monitoring locations; and control the drone based on the travel plan to travel at the worksite to detect, with the sensor system, the plurality of attributes to be detected and generate sensor data indicative of the plurality of attributes.

15. The agricultural system of claim 14, wherein the instructions, when executed by the one or more processors, further cause the one or more processors to:

identify the one or more monitoring locations based, at least, on the plurality of attributes.

16. The agricultural system of claim 14, wherein the instructions, when executed by the one or more processors, further cause the one or more processors to:

identify a performance of a sensor on-board the agricultural work machine; and identify the monitoring priority based on the performance of the sensor on-board the agricultural work machine.

17. The agricultural system of claim 14, wherein the instructions, when executed by the one or more processors, further cause the one or more processors to:

identify the monitoring priority based on one or more of:

priority data;

data indicative of one or more attributes at the worksite, other than the plurality of attributes; or data indicative of machine state.

18. The agricultural system of claim 1, wherein the plurality of attributes comprises at least a first attribute and a second attribute different than the first attribute, wherein each respective attribute of the plurality of attributes, comprises at least one of an environmental attribute, a plant attribute, a performance attribute, or a machine attribute.

19. The agricultural system of claim 1, wherein the instructions, when executed by the one or more processors, cause the one or more processors to identify the plurality of monitoring locations at the worksite based, at least, on the plurality of attributes.

20. The computer implemented method of claim 7, wherein the plurality of attributes comprises at least a first attribute and a second attribute different than the first attribute, wherein each respective attribute of the plurality of attributes, comprises at least one of an environmental attribute, a plant attribute, a performance attribute, or a machine attribute.

* * * * *